United States Patent

Nishimura et al.

[11] Patent Number: 5,638,280
[45] Date of Patent: Jun. 10, 1997

[54] VEHICLE NAVIGATION APPARATUS AND METHOD

[75] Inventors: Shigeki Nishimura; Kouji Kagawa; Ryuji Mimura; Mitsunobu Suzuki, all of Osaka, Japan

[73] Assignee: Sumitomo Electric Industries, Ltd., Osaka, Japan

[21] Appl. No.: 409,810

[22] Filed: Mar. 24, 1995

[30] Foreign Application Priority Data

| Mar. 30, 1994 | [JP] | Japan | 6-061231 |
| Oct. 31, 1994 | [JP] | Japan | 6-292091 |
| Oct. 31, 1994 | [JP] | Japan | 6-292092 |
| Dec. 22, 1994 | [JP] | Japan | 6-320707 |

[51] Int. Cl.$^6$ ............................................. G06F 19/00
[52] U.S. Cl. .................... 364/449 B; 340/990; 340/995; 364/446.4; 364/449.7
[58] Field of Search ........................... 364/443, 444, 364/449; 73/178 R; 340/988, 990, 995

[56] References Cited

U.S. PATENT DOCUMENTS

| 4,926,336 | 5/1990 | Yamada | 364/444 |
| 5,031,104 | 7/1991 | Ideka et al. | 364/449 |
| 5,184,303 | 2/1993 | Link | 360/449 |
| 5,220,507 | 6/1993 | Kirson | 364/444 |
| 5,243,528 | 9/1993 | Lefebvre | 364/449 |
| 5,272,638 | 12/1993 | Martin et al. | 364/449 |
| 5,369,588 | 11/1994 | Hayami et al. | 364/449 |
| 5,475,598 | 12/1995 | Fushimi et al. | 364/444 |
| 5,508,930 | 4/1996 | Smith, Jr. | 364/444 |
| 5,521,826 | 5/1996 | Matsumoto | 364/449 |

Primary Examiner—Gary Chin
Attorney, Agent, or Firm—Lane, Aitken & McCann

[57] ABSTRACT

A vehicle navigation apparatus for producing navigation information about a set of road maps, the starting position, current position and destination of a vehicle, a first optimum travel route having the vehicle travel to the destination from the starting position with a shortest driving time interval, and a second optimum travel route having the vehicle travel to the destination from the current position with a shortest driving time interval. The second optimum travel route includes a return travel route having a leading route end junction connected to the first optimum travel route and a trailing end point representative of the current position, and a detour travel route having a detour starting point where the vehicle starts to detour from the first optimum travel route and a detour ending point where the vehicle returns to the first optimum travel route.

26 Claims, 32 Drawing Sheets

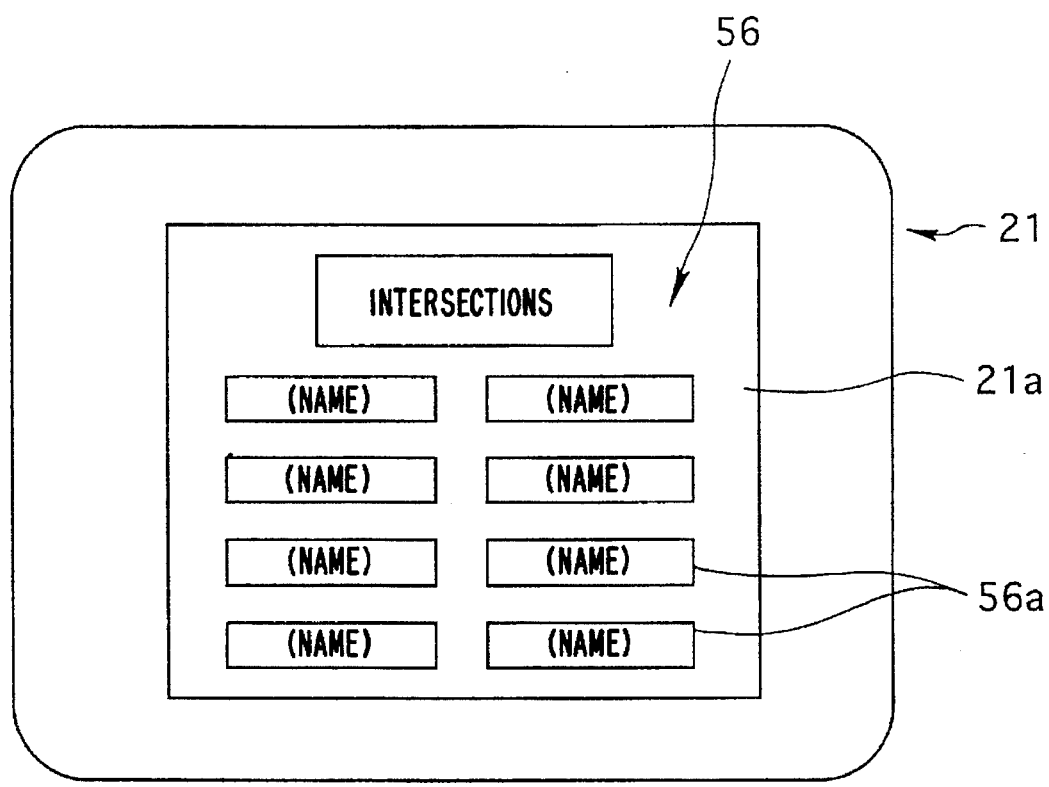

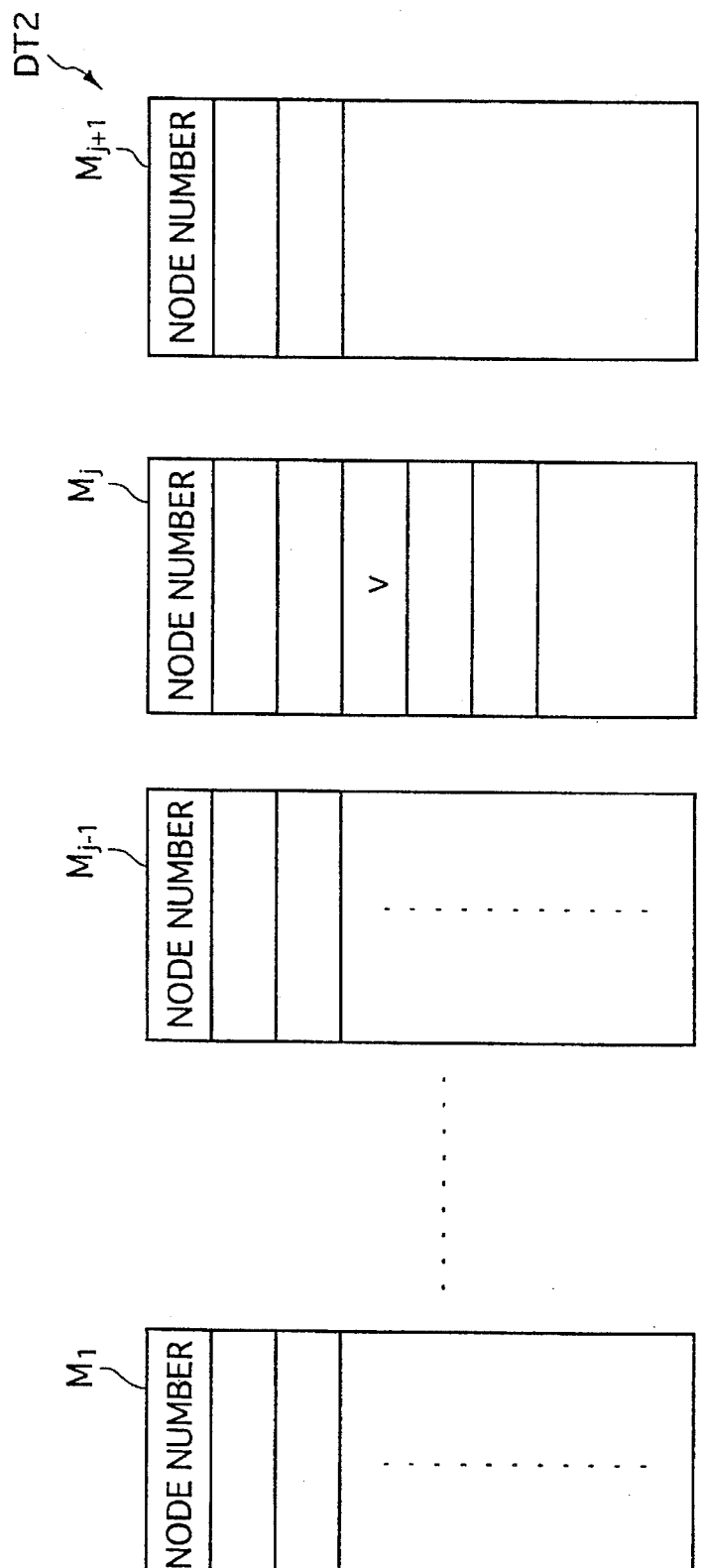

VEHICLE NAVIGATION APPARATUS AND METHOD

FIELD OF THE INVENTION

The present invention relates to a vehicle navigation apparatus for allowing a vehicle driver to navigate his or her vehicle on an optimum travel route, and in particular to a vehicle navigation apparatus provided with additional travel route data calculating means for calculating additional travel route data indicative of a returning or detouring travel route connected with the optimum travel route. These optimum, return and detour travel routes are displayed on a displaying unit to enable the driver to promptly return to the optimum travel route and to help the vehicle travel with the shortest driving time interval from the current position to the destination of the vehicle.

DESCRIPTION OF THE PRIOR ART

There have so far been proposed a wide variety of vehicle navigation systems one of which comprises a computer designed to automatically calculate an optimum travel route indicative of an optimum travel road for the vehicle only when a driver sets his or her destination, and a displaying unit for displaying the optimum travel road on a road map. Some of the known vehicle navigation systems are adapted to inform the driver of intersections with voices and enlarged views around the intersections on the displaying unit when the vehicle is approaching them.

The vehicle navigation system of this kind roughly comprises a direction sensor, a distance sensor, a GPS (Global Positioning System) receiver, a road map memory and a computer, which are all mounted on the vehicle. The navigation system is designed to detect the current position of the vehicle on the basis of the direction data obtained from the direction sensor, the distance data obtained from the distance sensor, the position data obtained from the GPS receiver, and the road patterns stored in the road map memory, and to automatically calculate an optimum travel route to the destination from the current position of the vehicle on the basis of the data set for the destination of the vehicle by the driver. The method of automatically calculating the optimum travel route is carried out by calculating a minimum time travel route representing a minimum time taken for the vehicle to travel between two distant points including the current position and the destination appearing in the road map displayed in the displaying unit. In order to perform the optimum travel route calculating method, a route network data is required to be prepared as including a plurality of links consisting of a starting link having a starting node representing the starting point, a destination link having a destination node representing the destination point, a plurality of intermediate links each having intermediate nodes intervening between the starting node and the destination node. The starting link, the destination link and the intermediate links collectively constitute a link tree from which is calculated a minimum link cost representative of the optimum links corresponding to the minimum time interval taken for the vehicle to travel between two distant points. In this way, the optimum travel route corresponding to the optimum links is specified.

With the help of the vehicle navigation system thus constructed, no vehicle cannot reach his or her destination with certainty even though the driver does not know the roads to the destination. The vehicle is, however, frequently traveling away from the optimum travel route indicated by the navigation system because of the fact that traffic conditions ahead of the vehicle are increasingly changed as well as the driver is inclined to overlook the road map and the current position of the vehicle. This makes it necessary for the driver to be informed of a new travel route from the current position to the destination of the vehicle instead of the optimum travel route previously calculated by the vehicle navigation system. In this instance, there will be considered such an idea as having the vehicle navigation system repeatedly calculate the optimum travel route from the current position to the destination of the vehicle. This type of vehicle navigation system is, for instance, disclosed in Japanese Laid-open Patent Publication No. 63-163210. The vehicle navigation system, however, needs much time for repeated calculation of the optimum travel route by the navigation system, thereby making it impossible to expeditiously point out a hew optimum travel route and eventually letting the vehicle to be navigated more and more away from the true optimum travel route.

In order to overcome the above shortcomings inherent in the previously proposed navigation system, there has been developed another vehicle navigation system, for instance, disclosed in Japanese Laid-open Patent Publication No. 5-53504, which is operated with the steps of preliminarily memorizing travel route data indicative of the travel routes within a predetermined area of the initial optimum travel route before the vehicle navigation system is initiated to be operated for calculation of the initial optimum travel route, and rectifying the initial optimum travel route based on the travel route data memorized under the condition that the vehicle is located on the travel routes within the predetermined area of the initial travel route when the vehicle is traveling off the initial optimum travel route.

The latter vehicle navigation system is advantageous in the fact that the initial optimum travel route automatically rectified can be informed to the driver when the vehicle is traveling off the initial optimum travel route within the range predetermined by the driver, however, disadvantageous in the aspect that the initial optimum travel route cannot be rectified if the vehicle is traveling off the initial optimum travel route beyond the range predetermined by the driver. The range can be set wider than the predetermined range in the above example, which requires a large amount of memory. Accordingly, the latter vehicle navigation system has a weak point of such a large amount of memory needed for detecting the initial optimum travel route and cannot increase the amount of memory beyond its limitation. In addition, the latter vehicle navigation system cannot overcome such a problem as consuming much time to repeat the calculation of the optimum initial travel route between the current position and the destination of the vehicle.

It is, therefore, an object of the present invention to provide a vehicle navigation apparatus which can expeditiously calculate returning travel route data indicative of a returning travel route connected with the optimum travel route to return the retuning travel route to the optimum travel route.

It is another object of the present invention to provide a vehicle navigation apparatus which can expeditiously calculate another additional travel route data including detour travel route data indicative of a detour travel route connected with the optimum travel route to detour along a detour travel route to avoid troublesome road sections on the optimum travel route.

SUMMARY OF THE INVENTION

According to one aspect of the present invention there is provided a vehicle navigation apparatus for producing navigation information about a set of road maps indicative of travel roads, the starting position, current position and destination of a vehicle, a first optimum travel route traced by first optimum travel roads forming part of the travel roads and having the vehicle travel to the destination from the starting position of the vehicle with a shortest driving time interval, and a second optimum travel route traced by second optimum travel roads off the first optimum travel roads and having the vehicle travel to the destination from the current position of the vehicle with a shortest driving time interval, the second optimum travel route consisting of a return travel route having a leading route end junction connected to the first optimum travel route and a trailing end point representative of the current position of the vehicle, the leading route end junction being representative of a road junction formed by the first and second optimum travel roads crossed with each other, comprising: route network data storing means for storing route network data including road map data representing the road maps, node data representing a plurality of nodes each indicative of the coordinate of each position on the road maps, link data representing a plurality of links each representing each of the travel roads and having both ends respectively represented by the nodes, link cost data representing a plurality of link cost values each determined based on the information about the nodes and links for the vehicle to pass through each of the links; road map displaying means for displaying the navigation information about the road maps, the starting position, current position and destination of the vehicle, and the first and second optimum travel routes; vehicle position detecting means for detecting the starting position, current position, destination of the vehicle to produce position data representing the starting position, current position, destination of the vehicle; data processing means for processing the route network data stored in the route network data storing means and the position data detected by the vehicle position detecting means to produce to the road map displaying means navigation information data representing the road maps, the starting position, current position and destination of the vehicle, and the first and second optimum travel routes, and to update the navigation information data on the basis of the position of the vehicle in one of the road maps displayed by the road map displaying means; data inputting means for inputting driver's instruction data to the data processing means; the data processing means comprising: first optimum travel route computing means for computing the first optimum travel route on the basis of the link cost data of the network data and the current position of the vehicle when the driver's instruction data for the destination of the vehicle is inputted to the data processing means by the data inputting means; route judging means for judging whether the vehicle is traveling on or off the first optimum travel roads when the driver's instruction data for computing the second optimum travel route is inputted to the data processing means by the data inputting means, and second optimum travel route computing means for computing the return travel route of the second optimum travel route on the basis of the link cost data of the network data and the current position of the vehicle when the vehicle is judged by the route judging means as traveling off the first optimum travel roads.

According to another aspect of the present invention there is provided a vehicle navigation apparatus for producing navigation information about a set of road maps indicative of travel roads, the starting position, current position and destination of a vehicle, a first optimum travel route traced by first optimum travel roads forming part of the travel roads and having the vehicle travel to the destination from the starting position of the vehicle with a shortest driving time interval, the first optimum travel route being sectioned to have a plurality of first optimum travel route segments surrounded by a closed boundary, and a plurality of second optimum travel routes each traced by second optimum travel roads off the first optimum travel roads and having the vehicle travel to the position of each of the travel roads of the first optimum travel route segments from the current position of the vehicle with a shortest driving time interval, each of the second optimum travel routes consisting of a return travel route having a leading route end junction connected to each of the first optimum travel route segments and a trailing end point representative of the current position of the vehicle, the leading route end junction being representative of a road junction formed by the first optimum travel roads and each of the second optimum travel roads crossed with each other, comprising: route network data storing means for storing route network data including road map data representing the road maps, node data representing nodes each indicative of the coordinate of each position on the road maps, link data representing a plurality of links each representing each of the travel roads and having both ends respectively represented by the nodes, link cost data representing a plurality of link cost values each determined based on the information about the nodes and links for the vehicle to pass through each of the links; road map displaying means for displaying the navigation information about the road maps, the starting position, current position and destination of the vehicle, and the first and second optimum travel routes, the road map displaying means being constituted by a displaying unit having a screen defining the closed boundary; vehicle position detecting means for detecting the starting position, current position, destination of the vehicle to produce position data representing the starting position, current position, destination of the vehicle; data processing means for processing the route network data stored in the route network data storing means and the position data detected by the vehicle position detecting means to produce to the road map displaying means navigation information data representing the road maps, the starting position, current position and destination of the vehicle, and the first optimum travel route segments and the second optimum travel routes, and to update the navigation information data on the basis of the position of the vehicle in the road map displayed by the road map displaying means; data inputting means for inputting driver's instruction data to the data processing means; the data processing means comprising: first optimum travel route computing means for computing the first optimum travel route on the basis of the link cost data of the network data and the current position of the vehicle when the driver's instruction data for the destination of the vehicle is inputted to the data processing means by the data inputting means; route judging means for judging whether the vehicle is traveling on or off the first optimum travel roads when the driver's instruction data for computing the second optimum travel route is inputted to the data processing means by the data inputting means; second optimum travel route computing means for computing the return travel routes of the second optimum travel routes on the basis of the link cost data of the route network data and the current position of the vehicle when the vehicle is judged by the route judging means as traveling off the first optimum travel roads; route cost value calculating means for calculating route cost values of the second optimum travel routes based on the link cost data stored in the route network data storing means and position data of the leading route end junction on the first optimum travel route; and optimum travel route selecting means for selecting one of the return travel routes of the second optimum routes on the basis of the link cost data of the route network data and the route cost values of the second optimum travel routes.

According to a further aspect of the present invention there is provided a vehicle navigation apparatus for producing navigation information about a set of road maps indicative of travel roads, the starting position, current position and destination of a vehicle, an optimum travel route traced by optimum travel roads forming part of the travel roads and having the vehicle travel to the destination from the starting position of the vehicle with a shortest driving time interval, and a detour travel route traced by detour travel roads off an avoidance road section forming part of the optimum travel roads and having the vehicle travel to the destination from the current position of the vehicle with a shortest driving time interval, the detour travel route having a detour starting point representative of a road position of the vehicle where the vehicle starts to detour from the optimum travel route and a detour ending point representative of a road position where the vehicle returns to the optimum travel route; route network data storing means for storing route network data including road map data representing the road maps, node data representing nodes each indicative of the coordinate of each position on the road maps, link data representing a plurality of links each representing each of the travel roads and having both ends respectively represented by the nodes, link cost data representing a plurality of link cost values each determined based on the information about the nodes and links for the vehicle to pass through each of the links; road map displaying means for displaying the navigation information about the road maps, the starting position, current position and destination of the vehicle, and the optimum and detour travel routes; vehicle position detecting means for detecting the starting position, current position, destination of the vehicle to produce position data representing the starting position, current position, destination of the vehicle; data processing means for processing the route network data stored in the route network data storing means and the position data detected by the vehicle position detecting means to produce to the road map displaying means navigation information data representing the road maps, the starting position, current position and destination of the vehicle, and the optimum and detour travel routes, the navigation information data being updated by the data processing means on the basis of the position of the vehicle in the road map displayed by the road map displaying means; data inputting means for inputting driver's instruction data to the data processing means, the driver's instruction data including data for setting the avoidance road section of the first optimum travel roads; the data processing means comprising: optimum travel route computing means for computing the optimum travel route on the basis of the link cost data of the network data and the current position of the vehicle when the driver's instruction data for the destination of the vehicle is inputted by the data inputting means; detour travel route computing means for computing the detour travel route on the basis of the link cost data including the link cost values of the links between the detour starting point and the detour ending point risen when the driver's instruction data for the destination of the vehicle is inputted by the data inputting means; and route judging means for judging whether the optimum travel route computing means or the detour travel route computing means is to calculate the optimum travel route or the detour travel route on the basis of the driver's instruction data of the optimum travel route or the detour travel route inputted to the data processing means by the data inputting means.

According to a further aspect of the present invention there is provided a vehicle navigation apparatus for producing navigation information about a set of road maps indicative of travel roads, the starting position, current position and destination of a vehicle, an optimum travel route traced by optimum travel roads forming part of the travel roads and having the vehicle travel to the destination from the starting position of the vehicle with a shortest driving time interval, and a plurality of detour travel routes traced by detour travel roads off the optimum travel roads and having the vehicle travel to the destination from the current position of the vehicle with a shortest driving time interval, each of the detour travel routes having a detour starting point representative of a road position of the vehicle where the vehicle starts to detour from the optimum travel route and a detour ending point representative of a road position where the vehicle returns to the optimum travel route, route network data storing means for storing route network data including road map data representing the road maps, node data representing nodes each indicative of the coordinate of each position on the road maps, link data representing a plurality of links each representing each of the travel roads and having both ends respectively represented by the nodes, link cost data representing a plurality of link cost values each determined based on the information about the nodes and links for the vehicle to pass through each of the links; road map displaying means for displaying the navigation information about the road maps, the starting position, current position and destination of the vehicle, and the optimum and detour travel routes; vehicle position detecting means for detecting the starting position, current position, destination of the vehicle to produce position data representing the starting position, current position, destination of the vehicle; data processing means for processing the route network data stored in the route network data storing means and the position data detected by the vehicle position detecting means to produce to the road map displaying means navigation information data representing the road maps, the starting position, current position and destination of the vehicle, and the optimum and detour travel routes, the navigation information data being updated by the data processing means on the basis of the position of the vehicle in the road map displayed by the road map displaying means; data inputting means for inputting driver's instruction data to the data processing means; the data processing means comprising: optimum travel route computing means for computing the optimum travel route on the basis of the link cost data of the network data and the current position of the vehicle when the driver's instruction data for the destination of the vehicle is inputted by the data inputting means; detour travel route computing means for computing the detour travel routes on the basis of the link cost data having the link cost values risen when the driver's instruction data for the destination of the vehicle is inputted by the data inputting means, the computed detour travel routes being displayed by the road map displaying means for the data inputting means to input one of the detour travel routes; and route judging means for judging whether the optimum travel route computing means or the detour travel route computing means is to calculate the optimum travel route or the detour travel routes on the basis of the driver's instruction data of the optimum travel route or the detour travel routes inputted to the data processing means by the data inputting means.

According to a yet further aspect of the present invention there is provide a vehicle navigation method of producing navigation information about a set of road maps indicative of travel roads, the starting position, current position and destination of a vehicle, an optimum travel route traced by optimum travel roads forming part of the travel roads and having the vehicle travel to the destination from the starting position of the vehicle with a shortest driving time interval, comprising the step of: preparing route network data including road map data representing the road maps, node data representing a plurality of nodes each indicative of the coordinate of each position on the road maps, link data representing a plurality of links each representing each of the travel roads and having both ends respectively represented by the nodes, link cost data representing a plurality of link cost values each determined based on the information about the nodes and links for the vehicle to pass through each of the links, the nodes including starting and destination nodes representative of the starting position and the destination of the vehicle, and the links including starting and destination links extending from the first and destination nodes along the optimum travel route; preparing a first work memory for storing part of the route network data and variable data initialized to be updated and including total link cost values of the links from the starting node to the nodes within the route network data stored therein, the route network data including the node data; preparing a plurality of second work memories respectively having predetermined cost ranges different from one another and including label fields initialized to have the node numbers of the node data stored therein, the node number of the starting node being stored in one of the second work memories having the cost range lowest in the total link cost values of the links from the starting node to the nodes within the route network data stored in the first work memory; performing a first calculation process of respectively calculating the total link cost values of the links from the starting node to the nodes having the node numbers in one of the second work memories on the basis of the route network data stored in the first work memory and the node numbers stored in one of the second work memories having the cost range lowest in the total link cost values to determine the links from the starting node to each of the nodes with the calculated total link cost value and storing the total link cost value in the first work memory; performing a second calculation process of calculating the total link cost values of the links from the starting node to the nodes having the node numbers stored in another second work memory on the basis of the route network data stored in the first work memory and data of the node numbers stored in another second work memory to determine the links from the starting node to each of the nodes with the calculated total link cost value and storing the total link cost values in the first work memory, said second calculation process being repeatedly performed in order of said cost ranges of said second work memories after said first calculation process; changing the node numbers stored in the second work memories based on each of the total link cost values of the links from the starting node to the nodes having the node numbers stored in each of the second work memories to classify the route network data stored in the first work memory into a plurality of route network data segments on the basis of the total link cost values of the links from the starting node to the nodes having the node numbers stored in each of the second work memories; judging on whether or not the total link cost value of the links from the starting node to the destination node is within the cost range of the second work memory having the node number of the destination node stored therein while the first and second calculation processes for the second work memories are being performed; and determining the links from the starting node to the destination node as the optimum travel route with a lowest route cost value based on the destination node judged as being within the cost range of the second work memory having the node number of the destination node stored therein.

BRIEF DESCRIPTION OF THE DRAWINGS

The objects, features and advantages of the present invention will become apparent as the description proceeds when taken in connection with the accompanying drawings, in which:

FIG. 3 is a front view of a screen of the road map displaying unit illustrating pictorial information;

FIG. 5B is a view of another representative data table showing the data structure of an addressing table data stored in work memories of the vehicle navigation apparatus according to the present invention;

DESCRIPTION OF THE PREFERRED EMBODIMENTS

One preferred embodiment of the vehicle navigation apparatus according to the present invention will be described in detail hereinlater in accordance with the attached drawings.

Figure 1A:
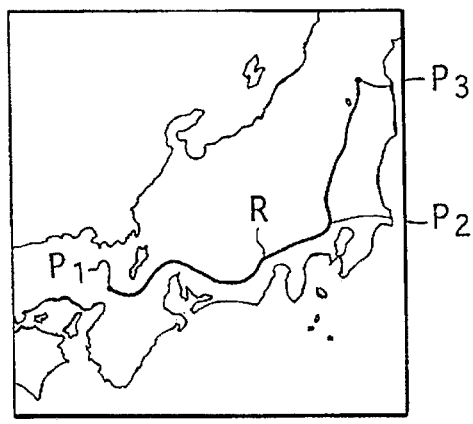
FIG. 1A is a wide range road map shown by way of illustration and used for facilitating to understand the present invention.
Figure 1B:
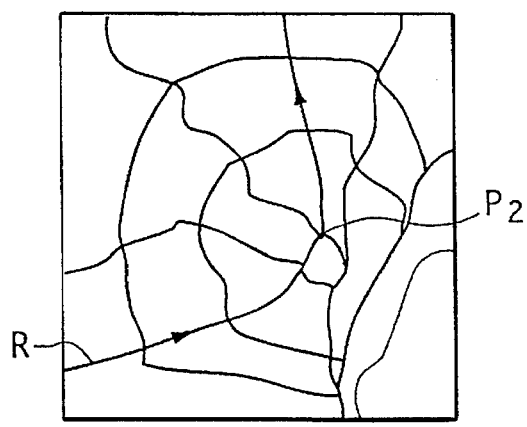
FIG. 1B is an intermediate range road map shown by way of illustration and used for facilitating to understand the present invention.
Figure 1C:
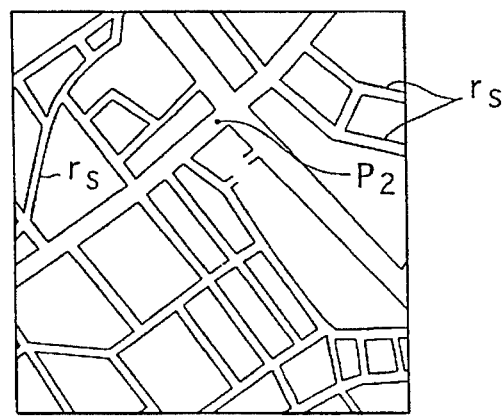
FIG. 1C is a narrow range road map shown by way of illustration and used for facilitating to understand the present invention.

The vehicle navigation apparatus is designed to produce navigation information about a set of road maps indicative of travel roads and having different reduction scales as shown in FIGS. 1A, 1B and 1C. The road maps for the navigation information are shown in FIGS. 1A, 1B and 1C to include the starting position P1, current position P2 and destination P3 of a vehicle, an optimum travel route R traced by optimum travel roads forming part of the travel roads $r_s$ and having the vehicle VX (see FIG. 14) travel to the destination P3 from the starting position P1 of the vehicle with a shortest driving time interval.

Figure 2:
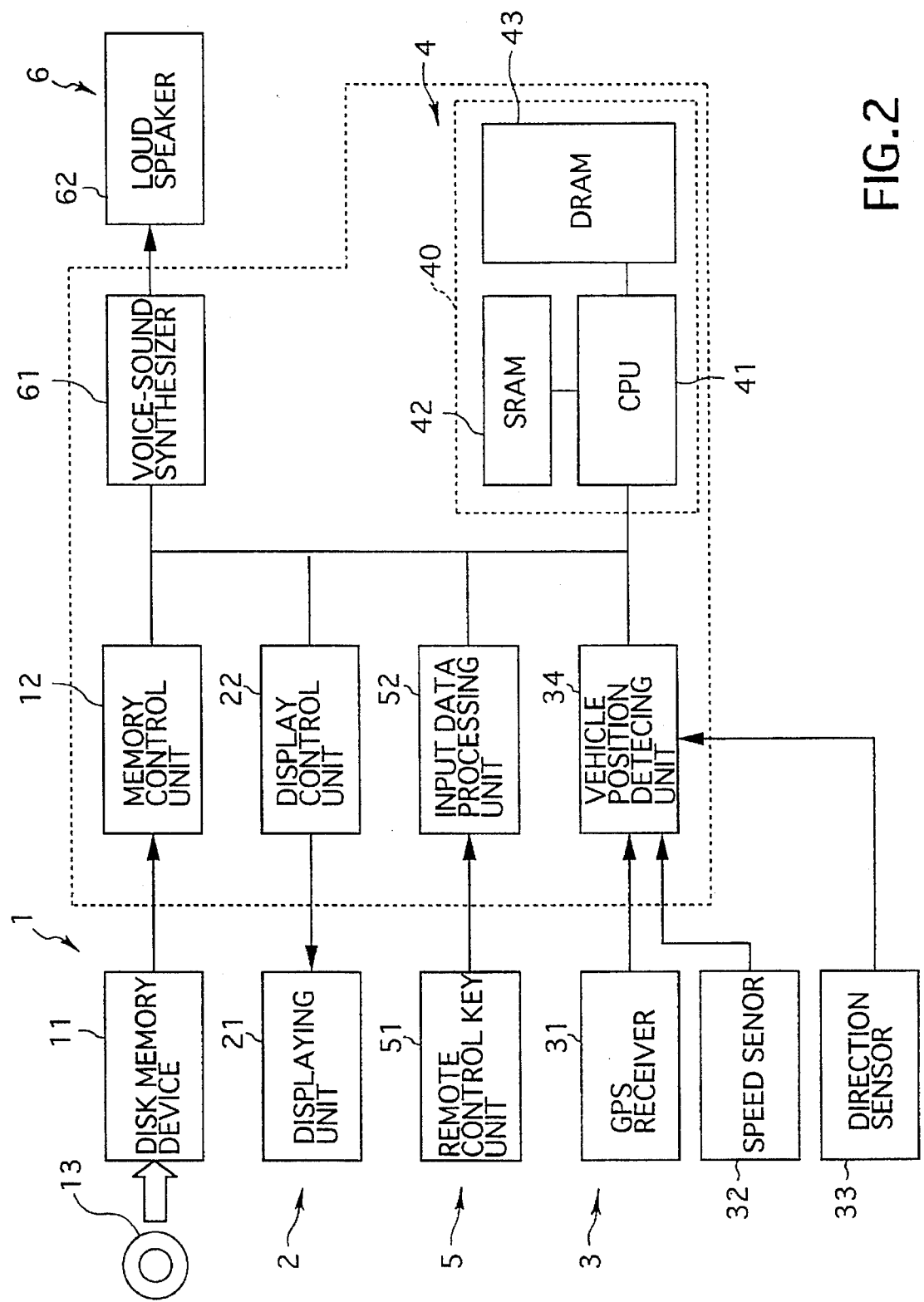
FIG. 2 is a whole block diagram of a vehicle navigation apparatus according to the present invention.

The vehicle navigation apparatus is shown in FIG. 2 as comprising route network data storing means 1 for storing route network data including road map data, node data, link data and link cost data. The road map data is representative of the road maps including a route network traced by a plurality of travel roads $r_s$, kinds of the travel roads $r_s$ partially defined by the links, widths of travel roads $r_s$ partially defined by the links, map information such as street names, and information of traffic restrictions including the one-way, right- and left-turn restriction. The node data is representative of a plurality of nodes each having a node number corresponding to the coordinates of a predetermined position on each of the road maps, e.g., a position of an intersection of the travel roads $r_s$, a junction or a corner of the travel roads. The link data represent a plurality of links corresponding to the travel roads $r_s$ and having both ends respectively represented by the nodes, while the link cost data represent a plurality of link cost values each determined based on the driving time for the vehicle to pass through the travel road represented by the link at a regulated speed of the travel road. The link data contains data of a plurality of leading nodes and trailing nodes indicative of both ends of the links along which the vehicle is to travel.

The vehicle navigation apparatus further comprises network data storing means 1 which is constituted by a disk memory device 11 and a disk memory control unit 12. The disk memory device 11 is adapted to read the route network data memorized in a memorizing medium 13 such as for example a CD-ROM (Compact Disk of Read Only Memory). The disk memory control unit 12 is operative to control the disk memory device 11 and to read from the disk memory device 11 the route network data to be outputted to a navigation control unit 40 which forms part of the vehicle navigation apparatus and will become apparent as the description proceeds hereinafter.

The vehicle navigation apparatus further comprises road map displaying means 2 for displaying the navigation information about the road maps, the starting position P1, current position P2 and destination P3 of the vehicle, and the optimum travel route R and other pictorial information such as for example an opening menu picture. The road map displaying means 2 is constituted by a displaying unit 21 having a screen 21a and a display control unit 22 for controlling the displaying unit 21 based on the signal produced by the navigation control unit 40. The displaying unit 21 is constituted by such as for example a LCD (Liquid Crystal Display) having a color picture screen.

The vehicle navigation apparatus further comprises vehicle position detecting means 3 for detecting the starting position P1, current position P2, destination P3 of the vehicle to produce position data representing the starting position P1, current position P2, destination P3 of the vehicle. The vehicle position detecting means 3 is constituted by a GPS (Global Positioning System) receiver 31, a speed sensor 32, a direction sensor, i.e., heading sensor 33 and a vehicle position detecting unit 34 which is adapted to detect the current position P2 of the vehicle based on the signals produced by the GPS receiver 31, the speed sensor 32 and the direction sensor 33 and the route network data stored in the memorizing medium 13. The speed sensor 32 forms part of the engine control unit mounted on the vehicle to produce a signal commensurate with the revolutions of the wheel of the vehicle. The GPS receiver 31 is designed to receive electric waves from the GPS satellite and to produce latitude and longitude data of the current position P2 of the vehicle. The vehicle position detecting unit 34 is operated to detect the current position P2 of the vehicle on the basis of the signals produced by the GPS receiver 31, the speed sensor 32, and the direction sensor 33 to produce a signal to the navigation control unit 40. The operation of the vehicle position detecting unit 34 is carried out in accordance with the known "map matching method" which is so called in those skilled in the art, and the operation of the vehicle position detecting unit 34 is repeated at a predetermined time interval such as for example 1.2 seconds to have the navigation control unit 40 operated to update the data of the current position P2 of the vehicle.

Figure 4A:
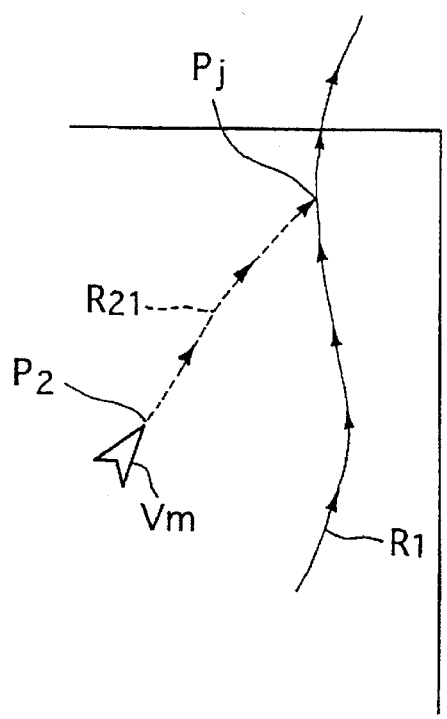
FIG. 4A is a fragmentary view of the screen of the displaying unit illustrating the optimum travel route and the current vehicle position.
Figure 4B:
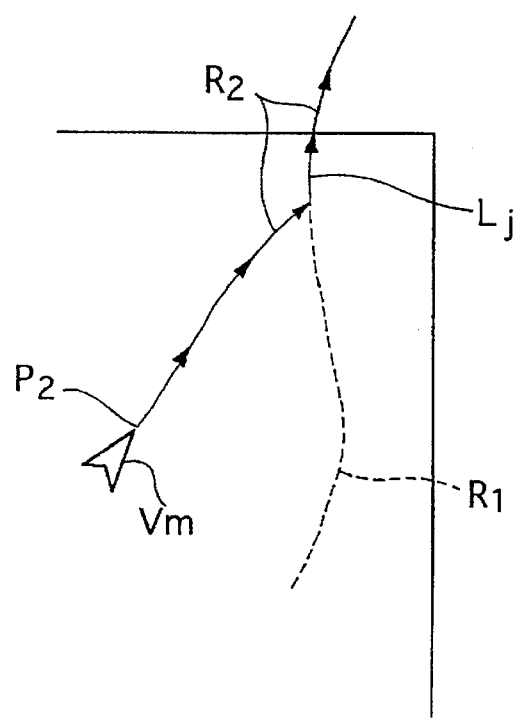
FIG. 4B is a fragmentary view similar to FIG. 4A but showing an additional optimum travel route in addition to the optimum travel route and the current vehicle position.

The vehicle navigation apparatus further comprises data processing means 4 for processing the route network data stored in the route network data storing means 1 and the position data detected by the vehicle position detecting means 3. The data processing means 4 is constituted by a microcomputer which is designed to produce to the road map displaying means 2 navigation information data representing the road maps, the starting position P1, current position P2 and destination P3 of the vehicle, and the optimum travel routes represented by an initial optimum route R1 and an additional optimum travel route R2 respectively shown in FIGS. 4A and 4B. Each of FIGS. 4A and 4B illustrates part of the screen showing the road map with the initial optimum travel route R1, the additional optimum travel route R2, and the current position P2 from which the vehicle Vm is about to travel on the travel roads $r_s$ to the destination P3. The additional optimum travel route R2 is traced by additional optimum travel roads off the optimum travel roads and has the vehicle travel to the destination P3 from the current position P2 with a shortest driving time interval.

The data processing means 4 is adapted to update the navigation information data on the basis of the current position P2 of the vehicle in each of the road maps displayed by the road map displaying means 2. The additional optimum travel route R2 consists of a return travel route R21 having a leading route end junction Pj connected to the initial optimum travel route R1 and a trailing end point representative of the current position P2 of the vehicle. The leading route end junction Pj is representative of a road junction formed by the initial and additional optimum travel roads crossed with each other.

Returning to FIG. 2, the data processing means 4 is constituted by the navigation control unit 40 comprising the CPU (Central Processing Unit) 41, the SRAM (Static Random Access Memory) 42 and the DRAM (Dynamic Random Access Memory) 43. The DRAM 43 of the navigation control unit 40 has a plurality of road map memories with which the route network data for the current vehicle position P2 is loaded to display the road maps each showing the current position P2 on the screen 21a of the displaying unit 21. The CPU 41 of the navigation control unit 40 is adapted to update the data of the current vehicle position P2 based on the route network data stored in the road map memories of the DRAM 43 of the navigation control unit 40. The route network data stored in the road map memories of the DRAM 43 is updated whenever the current vehicle position P2 is updated.

Figure 5A:
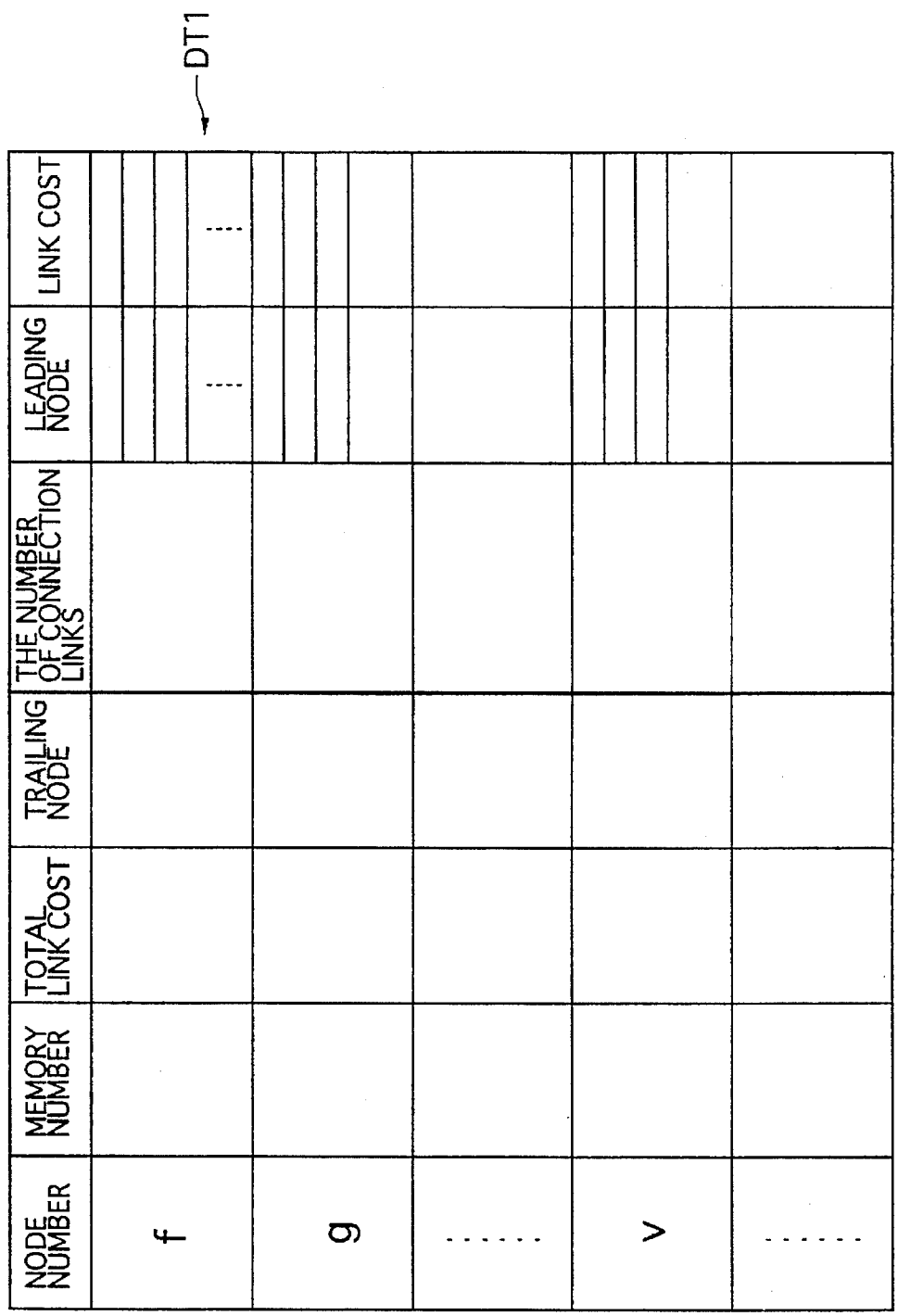
FIG. 5A is a view of a representative data table showing the data structure of a resultant table data stored in work memories of the vehicle navigation apparatus according to the present invention.

The SRAM 42 of the navigation control unit 40 have a plurality of search work memories each having a memory number and designed to store the route network data relating to the nodes. The route network data stored in the search work memories of the SRAM 42 include a resultant table data DT1 shown in FIG. 5A and an address table data DT2 shown in FIG. 5B. The address table data DT2 include the node numbers of the nodes stored in the resultant table data DT1 of the SRAM 42 of the navigation control unit 40. The search work memories $M_1$ to $M_{j+1}$ of the address table data DT2 of the SRAM 42 have predetermined cost ranges different from one another. Each of the cost ranges of the search work memories $M_1$ to $M_{j+1}$ of the address table data DT2 has a range scale width commensurate with a predetermined cost value "T" representative of a predetermined driving time.

Figure 6A:
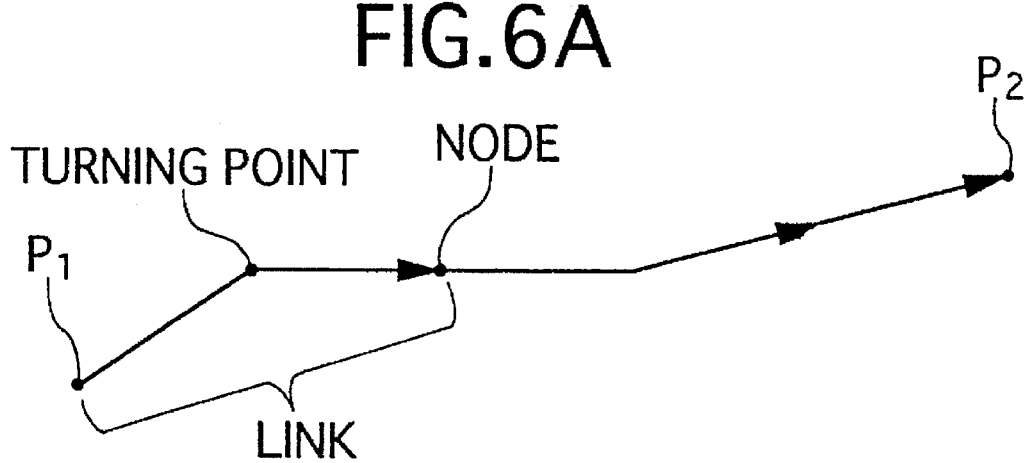
FIG. 6A is an explanatory illustration of a plurality of links shown by a plurality of vectors representing the heading of a vehicle.
Figure 6B:
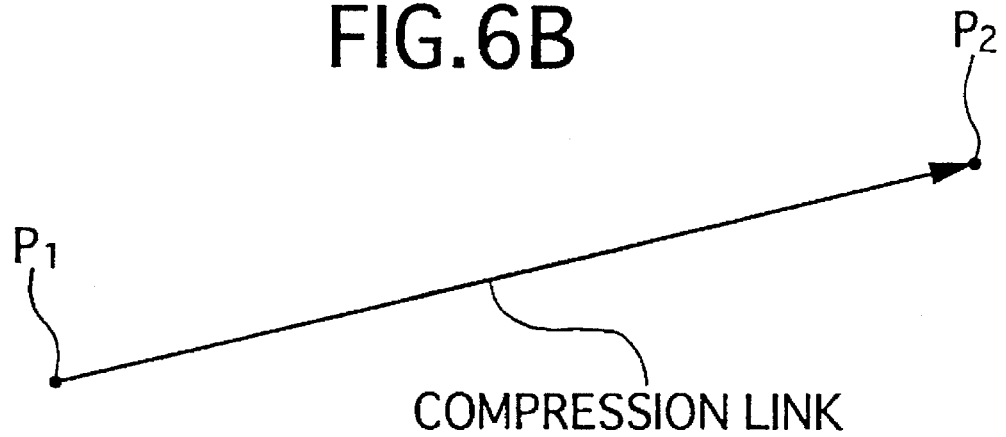
FIG. 6B is an explanatory illustration of a compression link shown by a vector representing a total link cost.
Figure 6C:
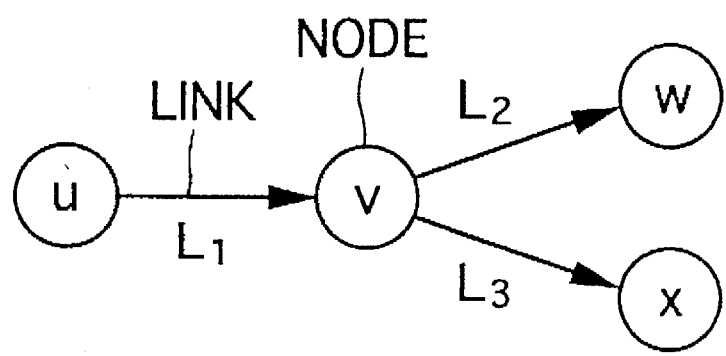
FIG. 6C is an explanatory illustration of a certain node connected to its leading and trailing links.

The CPU 41 of the navigation control unit 40 is adapted to have part of the route network data stored in the search work memories of the SRAM 42 and to compute a total link cost value from a starting node representative of the starting position of the vehicle to each of the nodes representative of each of the predetermined places on the road map. The data of the links between first and second nodes and the data of the first and second nodes can be drawn as shown in FIGS. 6A and 6B. FIG. 6A shows a series of vectors indicative of a plurality of links between first and second nodes and representative of road sections between two different places represented by the first and second nodes, while FIG. 6B shows a compression link vector indicative of a compression link including the first and second nodes and a total link cost value of the links between the first and second nodes. The link data of the route network data include one or more kinds of compression link data which are available for the wide range road maps having different reduction scales and stored in DRAM 43 of the navigation control unit 40. In FIG. 6C, a link L1 has at its both ends a leading node v and a trailing node u, while links L2 and L3 adjacent to the link L1 have leading nodes w and x, respectively, and a common trailing node in registry with the node v.

The route network data including the compression link data is also stored in the search work memories of the resultant table data DT1 of the SRAM 42 to classify the route network data into a plurality of route network data segments hereinlater described. The memory numbers of the search work memories of the resultant table data DT1 of the SRAM 42 are memorized by other search work memories of the address table data DT2 of the SRAM 42 of the navigation control unit 40. The search work memories of the address table data DT2 of the SRAM 42 have a plurality of cost ranges different from one another. In this way, the route network data is classified into the route network data segments different from one another in the cost range of the total link cost values of the links between the starting node and each of the node.

The classified route network data segments are hereinlater described as including a starting route network data segment having the cost range lowest in the link cost values of the links from the starting node to each of the nodes within the route network data stored in the SRAM 42 of the navigation control unit 40. The route network data segments are representative of road map segments of the road map and has a set of boundary forming nodes. The boundary forming nodes are respectively positioned to form a boundary between adjacent two road map segments of the road map and distant from the starting node to have other links and nodes intervene between the starting node and the boundary forming nodes. In other words, each of the road map is sectioned by the CPU 41 of the navigation control unit 40 into a plurality of road map segments including a starting road map segment having the starting node and other free nodes each spaced apart form the starting node, and a plurality of surrounding road map segments surrounding the starting road map segment each including an innermost free node connected to the outermost free node of the starting road map segment and an outermost free node spaced apart from the innermost free node radially outwardly of the surrounding road map segments surrounding the starting road map segment. One of the surrounding road map segments is a destination road map segment having the destination node and the free nodes each spaced apart form the destination node.

The vehicle navigation apparatus is shown in FIG. 2 to further comprise data inputting means 5 for inputting driver's instruction data to the CPU 41 of the navigation control unit 40. The data inputting means 5 is constituted by a remote control key unit 51 having a plurality of switches and keys such as for example a joystick key respectively manipulated by the vehicle driver, and an input data processing unit 52 for processing the data inputted by the remote control key unit 51. The remote control key unit 51 may be replaced as the data inputting means 5 by a wired control key unit positioned in the vicinity of the displaying unit 21 in front of the driver's seat in the vehicle. The data inputting means 5 is operated by a vehicle driver on the needs of inputting the destination P3 and transitional places Tr such as a freeway, a turnpike and a port for ferry boats, requesting the displaying unit 21 to have the initial optimum travel route R1 displayed on the screen 21a of the displaying unit 21, changing the kind of the road map on the screen 21a of the displaying unit 21, requesting the displaying unit 21 to have the additional optimum travel route R2 displayed on the screen 21a of the displaying unit 21 when the vehicle is traveling on the travel roads off the travel roads of the initial optimum travel route R1, and requesting another navigation information, such as for example a detour route R3 to be displayed on the screen 21a of the displaying unit 21. The data inputting means 5 serves as inputting driver's instruction data to the CPU 41 of the navigation control unit 40.

Figure 13B:
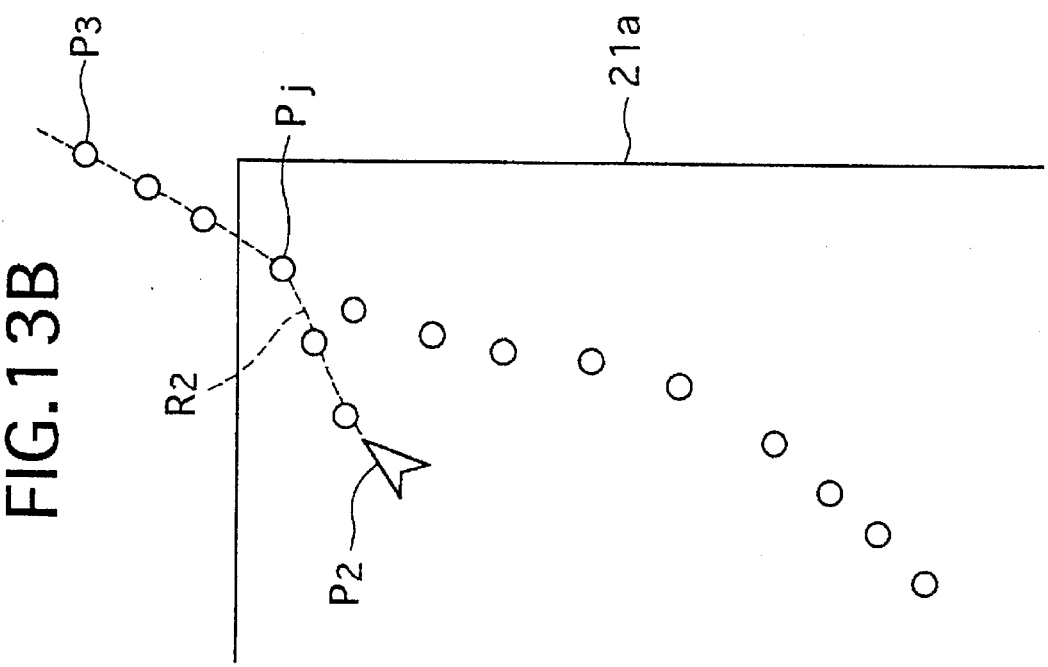
FIG. 13B is a fragmentary view similar to FIG. 13A but showing an additional optimum travel route and the current vehicle position with the optimum travel route deleted out of the screen.
Figure 13A:
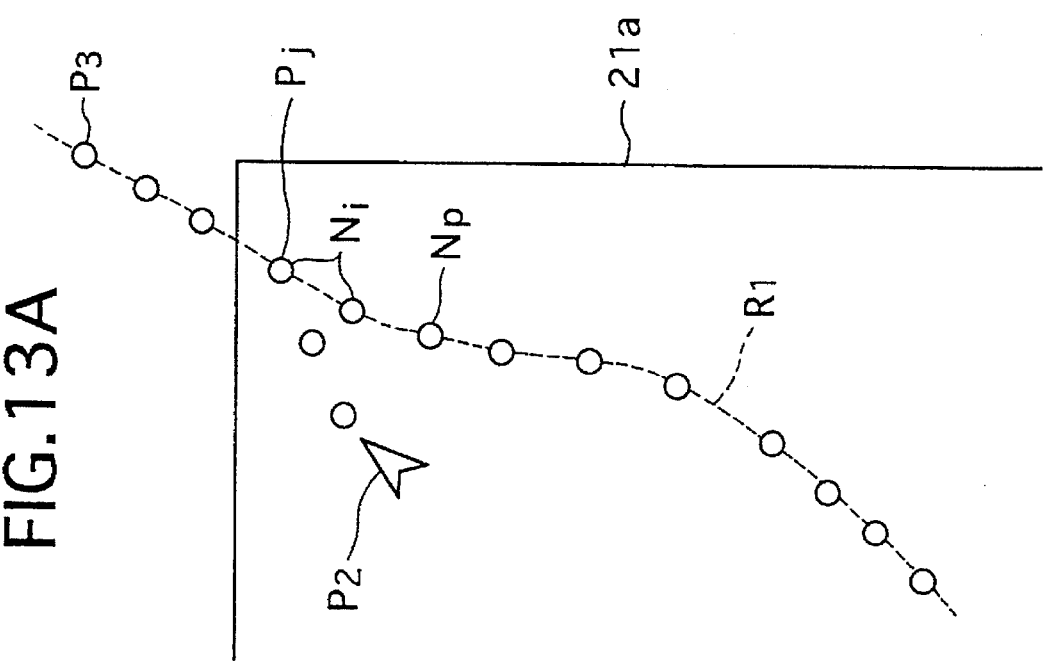
FIG. 13A is a fragmentary view of the screen of the displaying unit illustrating a plurality of nodes on the optimum travel route and in the neighborhood of the current vehicle position.

In FIGS. 13A and 13B, the nodes include a proximity node Ni positioned on the initial optimum travel route R1 and in close proximity of the trailing end point P2 of the return travel route R21 of the second optimum travel route R2, a destination node positioned on the initial optimum travel route R1 and in registry with the leading route end junction Pj of the return travel route R21 of the second optimum travel route R2, and an intermediate node Ni positioned between the proximity node Np and the destination node, while the links include a proximity link extending on the initial optimum travel route R1 in close proximity of the trailing end point P2 of the return travel route R21 of the second optimum travel route R2, a destination link extending on the initial optimum travel route R1 and in close proximity of the destination position P3, and an intermediate link extending between the proximity link Ni and the destination link and connected to the leading route end junction Pj of the return travel route R21 of the second optimum travel route R2. The proximity node Ni and links are replaced as the point of the leading route end junction Pj of the return travel route R21 by one of a last transit node, a last transit link $T_{PL}$ and a last transit section. The last transit node $T_{PL}$ is positioned on the first optimum travel route R1 in close proximity of the trailing end point P2 of the return travel route R21 of the second optimum travel route R2, while the last transit link $T_{PL}$ extends on the first optimum travel route R1 in close proximity of the trailing end point of the return travel route R21 of the second optimum travel route R2 and representative of a last transit travel road through which the vehicle has passed. The initial optimum travel route R1 may be divided by the transitional places to have a last transit section representative of a last transit travel road through which the vehicle has passed and a next transit section representative of a travel road extending between the last transit section and the destination node and through which the vehicle will pass. In this case, the next transit section is connected to the leading route end junction Pj of the return travel route R21 of the second optimum travel route R2.

As will be understood from the following description, the navigation control unit 40 of the data processing means 4 functions as first optimum travel route computing means for computing the initial optimum travel route R1 on the basis of the link cost data of the network data and the current position of the vehicle when the driver's instruction data for the destination of the vehicle is inputted to the CPU 41 of the navigation control unit 40 by the data inputting means 5, route judging means for judging on whether the vehicle is traveling on or off the initial optimum travel roads when the driver's instruction data for computing the additional optimum travel route is inputted to the data processing means 4 by the data inputting means 5, and second optimum travel route computing means for computing the return travel route R21 of the additional optimum travel route R2 on the basis of the link cost data of the route network data and the data of the current position P2 of the vehicle when the vehicle is judged by the route judging means as traveling off the initial optimum travel roads.

The navigation control unit 40 additionally functions as proximity link searching means for searching the proximity link when the driver's instruction data for the destination of the vehicle is inputted by the data inputting means 5, and intermediate link judging means for judging on whether or not the intermediate link extends between the proximity link and the destination link and is connected to the leading route end junction of the return travel route of the second optimum travel route. The navigation control unit 40 may function as last transit link searching means for searching the last transit link when the driver's instruction data for the destination of the vehicle is inputted by the data inputting means 5, or proximity node searching means for searching the proximity node when the driver's instruction data for the destination of the vehicle is inputted by the data inputting means 5, and intermediate node judging means for judging on whether or not the intermediate node is positioned between the proximity node and the destination node and in registry with the leading route end junction Pj of the return travel route R21 of the second optimum travel route R2.

The data processing means 4 is operated with a program to store a road map data block forming part of the route network data and indicative of one of the road maps on the screen 21a of the road map displaying unit 21 and the current position of the vehicle on the basis of the current position of the vehicle, and to judge on whether or not one of the links from the proximity link (including nodes at its both ends) to the destination link of the first optimum travel route is included in the stored road map data block to determine one of the links to be connected to the leading route end junction Pj of the return travel route R21 of the second optimum travel route R2. The leading route end junction Pj of the return travel route R21 of the second optimum travel route R2 is desirably connected to one of the links in the road map data block stored in the DRAM 43 of the navigation control unit 40 and in close proximity of the destination P3.

In the case that the initial optimum travel route R1 is divided by the nodes representative of the transitional places, the navigation control unit 40 functions as last transit section searching means for searching the last transit section when the driver's instruction data for the destination of the vehicle is inputted by the data inputting means 5, and next transit section judging means for judging on whether or not the next transit section is positioned between the last transit section and the destination.

The vehicle navigation apparatus further comprises announcing means 6 for announcing the navigation information about the road maps, the starting position P1, current position P2 and destination P3 of the vehicle, the initial optimum travel route R1 and the additional optimum travel routes R2. The announcing means 6 is constituted by a voice-sound synthesizer 61 for producing voice sound signals based on data outputted from the navigation control unit 40, and a loudspeaker 62 for producing voice sounds to the vehicle driver based on the sound-voice signals from the voice-sound synthesizer 61. The announcing means 6 is also operable to announce other information about confirmation guidance for inputting driver's instructions.

Figure 8:
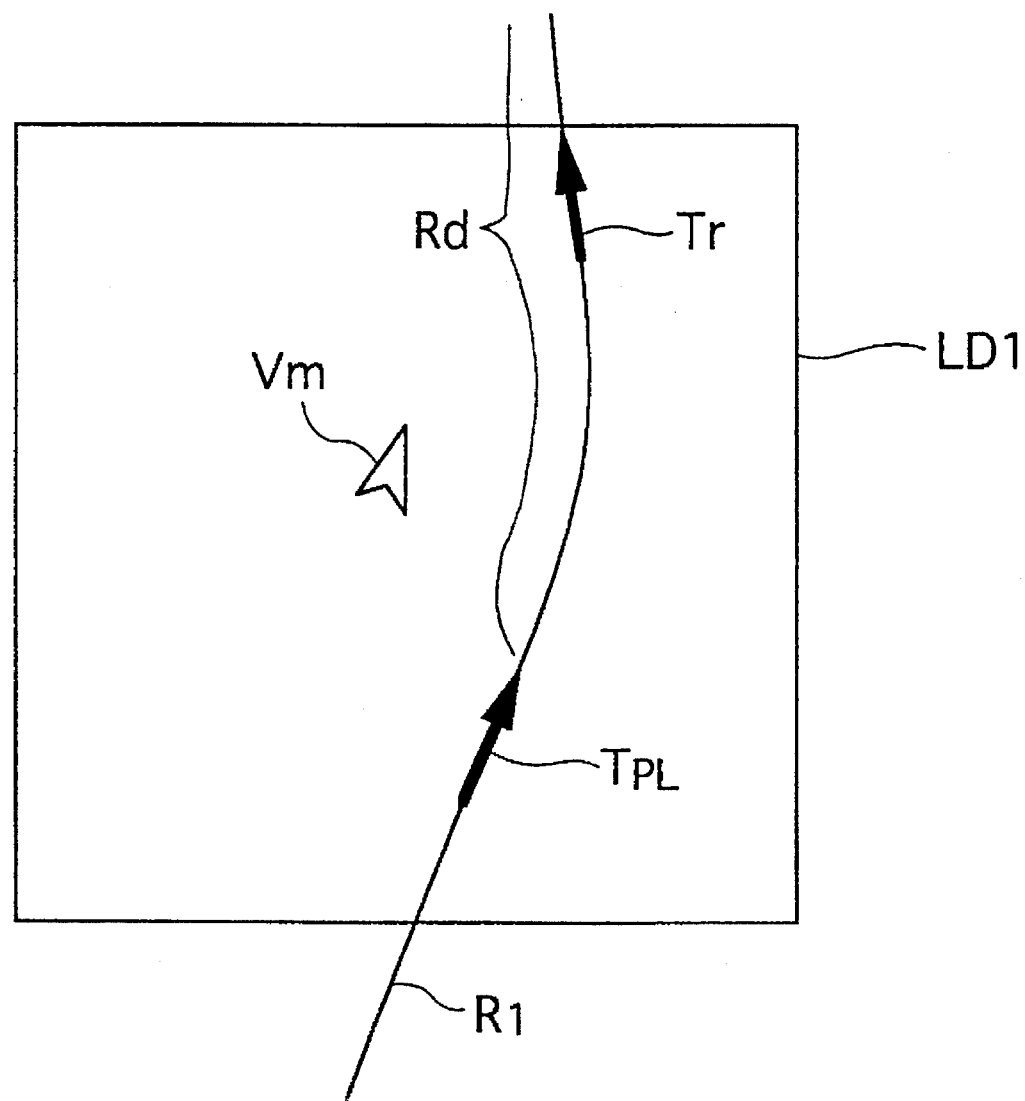
FIG. 8 is a view of the screen showing the optimum travel route and the current position.
Figure 9A:
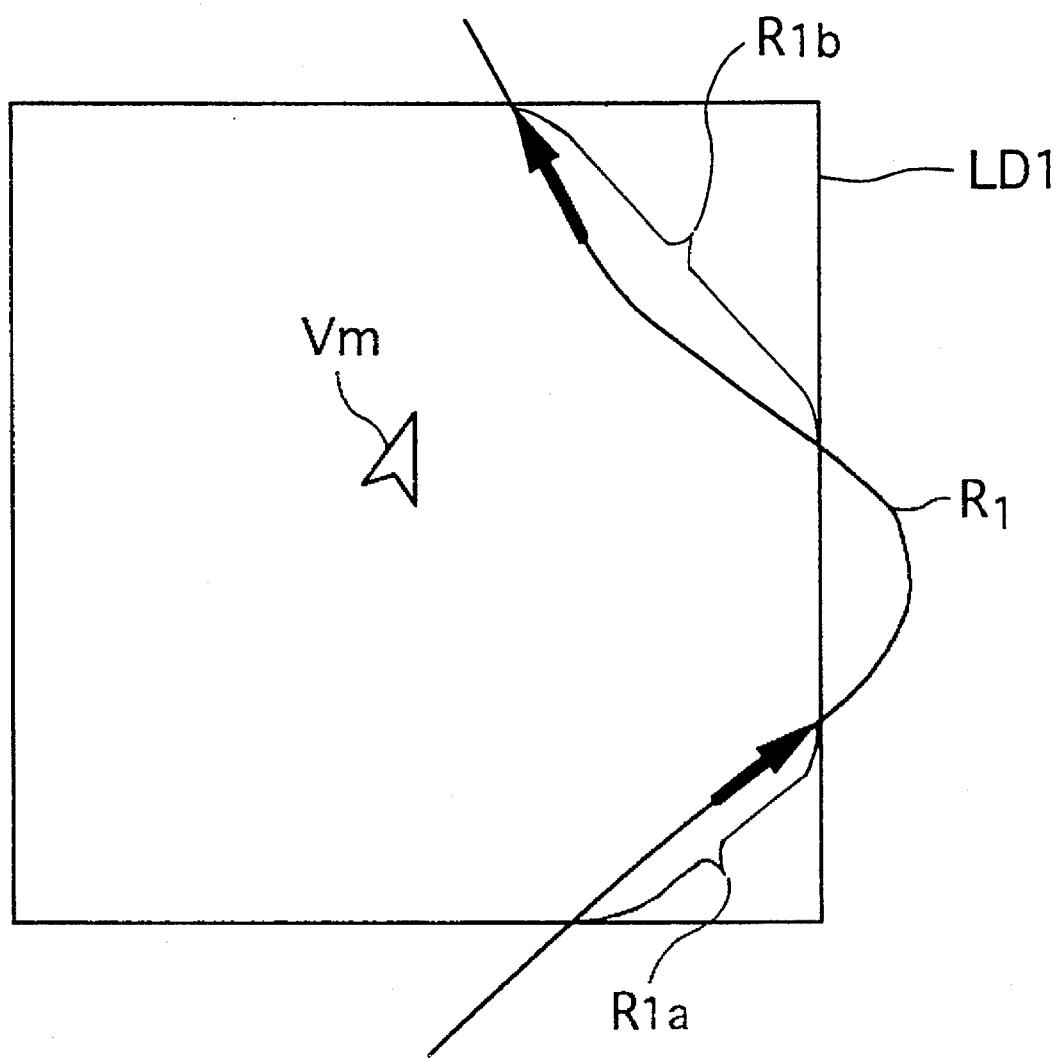
FIG. 9A is a view of the screen similar to FIG. 8 but showing the current position and the optimum travel route partly projected out of the screen.
Figure 9B:
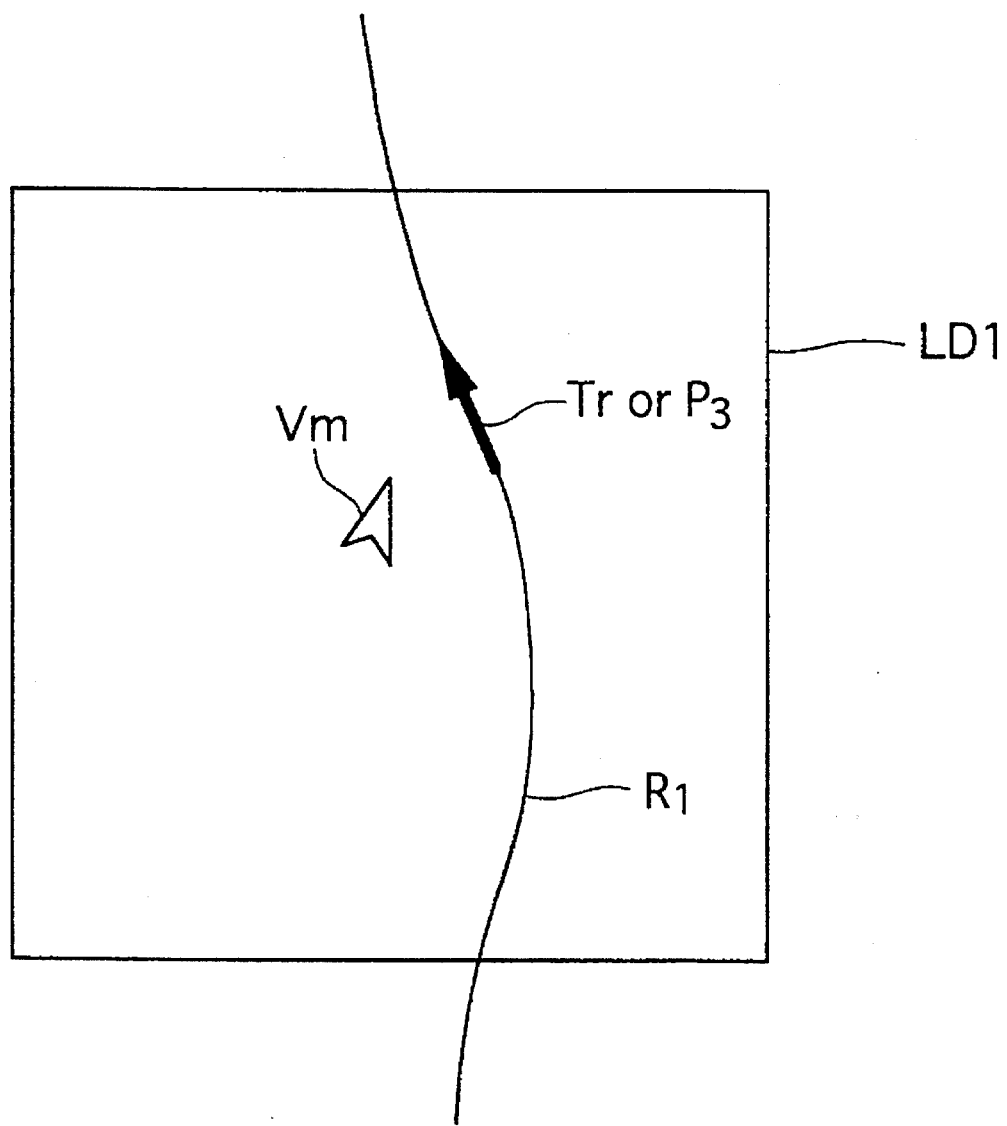
FIG. 9B is a view of the screen similar to FIG. 8 but showing a transitional place in addition to the optimum travel route and the current position.
Figure 9C:
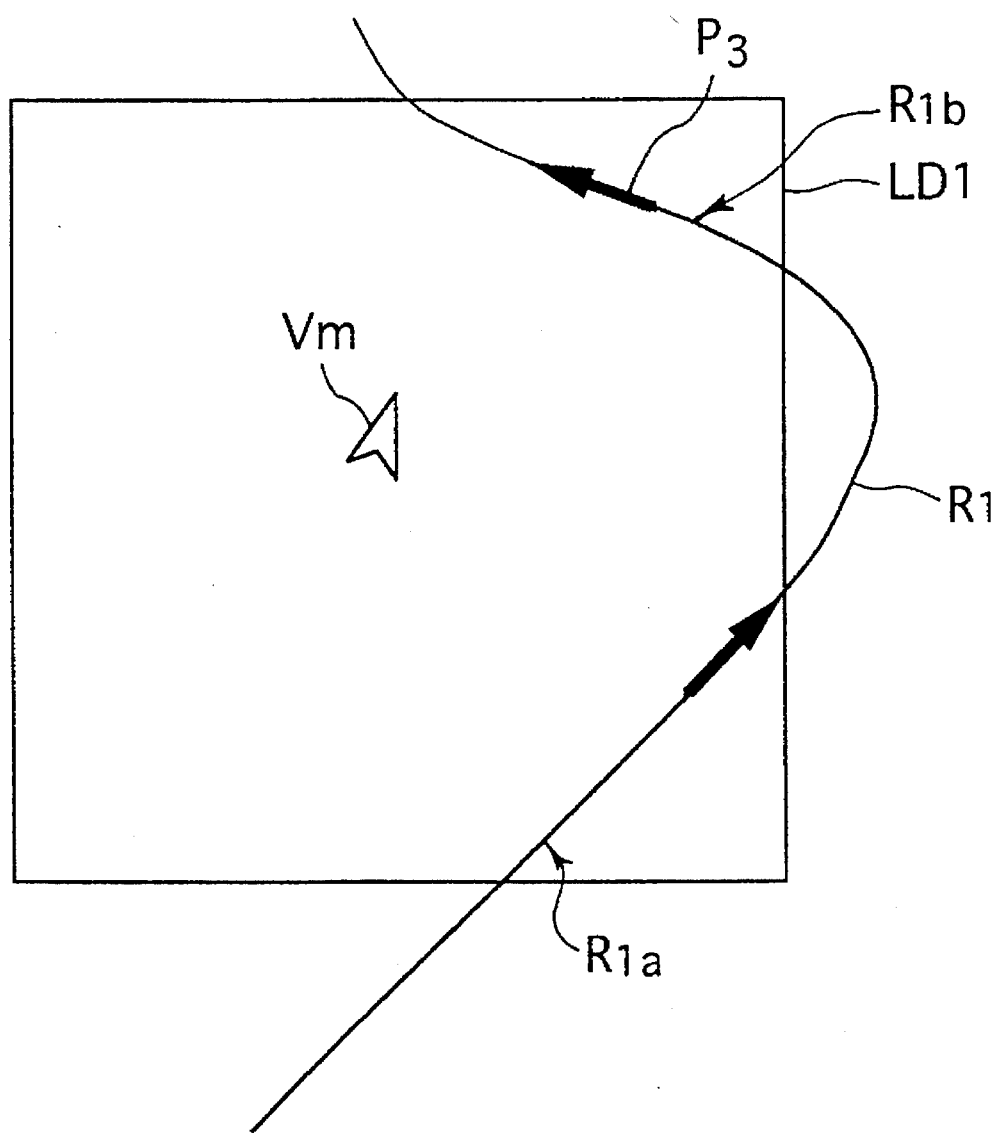
FIG. 9C is a view of the screen similar to FIG. 8 but showing the current position, the transitional place and the optimum travel route partly projected out of the screen.
Figure 10:
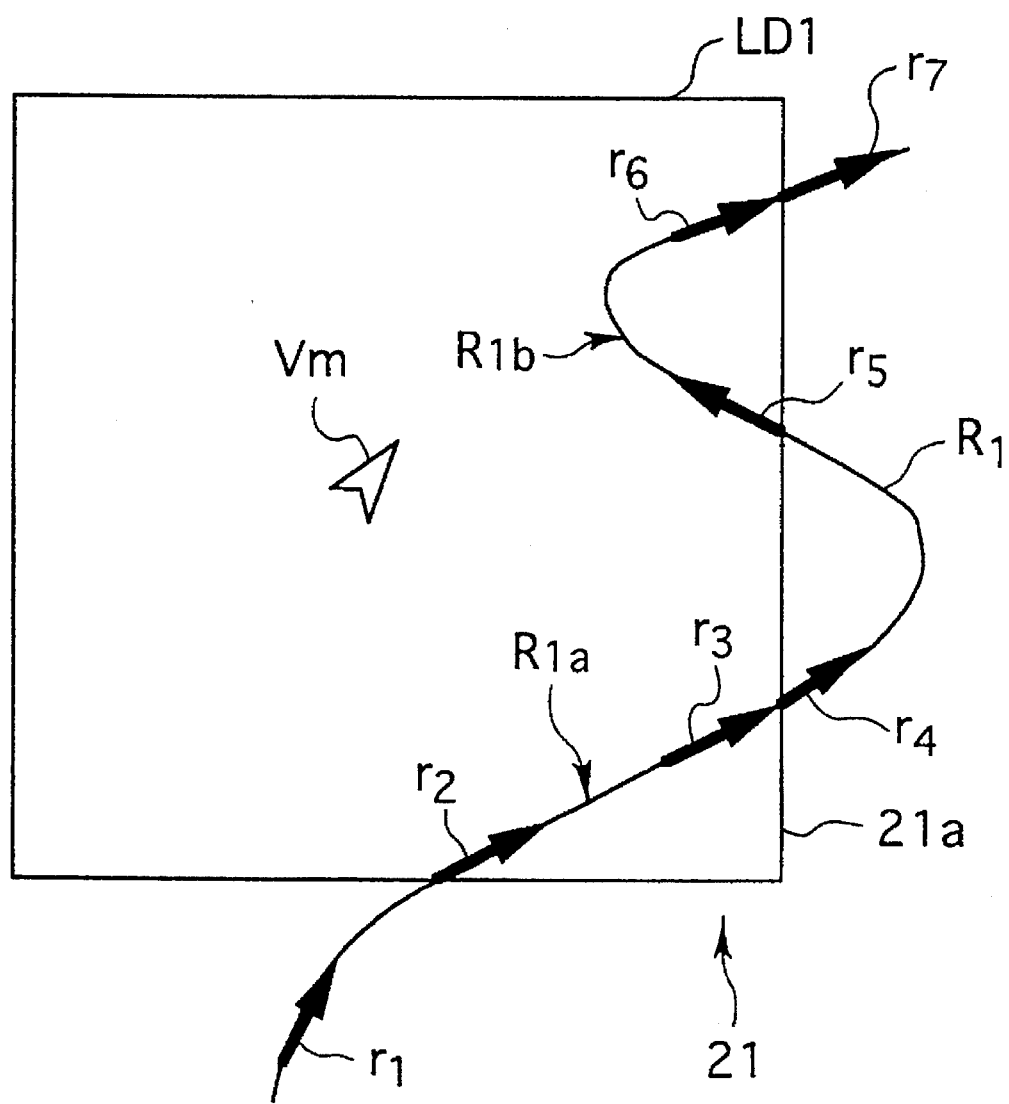
FIG. 10 is a view of the screen similar to FIG. 8 but showing the current position and the optimum travel route having optimum travel route segments partly projected out of the screen.

The initial optimum travel route may be sectioned by the CPU 41 of the navigation control unit 40 to have a plurality of initial optimum travel route segments in a predetermined display area surrounded by a closed boundary as shown in each of FIGS. 8 to 10. In FIG. 10, the initial optimum travel route R1 is sectioned by a boundary LD1 to have a pair of fragmental portions R1a and R1b which include one or more links representative of initial optimum travel route segments $r_2$, $r_3$, $r_5$ and $r_6$. In this case, the navigation control unit 40 is programmed to functions as route calculating means for calculating route cost values of a plurality of provisional optimum travel routes based on the link cost data and position data of the leading route end junction Pj on the initial optimum travel route R1. Each of the provisional optimum travel routes is traced by return travel roads off the first optimum travel roads and having the vehicle travel to the first optimum travel route segments from the current position P2 of the vehicle with a shortest driving time interval. The provisional optimum travel routes have respective return travel routes each having a leading route end junction connected to each of the initial optimum travel route segments $r_2$, $r_3$, $r_5$ and $r_6$ and a trailing end point representative of the current position P2 of the vehicle. The leading route end junctions of the return travel routes are representative of road junctions formed by the initial optimum travel roads and the provisional optimum travel roads crossed with each other. The navigation control unit 40 is programmed to function as optimum travel route selecting means for selecting one of the second optimum travel routes as an additional optimum travel route R2 to be displayed on the screen 21a of the displaying unit 21 from the provisional optimum travel routes on the basis of the link cost data of the route network data and the route cost values of the second optimum travel routes.

The navigation control unit 40 furthermore functions as initial optimum route deleting means for deleting the initial optimum travel route between the starting point P1 of the initial optimum travel route R1 and the leading route end junction Pj of the additional optimum travel route R2 when the optimum travel route R2 is displayed by the road map displaying unit 21. Each of FIGS. 13A and 13B illustrates part of the screen 21a of the displaying unit 21 showing the initial optimum travel route R1 and the additional optimum travel route R2 with the nodes indicated by circles and the links indicated by broken lines. The nodes includes a proximity node Np positioned on the initial optimum travel route R1 and in close proximity of the current position P2, i.e., the trailing end point of the return travel route R21 of the additional optimum travel route R2. In FIG. 13B, the initial optimum travel route R1 is partly eliminated although the circles indicative of the nodes, which are appear on the screen 21a of the displaying unit 21, are drawn FIG. 13B.

The operation of the vehicle navigation apparatus will now be described hereinlater.

The vehicle driver needs navigation information while driving his or her car in traffic-jammed areas and in the event that he or she is unfamiliar in the road maps around which his or her car is traveling. Such navigation information is indicated in FIGS. 1, 3 and 4 as including the road maps indicative of the travel roads $r_s$, the starting position P1, current position P2 and destination P3 of the vehicle, the initial optimum travel route R1 traced by the optimum travel roads and having the vehicle travel to the destination P3 from the starting position P1 of the vehicle with a shortest driving time interval. FIGS. 1A, 1B and 1C show road maps respectively having different reduction scales. The road map shown in FIG. 1A to have a small scale is referred to as a wide range road map, the road map shown in FIG. 1B to have an intermediate scale is referred to as an intermediate range road map, and the road map shown in FIG. 1C to have a large scale is referred to as a narrow range road map. In this instance, only three ranges of road maps are available for facilitating to understand the present invention, however, more than three ranges of road maps can be available for vehicle navigation apparatuses put on market.

The vehicle navigation apparatus is initialized simultaneously with the start of engine for the vehicle to have the road map memories of the DRAM 43 of the navigation control unit 40 loaded with the route network data for the current position P2 of the vehicle and to have the screen 21a of the displaying unit 21 display the pictorial information for setting the destination of the vehicle.

Figure 17:
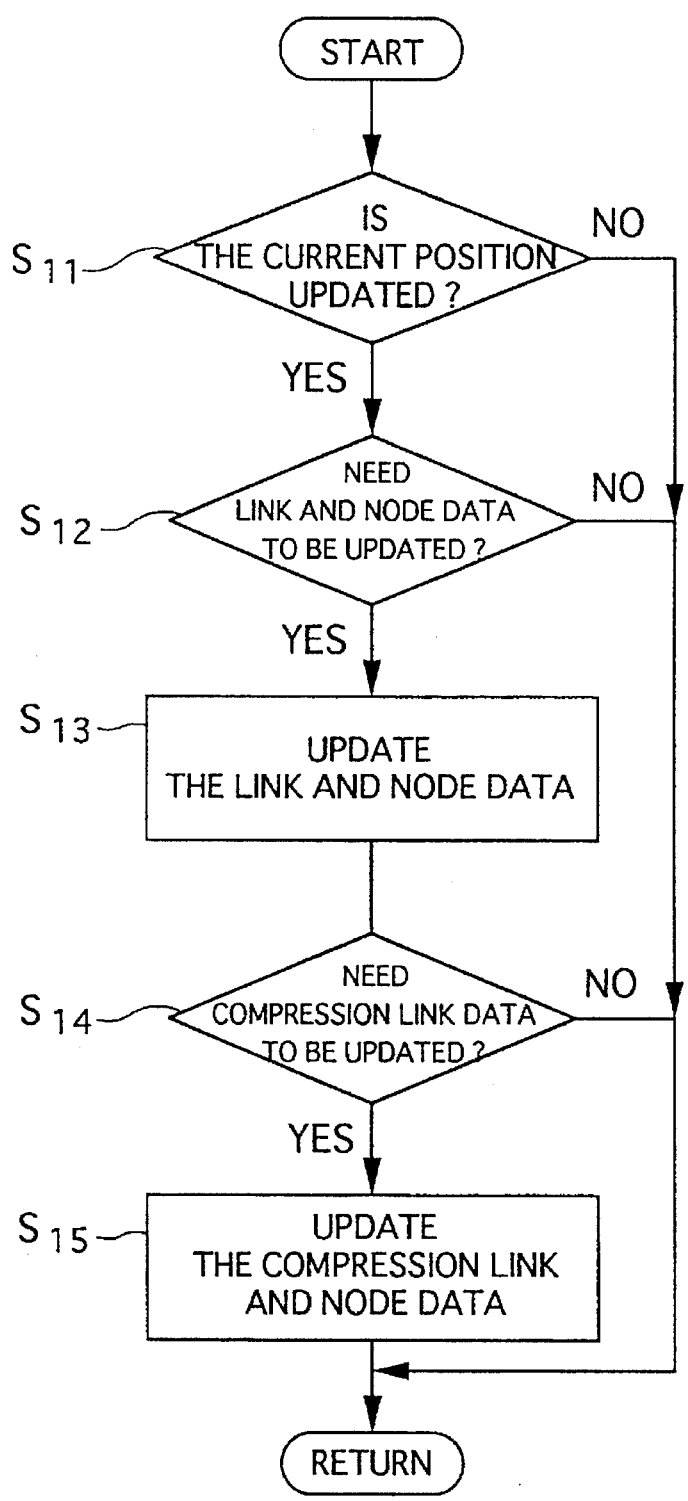
FIG. 17 is a flow chart of the sub-routine process performed within the data loading process performed by the navigation control unit.

The data loading process is performed in accordance with the process shown in FIG. 17.

S11: Judging on whether the current position data are updated

In the loading process, the navigation control unit 40 is operated at the step S11 to judge on whether or not the data of the current position P2 are updated by the CPU 41 of the navigation control unit 40.

S12: Judging on the need of updating the link and node data for the current position with the narrow range road map data If the navigation control unit 40 judges that the data of the current position P2 are updated by the CPU 41 of the navigation control unit 40 at the step S11, the navigation control unit 40 is operated at the step S12 to judge on the need of updating the link and node data for the current position P2 with the narrow range road map data based on the updated current position of the vehicle. The judgment herein made is represented by the legend "YES" at the step S11 in FIG. 17.

S13: Updating the link and node data for the current position of the vehicle with the narrow range road map data If the navigation control unit 40 judges that the link and node data for the current position P2 need to be updated with the narrow range road map data based on the updated current position of the vehicle, the navigation control unit 40 is operated at the step S13 to have the DRAM 43 of the navigation control unit 40 loaded with the updated link and node data for the narrow range road map data. The judgment herein made is represented by the legend "YES" at the step S12 in FIG. 17.

S14: Judging on the need of updating the compression link and node data

The navigation control unit 40 is then operated at the step S14 to judge on the need of updating the compression link data for the current position P2 based on the updated current position of the vehicle with the wide range road map data.

S15: Updating the compression link and node data for the current position

If the navigation control unit 40 judges that the compression link data for the current position P2 need to be updated on the basis of the updated current position of the vehicle, the navigation control unit 40 is operated at the step S15 to have the DRAM 43 of the navigation control unit 40 loaded with the updated compression link and node data with the wide range road map data. The judgment herein made is represented by the legend "YES" at the step S14 in FIG. 17.

Figure 7:
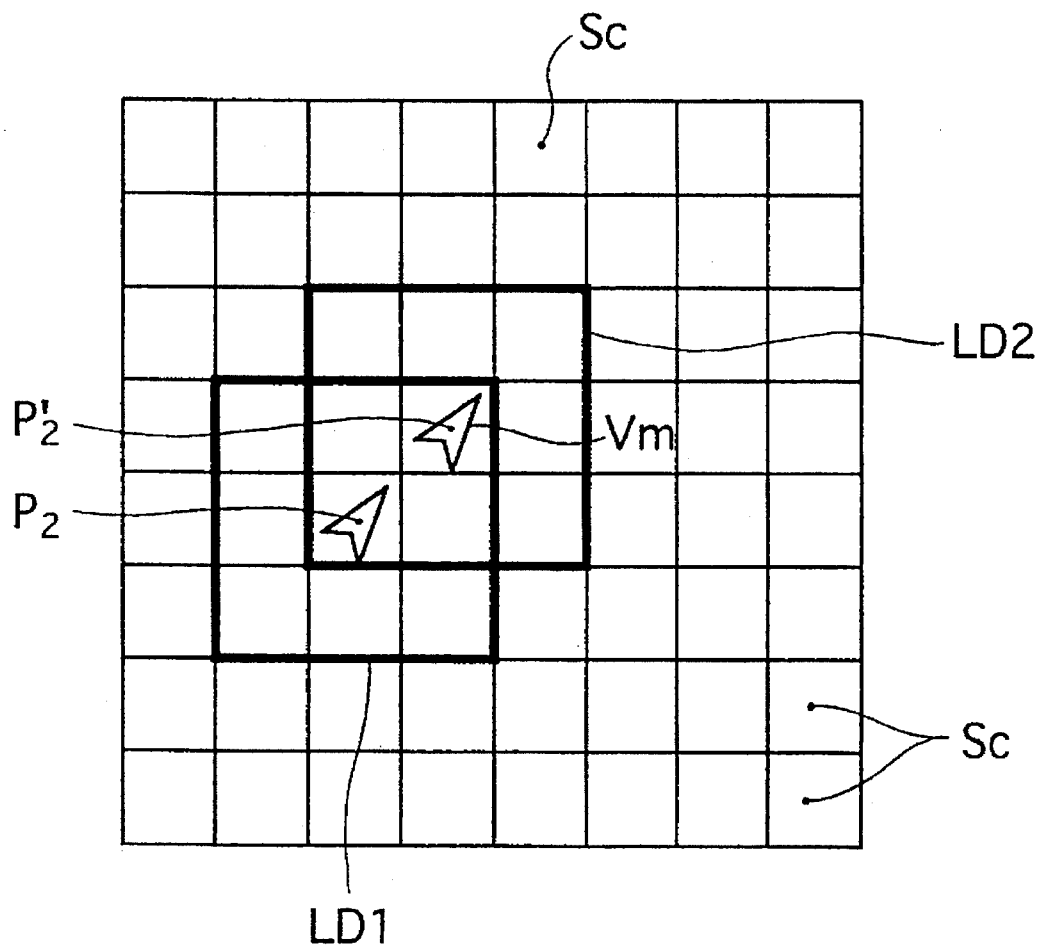
FIG. 7 is an explanatory illustration of road map data for facilitating to understand the process of updating the compression link data and shows a wide range road map which is divided into a plurality of mesh sections.

For facilitating to understand the process for updating the compression link data, there will be explained about road map data blocks forming part of the route network data with reference to FIG. 7 which shows a wide range road map divided into a plurality of mesh sections. In the case that the road map memories of the DRAM 43 of the navigation control unit 40 are adapted to store the compression link data block for a mesh section group consisting of nine mesh sections, the compression link data block for a mesh section group LD1 is replaced as the data stored in the DRAM 43 by the compression link data block for an adjacent mesh section group LD2 to move the road map displayed on the screen 21a of the displaying unit 21 when the current position P2 is updated to assume a position P2' by the CPU 41 of the navigation control unit 40.

If, on the other hand, the navigation control unit 40 judges "NO" at each of the steps S11, S12 and S14, that this subroutine process is finished to return the main routine process.

The driver sometimes encounters troublesome travel roads which are to possibly disturb him or her while driving to the destination at a shortest driving time interval through the initial optimum travel route. The travel roads may be under construction, intricate with many other small and large roads, regulated for traffic by police and so forth. In this case, the driver is forced to change the troublesome travel roads to additional travel roads off the travel roads of the initial optimum travel route. Meanwhile, the driver frequently travels on wrong roads off the travel roads of the initial optimum travel route partly because he or she is quite strange in the area where he or she is traveling and partly because the current position of the vehicle is on the roads intricate with many small and large roads.

When the driver becomes aware of traveling on the wrong roads, he or she has to return his or her car to the travel roads of optimum travel route. In this case, the vehicle navigation apparatus is required to produce an additional optimum travel route traced by the additional optimum travel roads off the optimum travel roads and having the vehicle travel to the destination from the current position of the vehicle with a shortest driving time interval.

As shown in FIGS. 4A and 4B, the additional optimum travel route R2 includes the return travel route R21 having a leading route end junction Pj connected to the initial optimum travel route R1 and a trailing end point representative of the current position P2 of the vehicle, and part 22 of the previous optimum travel route R1 extending between the destination node P3 and the leading route end junction Pj of the return travel route R21. The leading route end junction Pj is representative of a road junction formed by the optimum travel roads and the additional optimum travel roads crossed with each other.

When the driver becomes aware of traveling on the wrong roads, he or she operates the remote control key unit 51 of the data inputting means 5 to display the additional optimum travel route R2 on the screen 21a of the displaying unit 21. At the same time, the navigation control unit 40 is operated to compute the return travel route R21 of the additional optimum travel route R2.

Figure 16:
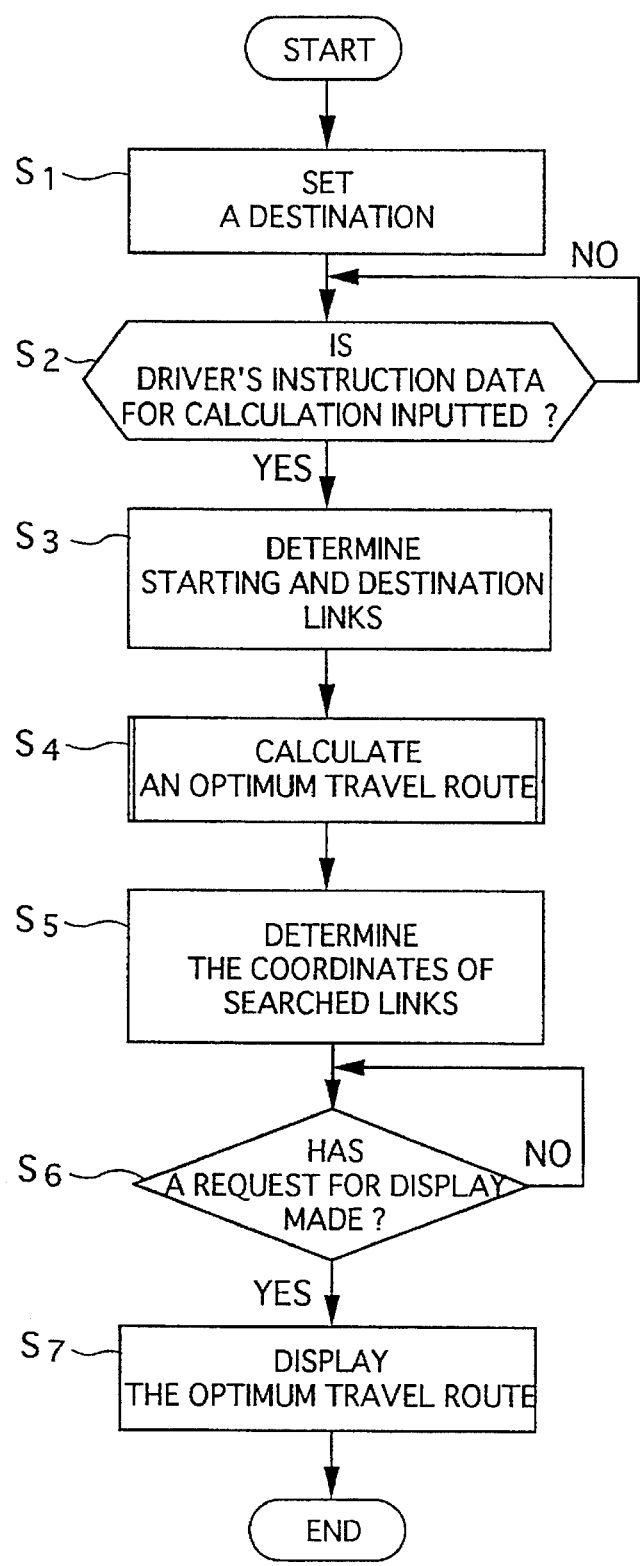
FIG. 16 is a flow chart of the operation of calculating and displaying the optimum travel route.

FIG. 16 shows a flow chart of the operation of calculating and displaying the optimum travel route.

S1: Setting the destination

The navigation control unit 40 is firstly operated at the step S1 to have the screen 21a of the displaying unit 21 display a pictorial information for setting a destination of the vehicle. The data inputting means 5 is then manipulated by the vehicle driver to set the destination P3 where the vehicle driver wants to reach. The starting position P1 and the destination P3 are displayed on the screen 21a of the displaying unit 21 in tandem with the road maps represented in the wide range scale when the vehicle driver requests to display them. As per the driver's request, the scale of the road maps is changed with the remote control key unit 51. One of the keys of the remote control key unit 51 may be used as a route setting key which is manipulated by the vehicle driver to set the destination of the vehicle. In this way, the driver's instruction data for the destination of the vehicle is inputted to the navigation control unit 40 by the data inputting means 5.

S2: Checking the driver's instruction to calculate an initial optimum travel route The data inputting means 5 is then operated at the step S2 by the vehicle driver to have the first optimum travel route computing means of the navigation control unit 40 compute the initial optimum travel route R1 along which the vehicle driver wants to travel to the destination P3. In this manner, the driver's instruction data for route computing is inputted to the data processing means 4 by the data inputting means 5. At this time, the navigation control unit 40 is operated to judge on whether or not the data inputting means 5 is operated by the vehicle driver to calculate an optimum travel route R1. If the navigation control unit 40 judges that the data inputting means 5 is not operated by the vehicle driver for the initial optimum travel route R1, the navigation control unit 40 is again operated to determine on whether or not the data inputting means 5 is operated by the vehicle driver for the initial optimum travel route R1. The judgment herein made is represented by the legend "NO" at the step S2 in FIG. 16.

S3: Determination of the starting and destination links

If, on the other hand, the navigation control unit 40 judges that the data inputting means 5 is operated by the vehicle driver for the initial optimum travel route R1, the navigation control unit 40 is operated to determine the starting and destination links, the starting and destination nodes on the basis of the route network data stored by the memory control unit 12, the data of the current position of the vehicle detected by the current position detecting unit 34, and the data inputted by the data inputting means 5 at the step S3. The judgment herein made is represented by the legend "YES" at the step S2 in FIG. 16.

S4: Calculation of the initial optimum travel route

The navigation control unit 40 is then operated at the step S4 to have the CPU 41 of the navigation control unit 40 compute the initial optimum travel route R1 by searching the links from the starting node to the destination node on the basis of the link cost data of the route network data and the current position of the vehicle. The calculation process is performed by the CPU 41 of the navigation control unit 40 in accordance with the calculating process such as for example the stochastic route searching method using the Dijkstra's method or the potential method. In the calculating process, the navigation control unit 40 is operated to search each of the links forming route network between the starting node and the destination node, and to add the link cost values of the links from the starting node to each node to calculate total link cost values of travel routes of the route network consisting of the links called "link tree". The optimum travel route R1 is selected from the travel routes as one travel route having a total link cost value lowest within the total link cost values of the travel routes in the route network between the starting node and the destination node. The process for computing the initial optimum travel route R1 is described hereinlater in detail.

S5: Determination of the coordinates of the searched links on the screen of the displaying unit The navigation control unit 40 is then operated to have the CPU 41 of the navigation control unit 40 determine the coordinates of the searched links on the screen 21a of the displaying unit 21 at the step S5.

S6: Checking the driver's instruction to display the road map on the screen of the displaying unit The data inputting means 5 is operated at the step S6 by the vehicle driver for the kind of the road maps which the vehicle driver designates. The navigation control unit 40 is operated on the basis of the signal produced by the data inputting means 5 to determine on whether or not the data inputting means 5 is operated by the vehicle driver for the driver's designated kind of the road maps. Similarly, the driver's instruction data for the kind of the road maps is inputted to the navigation control unit 40 by the data inputting means 5. If the navigation control unit 40 then judges that the data inputting means 5 is not operated by the vehicle driver for the kind of the road maps, the navigation control unit 40 is again operated on the basis of the signal produced by the data inputting means 5 to determine on whether or not the data inputting means 5 is operated by the vehicle driver for the kind of the road maps. The judgment herein made is represented by the legend "NO" at the step S6 in FIG. 16.

S7: Displaying the initial optimum travel route R1 on the screen of the displaying unit If, on the other hand, the navigation control unit 40 judges that the data inputting means 5 is operated by the vehicle driver for the kind of the road maps, the navigation control unit 40 is operated to have the initial optimum travel route R1 displayed on the screen 21a of the displaying unit 21 on the basis of the coordinates of the links of the initial optimum travel route R1 at the step S7. The judgment herein made is represented by the legend "YES" at the step S6 in FIG. 16.

FIGS. 8 to 10 respectively show different road maps each including a vehicle symbol mark Vm of the vehicle and the initial optimum travel route R1 on part of the screen 21a which corresponds to the mesh section group of the road map. In each of FIGS. 8 to 10, the vehicle symbol mark Vm indicates a screen position away from the initial optimum travel route R1 on the screen 21a of the displaying unit 21.

When the vehicle driver becomes aware of the symbol mark Vm indicating the screen position away from the initial optimum travel route R1 while driving the vehicle, the vehicle driver has to return his or her vehicle to the travel roads of initial optimum travel route R1. In this case, the vehicle driver is promptly required to operate the data inputting means 5 to have the vehicle navigation apparatus produce the additional optimum travel route R2.

Figure 18:
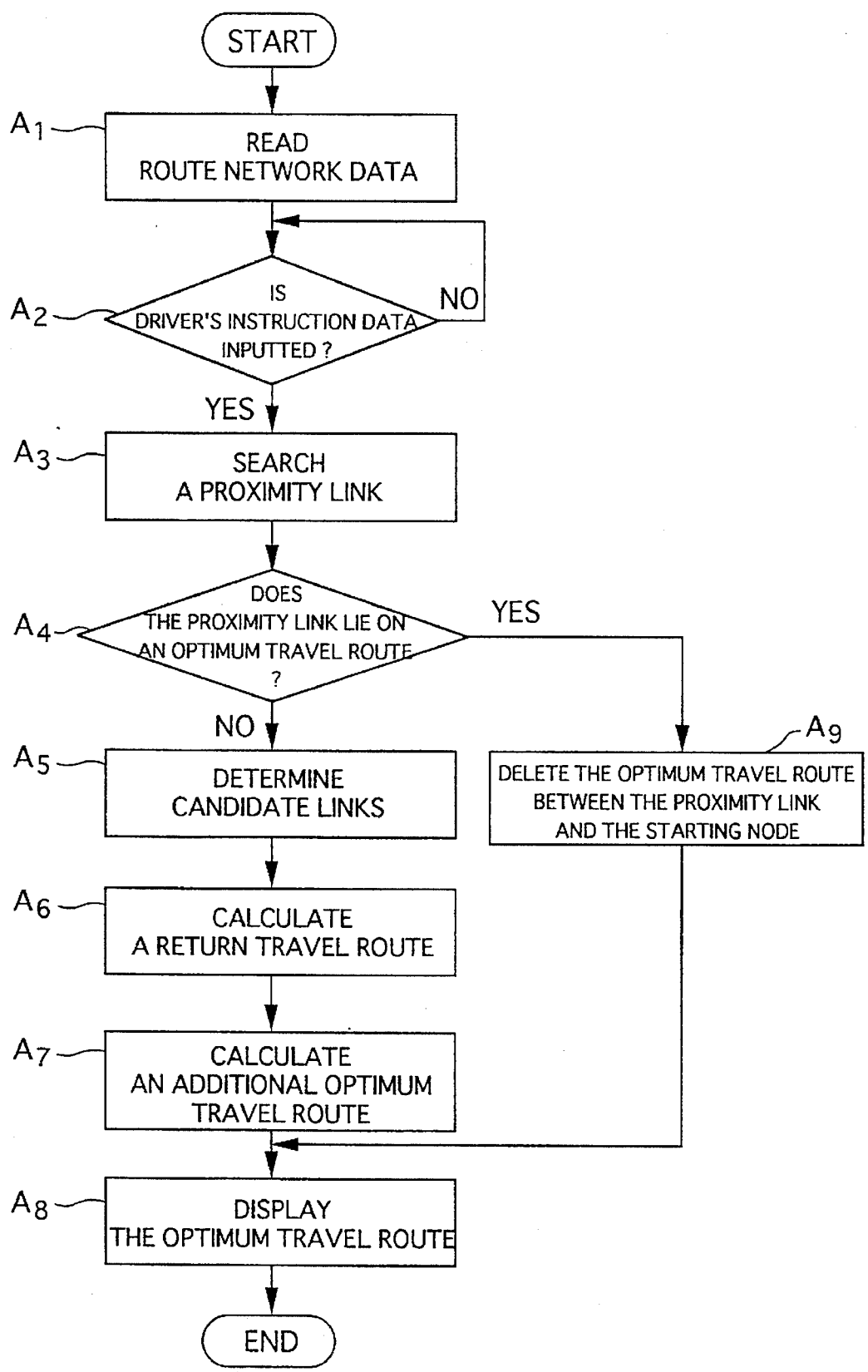
FIG. 18 is a flow chart of the operation of calculating and displaying the additional optimum travel route.

FIG. 18 shows a flow chart of the operation of calculating and displaying the additional optimum travel route.

A1: Reading the route network data for the current position of the vehicle

The disk memory control unit 12 is firstly operated to read the route network data segments of the route network data for the current position P2 of the vehicle. The route network data segments of the route network data are indicative of one of the road maps showing the current position P2 of the vehicle, the link data of the links within the narrow range map area around the current position P2 and the link cost data of the links. The disk memory control unit 12 has the DRAM 43 of the navigation control unit 40 loaded with the route network data read by the disk memory device 11 to repeatedly update the route network data stored in the DRAM 43 of the navigation control unit 40 on the basis of the data of the current position of the vehicle. At this time, the CPU 41 of the navigation control unit 40 is operated to read part of the loaded route network data to partly store the route network data in the SRAM 42 of the navigation control unit 40.

A2: Checking the additional optimum travel route

The data inputting means 5 is then operated at the step A2 by the vehicle driver for the additional optimum travel route R2 along which the vehicle driver wants to travel to the destination P3. At this time, the navigation control unit 40 is operated to determine on whether or not the data inputting means 5 is operated by the vehicle driver for the additional optimum travel route R2. In this way, the driver's instruction data for the additional optimum travel route is inputted to the navigation control unit 40 of the data processing means 4 by the data inputting means 5. If the navigation control unit 40 then judges that the data inputting means 5 is not operated by the vehicle driver for the additional optimum travel route R2, the navigation control unit 40 is again operated to judge on whether or not the data inputting means 5 is operated by the vehicle driver for the additional optimum travel route R2. The judgment herein made is represented by the legend "NO" at the step A2 in FIG. 18.

A3: Searching a proximity link closest to the current position of the vehicle

Figure 11:
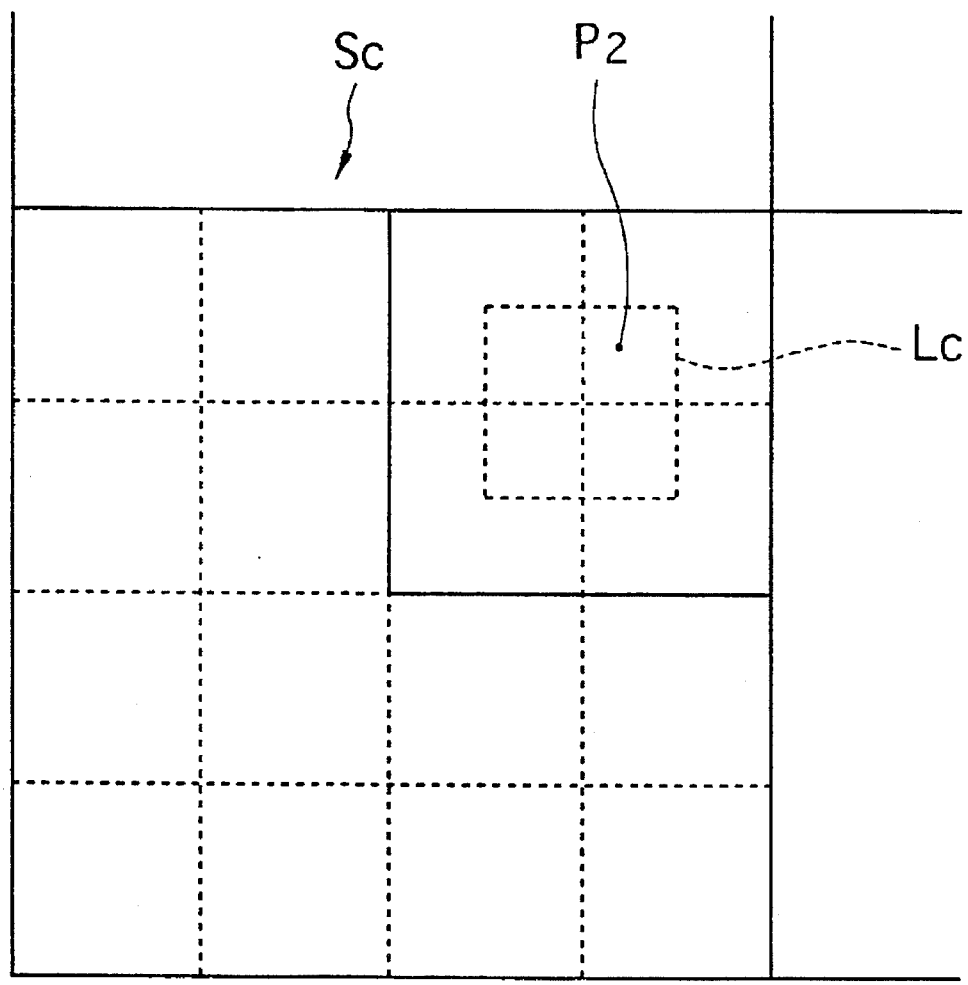
FIG. 11 is a view of a data block forming one meshed section of the road map data shown FIG. 7.
Figure 12:
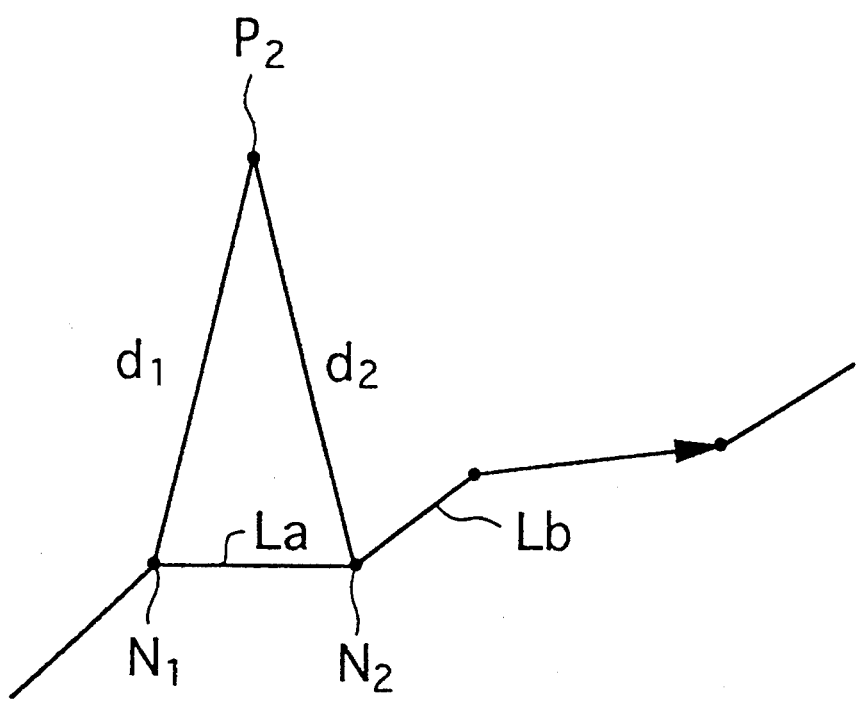
FIG. 12 is an explanatory illustration of the process for calculating the distance between the current position of the vehicle and the position representative of a position on a link closet to the node representative of the current position.

The navigation control unit 40 is then operated at the step A3 to search a proximity link closest to the node representative of the current position of the vehicle in a data block Lc indicated in FIG. 11, which is stored in the DRAM 43 of the navigation control unit 40 and corresponds with a predetermined area, e.g., a square section 200 [m] by 200 [m]. The data block Lc is indicative of one of a plurality of minor mesh sections which includes the current position P2 of the vehicle. Each of the mesh sections Sc indicated in FIG. 7 is divided into sixteen minor mesh sections. As shown in FIG. 12, the distance between the current position P2 of the vehicle and the position representative of a position on each of the links La, Lb close to the node representative of the current position in a direction perpendicular to the link La is calculated on the basis of the distances d1 and d2 between the current position P2 and the leading and trailing nodes N1 and N2 of the link La.

A4: Judging on the existence of the proximity link on or off the initial optimum travel route The navigation control unit 40 is then operated at the step A4 to have the judging means of the navigation control unit 40 judge on whether or not the proximity link is positioned and extends on the initial optimum travel route R1. If the navigation control unit 40 then judges that the proximity link is positioned on the initial optimum travel route R1, the navigation control unit 40 is operated at the step A9 to have the additional optimum travel route computing means of the navigation control unit 40 not compute the return travel route R21 of the additional optimum travel route R2 and to delete the initial optimum travel route R1 between the starting node and the node representative of the current position or the proximity link from the screen 21a of the displaying unit 21. The judgment herein made is represented by the legend "YES" at the step A4 in FIG. 18.

Figure 19A:
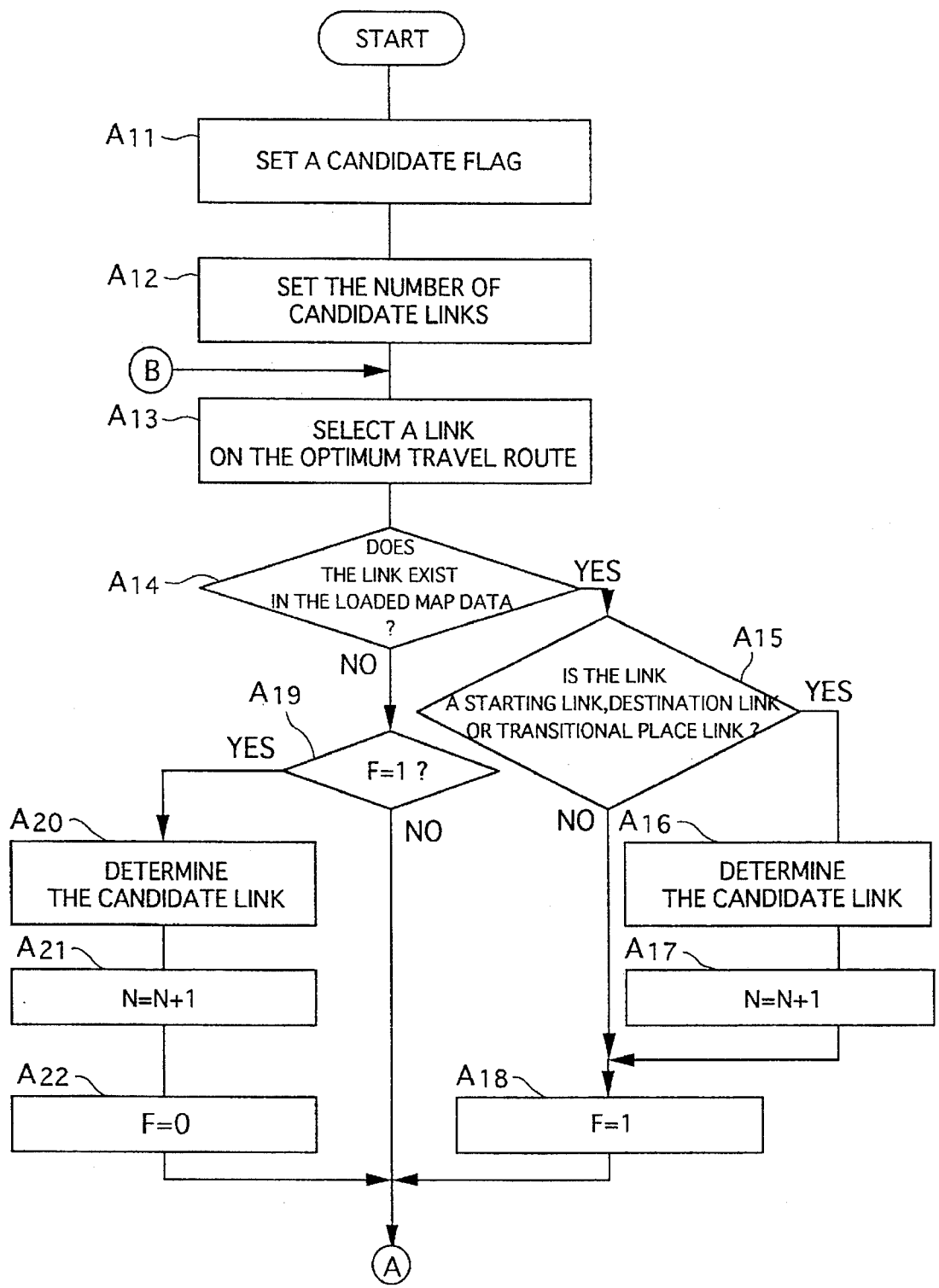
FIG. 19A is a flow chart of part of the sub-routine process performed within the candidate link determining process of determining the candidate links by the navigation control unit.
Figure 19B:
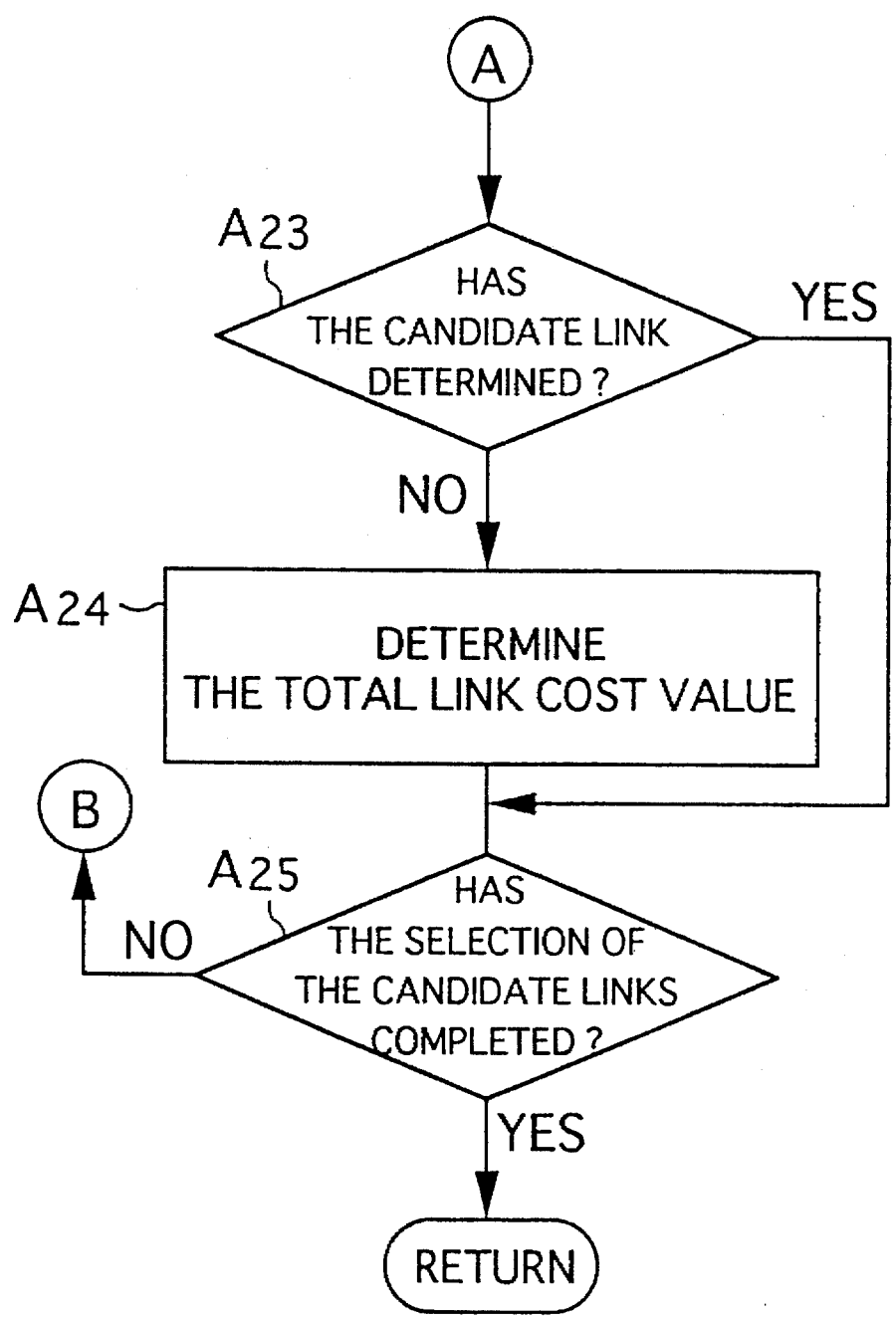
FIG. 19B is a flow chart of the remaining part of the sub-routine process performed continuously with the sub-routine process shown FIG. 19A.

A5: Determining candidate links for a junction link to be linked with the leading route end junction of the return travel route If, on the other hand, the navigation control unit 40 then judges that the proximity link is not positioned on the initial optimum travel route R1, the CPU 41 of the navigation control unit 40 is then operated to determine candidate links for a junction link Lj to be linked with the leading route end junction Pj of the return travel route R21. The judgment herein made is represented by the legend "NO" at the step A4 in FIG. 16. The candidate links between the destination node and transit links representative of transit travel roads through which the vehicle has passed are specified and selected from the links on the initial optimum travel route R1. The judgment on how to determine the candidate links will become apparent as the description proceeds in accordance with the flow chart shown in FIGS. 19A and 19B.

A6: Calculation of the return travel route

The navigation control unit 40 is then operated at the step A6 to have the second optimum travel route computing means of the navigation control unit 40 compute the return travel route R21 of the additional optimum travel route R2 on the basis of the link cost data of the route network data and the current position of the vehicle.

A7: Calculation of the additional optimum travel route

The navigation control unit 40 is then operated at the step A7 to have the second optimum travel route computing means of the navigation control unit 40 compute the coordinates of the additional optimum travel route on the basis of the coordinates of the return travel route R21 and the initial optimum travel route R1.

A8: Displaying the initial optimum travel route on the screen of the displaying unit The navigation control unit 40 is then operated at the step A8 to have the display control unit 22 operated to cause the screen 21a of the displaying unit 21 to display the additional optimum travel route R2 consisting of the return travel route R21 and the travel route on the initial optimum travel route R1 between the destination node and the node representative of the proximity link as shown in FIG. 13B.

The following description will be made about the judgment on how to determine the candidate links with reference to FIG. 19.

A11: Setting a candidate link flag

The navigation control unit 40 is firstly operated to have the CPU 41 of the navigation control unit 40 set a candidate link flag F at "0". The candidate link flag F is updated and determined as "1" or "0" based on whether or not the candidate links exist between the destination node and the transit links representative of the transit travel roads through which the vehicle has passed. The existence of each of candidate links is determined on the basis of the route network data stored in the DRAM 43 of the navigation control unit 40. When the candidate links are on the initial optimum travel route R1 between the destination node and the transit links, the candidate link flag F is set at "1". When, on the other hand, no links are on the optimum travel route between the destination node and the transit links, the candidate link flag F is set at "0".

A12: Setting the number of the candidate links

The navigation control unit 40 is secondly operated to have the CPU 41 of the navigation control unit 40 set the number of the candidate links at "0".

A13: Selecting the link from the initial optimum travel route in the route network data stored in the DRAM The links are selected one by one from the initial optimum travel route R1 in the route network data stored in the DRAM 43 of the navigation control unit 40. In the case that the initial optimum travel route R1 is divided into a plurality of fragmental portions forming the initial optimum travel route segments within the screen 21a of the displaying unit 21 as shown in FIG. 10, the links representative of the optimum travel route segments $r_2$, $r_3$, $r_5$ and $r_6$ are selected from the links representative of the travel roads within the 19 screen 21a of the displaying unit 21.

A14: Judging on the existence of the selected link in the loaded route network data The navigation control unit 40 is then operated to judge on whether or not the selected link is included in the route network data stored in the road map memories of the DRAM 43 of the navigation control unit 40 at the step A14. In other words, the navigation control unit 40 judges on whether the selected link is on or off the screen 21a of the displaying unit 21. When the navigation control unit 40 judges that the selected link is on the screen 21a of the displaying unit 21, the step A14 advances to the step A15. The judgment herein made is represented by the legend "YES" at the step A14 in FIG. 19A.

A15: Judgment on the selected link

The navigation control unit 40 is then operated to judge on whether the selected link is coincided with any one of the starting link P1, the destination link P3 and the transitional place links Tr at the step A15. If the navigation control unit 40 judges that the selected link is not coincided with any one of the starting link P1, the destination link P3 and the transitional place links Tr, the step A15 advances to the step A18. The judgment herein made is represented by the legend "NO" at the step A14 in FIG. 19A.

A16: Determination of the candidate link

If, on the other hand, the navigation control unit 40 judges that the selected link is coincided with any one of the starting link P1, the destination link P3 and the transitional place links Tr, the coincided link is determined as the candidate link at the step A16. The judgment herein made is represented by the legend "YES" at the step A15 in FIG. 19A.

A17: Updating the number of the candidate links

The navigation control unit 40 is then operated to update the number of the candidate links by adding "1" to the existing value "N" at the step A17. As a result, the number of the candidate links is counted by the CPU 41 of the navigation control unit 40 based on the route network data stored in the road map memories of the DRAM 43 of the navigation control unit 40.

A18: Updating the candidate link flag

The navigation control unit 40 is then operated to update the candidate link flag F at the step A18. The candidate link flag F is updated and set at "1" when the candidate link exists between the destination node and the transit links representative of the transit roads through which the vehicle has passed. The candidate link flag F is updated and set at "1" when the selected link is not coincided with any one of the starting link, the destination link and the transitional place links.

A19: Judgment on the candidate link flag F

When the selected link data is not included in the data stored in the road map memories of the DRAM 43 of the navigation control unit 40 loaded with the route network data to display the road map showing the current position on the screen 21a of the displaying unit 21, the navigation control unit 40 is operated at the step A19 to judge on whether the flag F is "1" or not.

A20: Determination of the candidate link

If the navigation control unit 40 judges that the flag F is "1", a link adjacent to the selected link on the initial optimum travel route R1 and existing on the screen 21a of the displaying unit 21 is determined as a candidate link at the step A20.

A21, A22: Updating the number of the candidate links and updating the candidate link flag The navigation control unit 40 is then operated to update the number of the candidate links by adding "1" to the existing value "N" at the step A21. The navigation control unit 40 is then operated to update the candidate link flag F at the step A22. The candidate link flag F is updated and set at "0" when the selected link data is not included in the route network data stored in the road map memories of the DRAM 43 of the navigation control unit 40.

A23: Judging the determination of the candidate link

The navigation control unit 40 is then operated to judge on whether or not the selected link is determined as the candidate link.

A24: Determining the total link cost value

The navigation control unit 40 is then operated to calculate and determine a total link cost value of the links between the destination node and the candidate link based on the route cost data of the provisional optimum travel routes from the current position P2 to the destination P3 of the vehicle through the candidate links on the screen 21a of the road map displaying means 20. The determination on the candidate link is made based on the link cost data of the route network data and the route cost values of the provisional optimum travel routes. The calculation of the route cost values of the second optimum travel routes by the navigation control unit 40 comprises the steps of totaling the link cost values of the links on each of the return travel routes, and respectively adding to the totaled link cost values of the links on the return travel routes supplementary cost values different from one another. The supplementary cost values are respectively proportional to the link cost values of the links from the leading route end junctions of the return travel routes to the node representative of the destination P3 of the vehicle. In this case, the supplementary cost values are equal to the link cost values of the links from one of the first optimum travel route segments, for example the optimum travel route segment $R_6$, closest to the node representing the destination P3 of the vehicle to each of the leading route end junctions representative of the optimum travel route segments r2, r3 and r5 within the road map data block LD1 or LD2.

A25: Judging on whether or not the selection of the candidate links is completed The navigation control unit 40 is then operated to judge on whether or not the candidate links are completely selected from the route network data stored in the DRAM 43 of the navigation control unit 40. If the navigation control unit 40 judges that the candidate links are completely selected from the route network data in the DRAM 43 of the navigation control unit 40, the steps for determining the candidate links are completed. The judgment herein made is represented by the legend "YES" at the step A25 in FIG. 19B. If, on the other hand, the navigation control unit 40 judges that the candidate links are not completely selected from the route network data stored in the DRAM 43 of the navigation control unit 40, the step A25 advances to the step A13. The judgment herein made is represented by the legend "NO" at the step A25 in FIG. 19B. The previous operation of selecting the link and determining the candidate link is therefore repeated for all the links based on the loaded route network data stored in the DRAM 43 of the navigation control unit 40.

Figure 14:
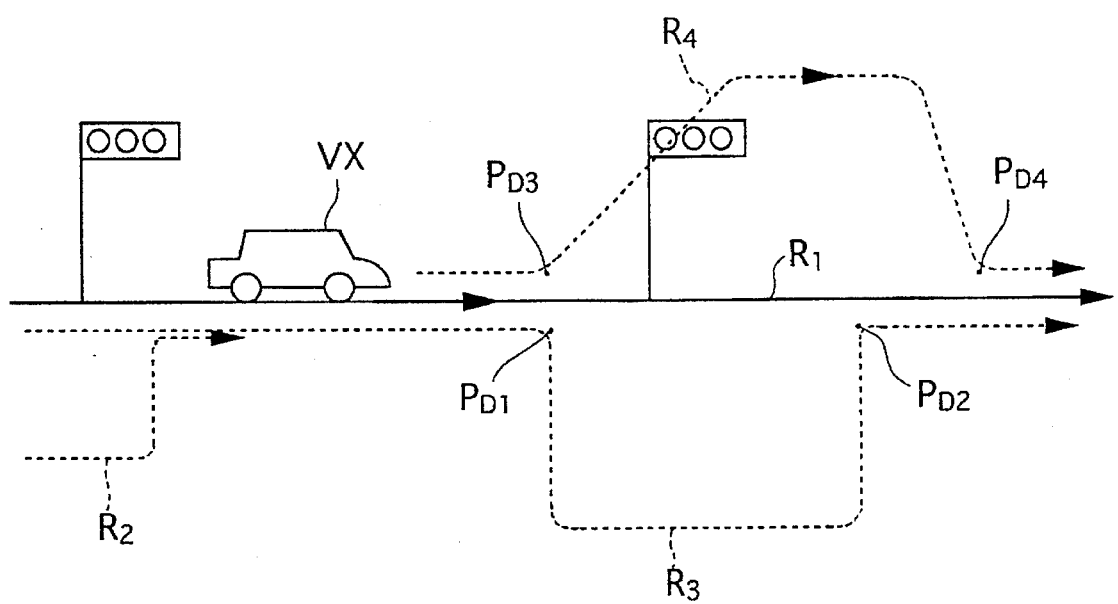
FIG. 14 is an explanatory illustration of detour travel routes traced by detour travel roads off the optimum travel roads.

On the other hand, the driver frequently obtains various traffic information about a traffic-jammed area, travel roads under construction, travel roads closed to traffic-jammed area and the like from a car radio or a television mounted on the vehicle while driving his or her vehicle. In this case, the driver may change travel route to avoid the troublesome travel roads through another travel route such as for example a detour travel route. As shown in FIG. 14, the detour travel routes R3 are traced by detour travel roads off the optimum travel roads and having the vehicle VX travel to the destination from the current position P2 of the vehicle with a shortest driving time interval. The detour travel route R3 has a detour starting point $P_{D1}$ representative of a road position of the vehicle where the vehicle VX starts to detour from the initial optimum travel route R1 and a detour ending point $P_{D2}$ representative of a road position where the vehicle returns to the initial optimum travel route R1.

The data processing means 4 is therefore adapted to process the route network data stored in the route network data storing means 1 and the position data detected by the vehicle position detecting means 3 to produce to the road map displaying means 2 navigation information data representing the road maps, the starting position, current position and destination of the vehicle, the initial and additional optimum travel route, and the detour travel route. The navigation information data is updated by the data processing means 4 on the basis of the current position of the vehicle VX in the road map displayed by the road map displaying means 2.

The navigation control unit 40 of the vehicle navigation apparatus further comprises detour travel route computing means for computing the detour travel route R3 on the basis of the link cost data having the link cost values risen between the detour starting point $P_{D1}$ and the detour ending point $P_{D2}$ when the driver's instruction data for the destination of the vehicle is inputted by the data inputting means 5, and route judging means for judging on whether the first optimum travel route computing means or the detour travel route computing means is to calculate the initial optimum travel route R1 or the detour travel route R3 on the basis of the driver's instruction data of the initial optimum travel route R1 or the detour travel route setting data inputted to the data processing means 4 by the data inputting means 5.

Figure 15:
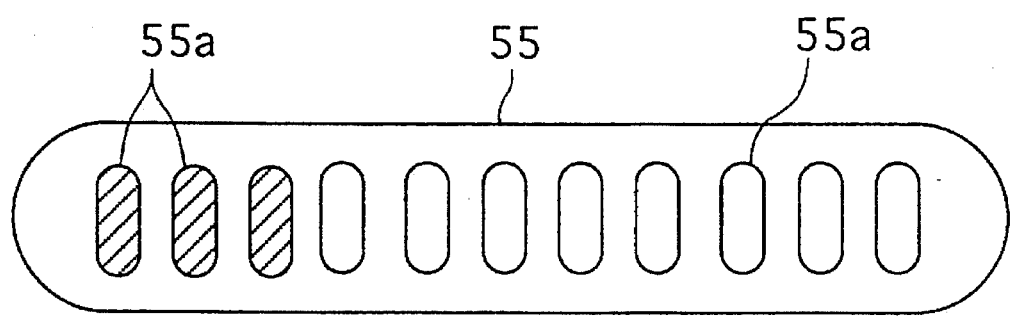
FIG. 15 is a plan view of a distance setting key unit displayed on the screen of the displaying unit and operated by data inputting means for setting the distance of the detour travel roads of the detour travel route.

As shown in FIG. 15, the data inputting means 5 includes a distance setting key unit 55 and other touch panels having an image displayed on the screen 21a of the displaying unit 21 for setting the distance of the detour travel roads of the detour travel route R3. The SRAM 42 of the navigation control unit 40 further contains detour travel route table data including length values Lo and Lt respectively representing the lengths of the proximity link and the costly links.

When the vehicle driver wants to have the navigation information about the detour travel route R3, he or she operates the data inputting means 5 to display the detour travel route R3 on the screen 21a of the displaying unit 21. At the same time, the data inputting means 5 is operated to compute the detour travel route R3 in accordance with the following process.

Figure 20:
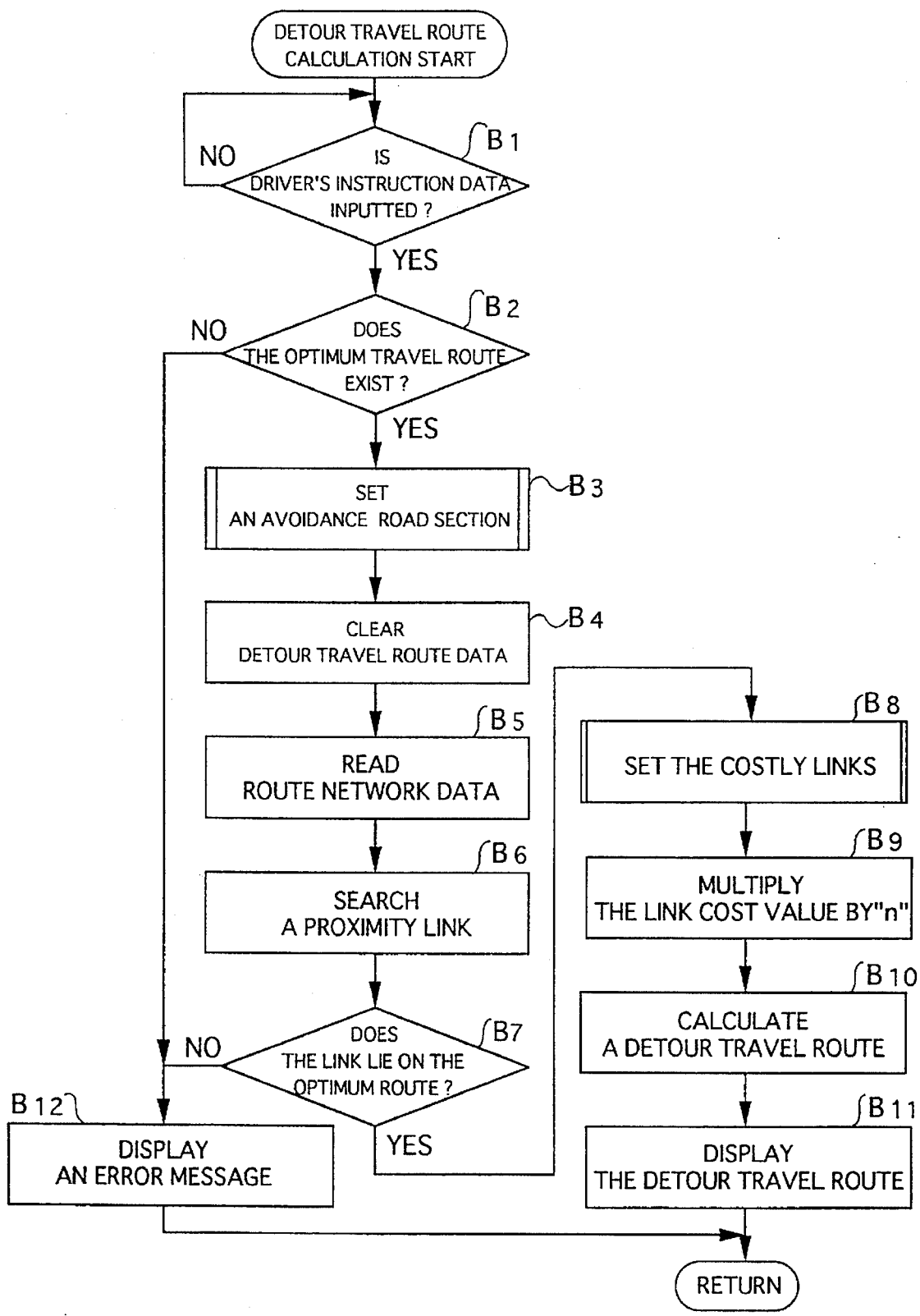
FIG. 20 is a flow chart of the operation of calculating and displaying the detour travel route.

FIG. 20 shows a flow chart of the operation of calculating and displaying the detour travel route.

B1: Checking for the driver's instruction data

The data inputting means 5 is firstly operated at the step B1 by the vehicle driver to input the driver's instruction data to have the detour travel route computing means of the navigation control unit 40 compute the detour travel route R3 by which the vehicle driver wants to avoid the troublesome travel route to travel to the destination with a shortest driving time interval.

B2: Checking the existence of the optimum travel route

The navigation control unit 40 is then operated to judge on whether the optimum travel route R previously calculated exists in the data stored in the resultant table data DT1 of the SRAM 42 of the navigation control unit 40. The optimum travel route R is representative of one of the initial optimum travel route R1 and the additional optimum travel route R2. If the navigation control unit 40 judges that no optimum travel route exists in the data stored in the SRAM 42 of the navigation control unit 40, the step B1 advances to the step B12. The judgment herein made is represented by the legend "NO" at the step B2 in FIG. 20.

B3: Setting an avoidance road section of the optimum travel roads of the optimum travel route If, on the other hand, the navigation control unit 40 judges it "YES" that the optimum travel route R1 or R2 exists in the data stored in the SRAM 42 of the navigation control unit 40, the navigation control unit 40 is then operated to perform one of the sub-routine processes shown in FIGS. 21 and 22.

Figure 21:
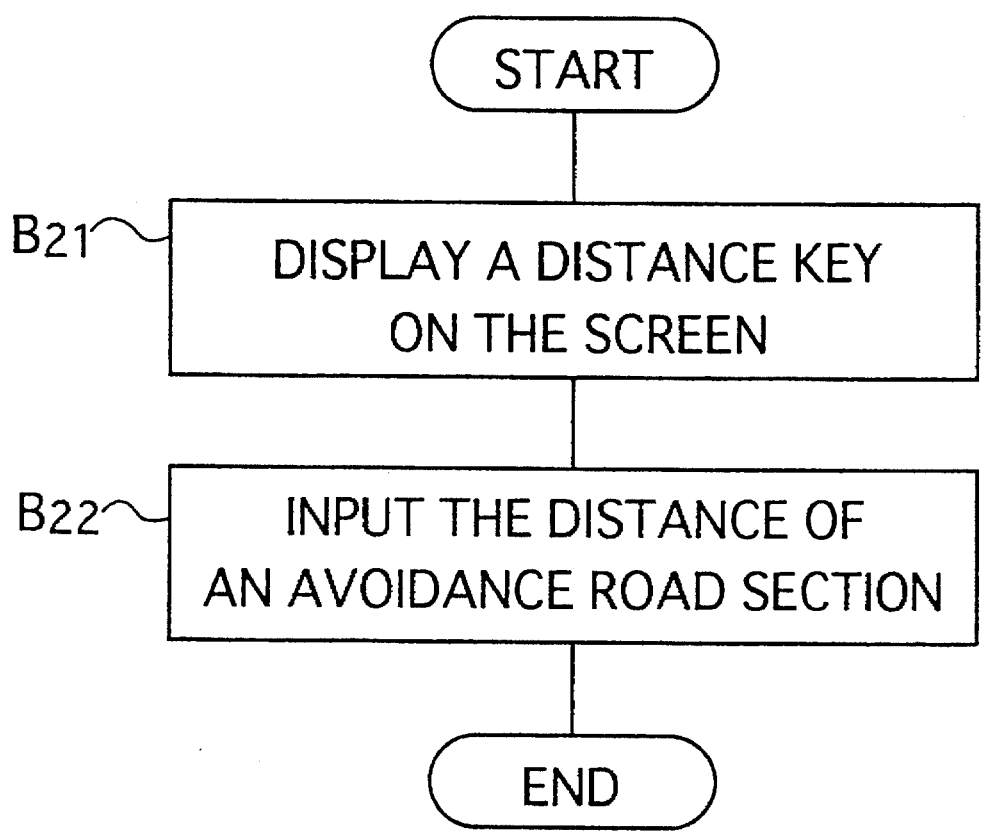
FIG. 21 is a flow chart of the sub-routine process performed within the initial optimum road section setting process of setting the initial optimum road section by the distance setting key unit.
Figure 22:
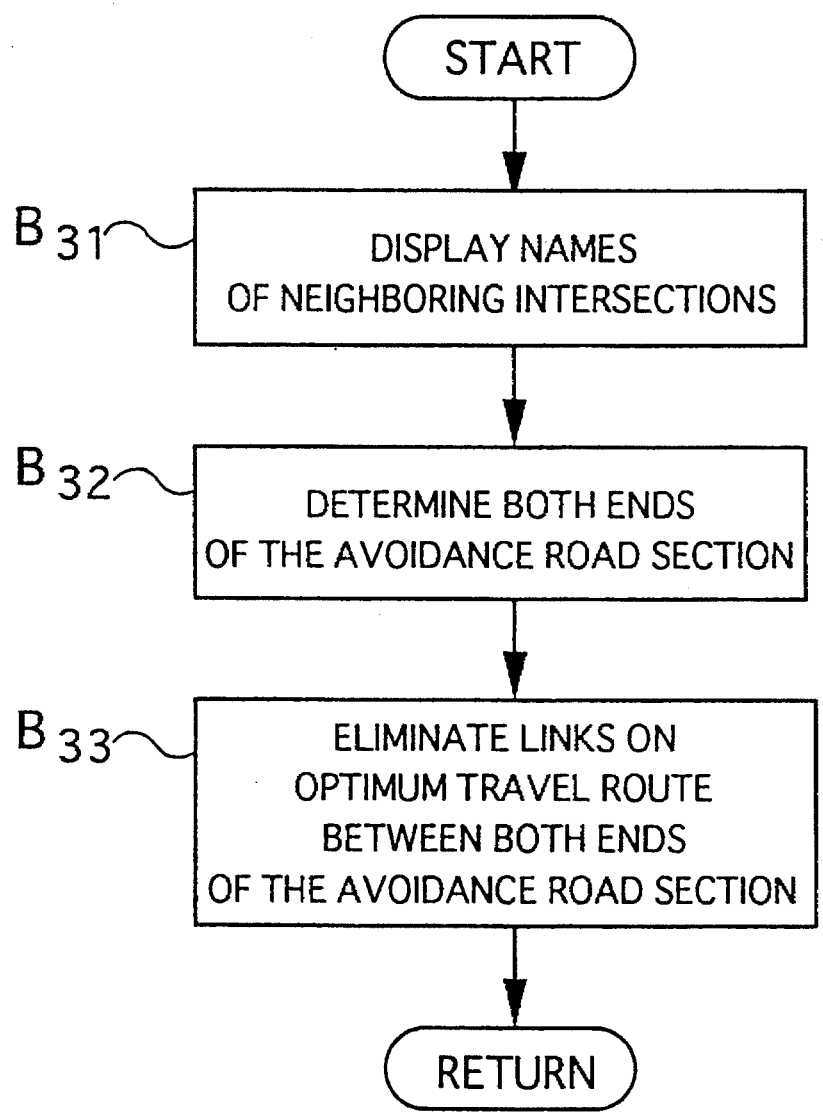
FIG. 22 is a flow chart of the sub-routine process within the initial optimum road section setting process of setting the initial optimum road section by the remote control key unit.

In the sub-routine process shown in FIG. 21, the navigation control unit 40 is operated at the step B21 to have the screen 21a of the displaying unit 21 display the distance setting key 55 shown in FIG. 15. The distance of the avoidance road section starting from the current position P2 is set at the step B22 by the key switches 55a of the distance setting key unit 55. In the sub-routine process shown in FIG. 22, the navigation control unit 40 is operated at the step B31 to have the screen 21a of the displaying unit 21 display intersection name setting keys 56 indicative of names 56a of neighboring intersections on the optimum travel route R1. The intersection representative of the leading end of the avoidance road section is selected at the step B32 from the neighboring intersections on the optimum travel route R1 by the remote control key unit 51. The navigation control unit 40 is then operated at the step B33 to eliminate from the resultant table data of the SRAM 42 of the navigation control unit 40 the link data representative of the links of the avoidance road section from the current position node to a node representative of the selected intersection.

B4: Clearing the detour travel route table data

The navigation control unit 40 is then operated to clear the detour travel route table data of the SRAM 42 of the navigation control unit 40 to delete the detour route data previously calculated.

B5: Reading the route network data for the current position and the destination

The navigation control unit 40 is then operated at the step B5 to have the DRAM 43 of the navigation control unit 40 loaded with the route network data through the disk memory control unit 12 to update the route network data stored in the DRAM 43 of the navigation control unit 40 on the basis of the data of the current position of the vehicle VX. The route network data is indicative of one of the road maps showing the current position and the destination of the vehicle VX.

B6: Searching a proximity link closest to the node representative of the current position of the vehicle The navigation control unit 40 is then operated at the step B6 to search a proximity link closest to the node representative of the current position of the vehicle. The searching operation of the navigation control unit 40 is performed through the route network data stored in the DRAM 43 of the navigation control unit 40.

B7: Judging on the existence of the proximity link on the optimum travel route

The navigation control unit 40 is then operated at the step B7 to have the judging means of the navigation control unit 40 judges on whether or not the proximity link is positioned on the optimum travel route R. If the navigation control unit 40 judges that the proximity link is not positioned on the optimum travel route R, the step B7 advances to the step B12. The judgment herein made is represented by the legend "NO" at the step B7 in FIG. 20.

Figure 23:
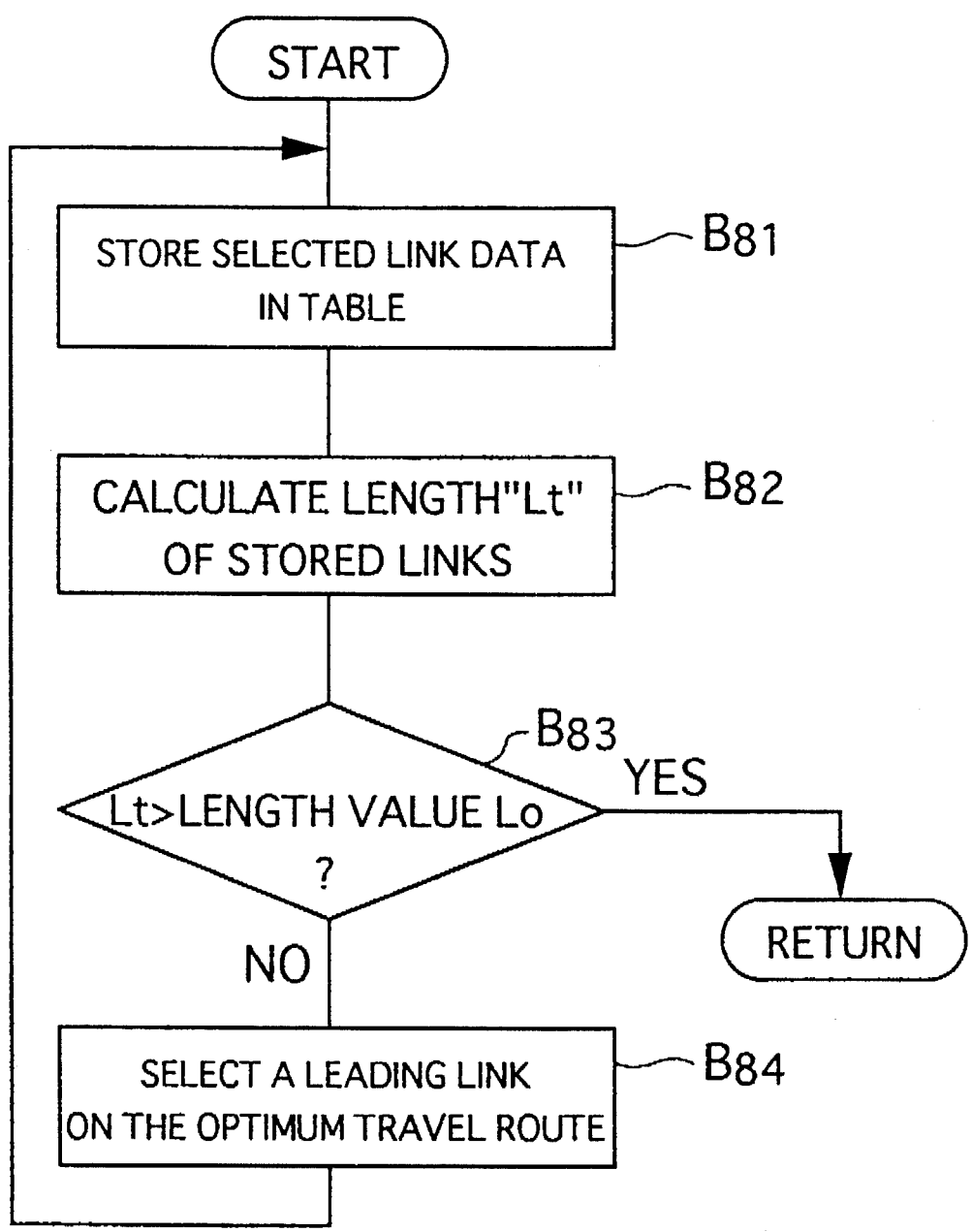
FIG. 23 is a flow chart of the sub-routine process within the initial optimum road section link setting process of setting the links on the initial optimum road section by the navigation control unit.

B8: Setting costly links representative of avoidance road sections on the optimum travel roads If the navigation control unit 40 judges that the proximity link is positioned on the optimum travel route, the navigation control unit 40 is operated at the step B8 to have the detour travel route computing means set the costly links representative of the avoidance road sections in accordance with the setting process shown in FIG. 23.

B81, 82: Storing the initial links data

The navigation control unit 40 is operated to have the detour travel route table of the SRAM 42 store the proximity link data at the steps B81 and B82 with the length value Lt set at the length value Lo.

B83: Judging on the length of the initial links

The navigation control unit 40 is then operated to judge on whether or not the length value Lt of the initial link is larger than the length value Lo. If the navigation control unit 40 judges that the length value Lt of the initial link is smaller than and equal to the length value Lo, the navigation control unit 40 is operated at the step B84 to select a leading link adjacent to the proximity link from the links on the optimum travel route between the proximity ink and the destination node. The step B84 returns to the step B81 to repeat the above steps B81 to B84. In the repeated step B81, the navigation control unit 40 is operated to have the selected link data stored in the detour travel route table data of the SRAM 42 to be representative of one of the initial links. At this time, the initial inks are adjacent to each other. The navigation control unit 40 is then operated at the step B82 to calculate the length Lt of the initial links, and then operated to judge on whether or not the length value Lt of the initial links is larger than the length value "Lo". If the navigation control unit 40 judges that the length value Lt of the initial links is larger than length value Lo, the process for selecting the initial links are completed.

B9: Multiply the link cost value of the initial links by "n" The navigation control unit 40 is then operated to multiply the total link cost value of the initial links by a numeral value "n". The numeral value "n", for example "5", is representative of a finite value.

B10: Calculating the detour travel route

The navigation control unit 40 is then operated to have the CPU 41 of the navigation control unit 40 calculate the detour route in accordance with the calculating process such as for example the stochastic route searching method using the Dijkstra's method or the potential method. In the calculating process, the data processing means of the navigation control unit 40 is operated to search each of the links forming the route network between the starting node and the destination node, and to add the link cost values of the links from the starting node to each node to calculate total link cost values of the travel routes of the route network consisting of the links so called "link tree". The optimum travel route including the detour travel route R3 is selected from the travel routes as one travel route having a total link cost value lowest within the total link cost values of the travel routes in the route network between the starting node and the destination node.

B11: Displaying the detour travel route on the screen of the displaying unit

The navigation control unit 40 is then operated to have the detour travel route displayed on the screen 21a of the displaying unit 21 on the basis of the coordinates of the links of the detour travel route at the step B11.

B12: Displaying an error message

The navigation control unit 40 is operated at the step B12 to display on the screen 21a of the displaying unit 21 an error message of being unable to calculate the detour travel route.

In the mean time, the driver frequently gets traffic information about the troublesome travel road sections of the detour route from the car radio or the television mounted on the vehicle while driving his or her vehicle along the detour route. In this case, the driver may change the travel route to avoid the troublesome road section through another optimum travel route including an additional detour route which is traced by additional detour travel roads off the detour travel roads and having the vehicle travel to the destination from the current position of the vehicle with a shortest driving time interval. As shown in FIG. 14, the additional detour travel route R4 has an additional detour starting point $P_{D3}$ representative of a road position of the vehicle from which the vehicle starts and an additional detour terminating point $P_{D4}$ representative of a road position to which the vehicle returns. The previously mentioned two road positions are assumed on one of the detour travel routes R3 and the initial and additional optimum travel routes R1 and R2 according to the present invention.

The navigation control unit 40 of the vehicle navigation apparatus therefore comprises data processing means for processing the route network data stored in the route network data storing means 1 and the position data detected by the vehicle position detecting means 3 to produce to the road map displaying means 2 navigation information data representing the road maps, the starting position, current position and destination of the vehicle, and the initial and additional optimum travel routes R1 and R2, and the detour and additional detour travel routes R3 and R4.

The detour travel route computing means of the navigation control unit 40 is adapted to compute the detour travel route R3 and the additional detour travel route R4 on the basis of the link cost data having the link cost values risen when the driver's instruction data for the destination of the vehicle is inputted by the data inputting means 5. The distance setting key of the data inputting means 5 is operated to set a distance between the additional detour starting point $P_{D3}$ and the additional detour terminating point $P_{D4}$ of the additional detour travel route R4. The SRAM 42 of the navigation control unit 40 further contains an additional detour travel route table data.

When the driver wants to have the navigation information about the additional detour travel route R4, he or she operates the data inputting means 5 to display an updated travel route which includes the additional travel route R4 and part of the optimum and detour travel routes R1 to R3 previously computed by the data processing means of the navigation control unit 40. At the same time, the data inputting means 5 is operated to compute the updated travel route including the additional detour travel route R4 in accordance with the following process.

Figure 24A:
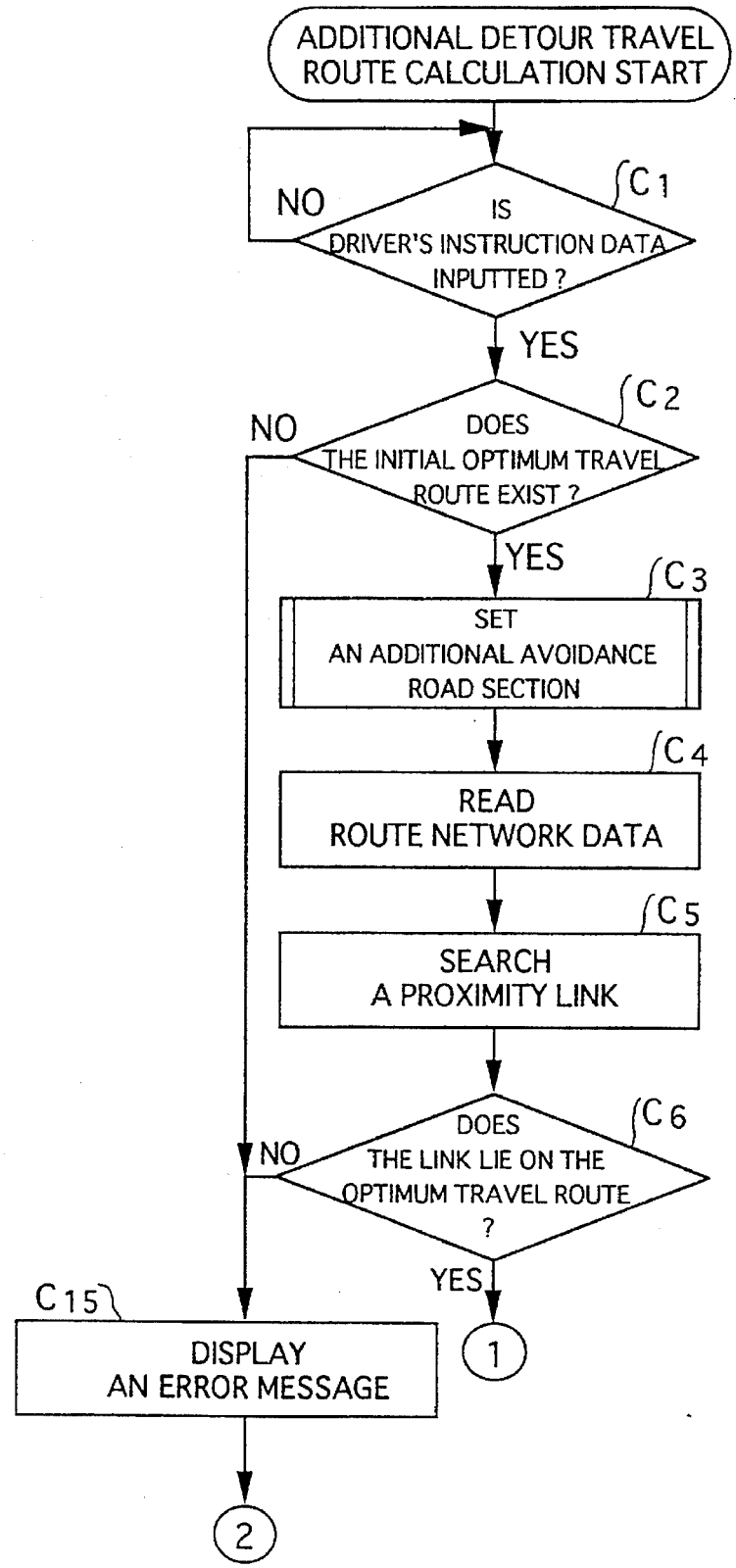
FIG. 24A is a flow chart of part of the operation of calculating and displaying the updated optimum travel route including the additional detour travel route.
Figure 24B:
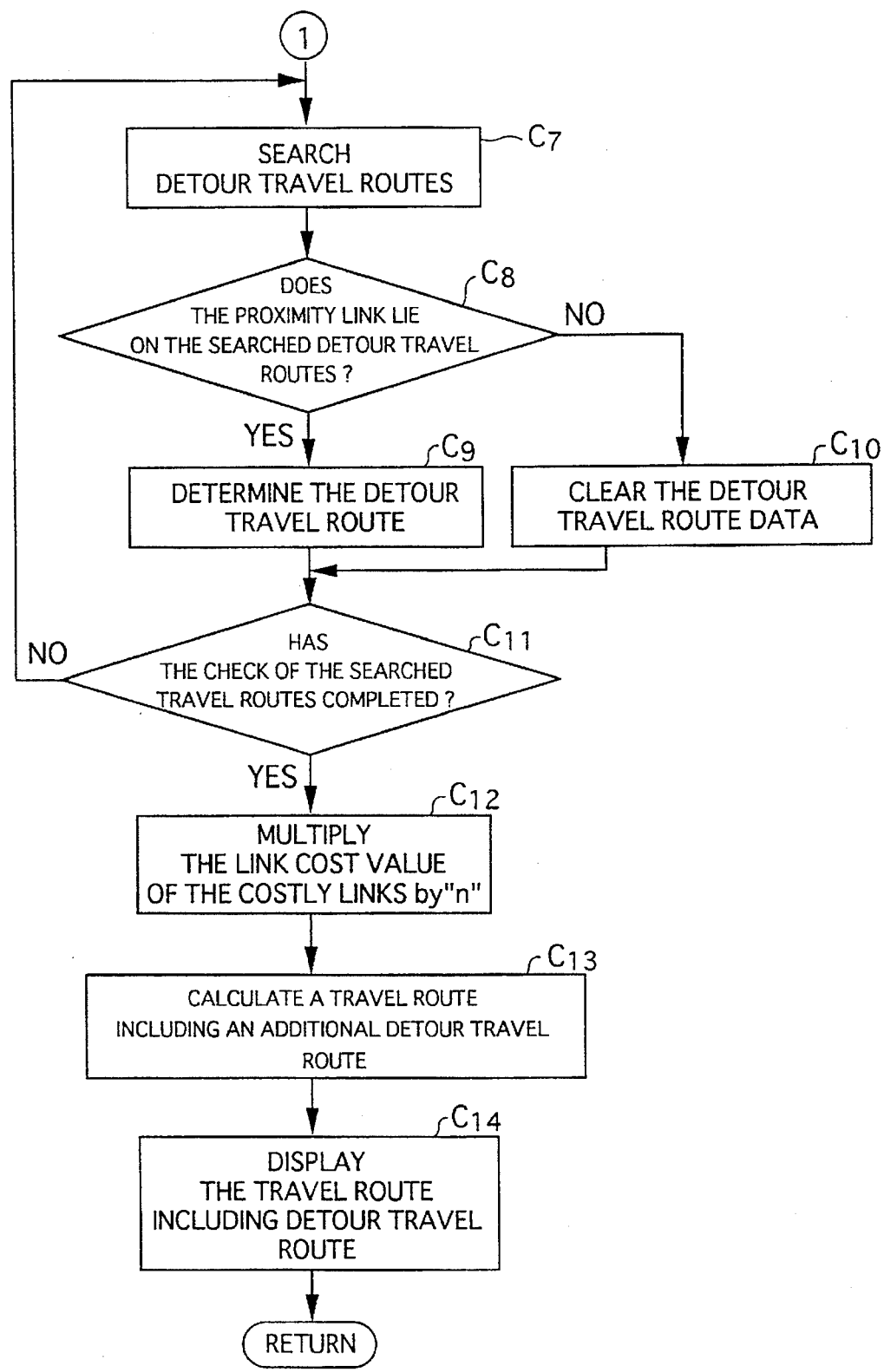
FIG. 24B is a flow chart of the remaining part of the operation of calculating and displaying the updated optimum travel route including the additional detour travel route.

FIGS. 24A and 24B in combination show the operation of calculating and displaying the updated optimum travel route including the additional detour travel route R4.

C1: Checking the driver's instruction to calculate the additional detour travel route The data inputting means 5 is firstly operated at the step C1 by the vehicle driver to have the detour route computing means of the navigation control unit 40 compute the additional detour travel route R4 through which the vehicle detours the troublesome travel road section on the current travel route including the detour travel route R3.

C2: Checking the existence of the initial optimum travel route

The navigation control unit 40 is then operated at the step C2 to have the CPU 41 of the navigation control unit 40 judge on whether or not the initial optimum travel route R has been searched and exists on the basis of the data stored in the SRAM 42 of the navigation control unit 40. If the CPU 41 of the navigation control unit 40 judges that the initial optimum travel route does not exist, the step C1 advances to the step C15. The judgment herein made is represented by the legend "NO" at the step C2 in FIG. 24A.

C3: Setting the additional avoidance road section

If, on other hand, the navigation control unit 40 judges it "YES" that the initial optimum travel route has been searched and exists, the navigation control unit 40 is then operated to perform the sub-routine process shown in FIG. 21. In this sub-routine process, the navigation control unit 40 is operated at the step B21 to have the screen 21a of the displaying unit 21 display an image for setting the distance of the detour travel roads of the detour travel route R3. The distance of the additional avoidance road section of the current travel route between the additional detour starting point $P_{D3}$ and the additional detour terminating point $P_{D4}$ is set at the step B22 by the distance setting key unit 55.

C4: Reading the route network data for the current position and the destination

The navigation control unit 40 is then operated at the step C4 to have the DRAM 43 of the navigation control unit 40 loaded with the route network data through the disk memory control unit 12 to update the route network data stored in the DRAM 43 of the navigation control unit 40 on the basis of the data of the current position of the vehicle. The route network data is indicative of one of the road maps showing the current position and the destination of the vehicle.

C5: Searching a proximity link closest to the node representative of the current position of the vehicle The navigation control unit 40 is then operated at the step C5 to search a proximity link closest to the node representative of the current position of the vehicle VX. The searching operation of the navigation control unit 40 is performed through the route network data stored in the DRAM 43 and the data stored in the SRAM 42 of the navigation control unit 40.

C6: Judging on the existence of the proximity link on the initial optimum travel route The navigation control unit 40 is then operated at the step C6 to have the judging means of the navigation control unit 40 judge on whether or not the proximity link is positioned on the optimum travel route R. If the navigation control unit 40 judges it "NO" that the proximity link is not positioned on the optimum travel route R, the step C6 advances to the step C15.

C7: Searching the detour travel routes previously calculated

The navigation control unit 40 is then operated at the step C7 to search the detour travel routes R35, and R36 previously calculated and memorized in the detour travel route table data of the SRAM 42 of the navigation control unit 40.

C8, C9: Judging on whether or not the proximity link lies on one of the searched detour travel routes The navigation control unit 40 is then operated at the step C8 to judge on whether or not the proximity link lies on or off one of the searched detour travel routes R35 and R36. If the navigation control unit 40 judges that the proximity link is off one of the searched detour travel routes R35 and R36, the data of one of the detour travel routes R35 and R36 is cleared out of the detour travel route table data of the SRAM 42 by the CPU 41 of the navigation control unit 40 at the step C9. The judgment herein made is represented by the legend "NO" at the step C8 in FIG. 24B.

C10: Determination of the detour travel routes to be additionally detoured

If, on the other hand, the navigation control unit 40 judges as it as "YES" that the proximity link is on one of the searched detour travel routes, the data of the detour travel route is determined at the step C10 to be retained in the detour travel route table data in the SRAM 42 of the navigation control unit 40.

C11: Judging on completion of the check of the previous detour travel routes

The navigation control unit 40 is then operated at the step C11 to judge on whether or not all of the searched detour travel routes are checked at the step C8 by the CPU 41 of the navigation control unit 40. If the navigation control unit 40 judges that all of the searched detour travel routes R35 and R36 are not checked completely by the CPU 41 of the navigation control unit 40, the step C10 returns to the step C7. The judgment herein made is represented by the legend "NO" at the step C11 in FIG. 24B. In this way, the steps C8 to C11 are repeated until all of the searched detour travel routes are checked by the CPU 41 of the navigation control unit 40.

C12: Multiplying link cost values of the avoidance road section by a numeral value "n"

The navigation control unit 40 is then operated to respectively multiply the link cost values of the links on the avoidance road section of the initial optimum travel route R1 and the link cost values of the links on the previous travel route between the additional detour starting point $P_{D3}$ and the additional detour terminating point $P_{D4}$ of the additional detour travel route R4 by a numeral value "n". The numeral value "n", for example "5", is representative of a finite value.

C13: Calculating a travel route including the additional detour travel route

The navigation control unit 40 is then operated to have the CPU 41 of the navigation control unit 40 calculate an updated travel route including the additional detour travel route R4 in accordance with the aforementioned calculating process such as for example the stochastic route searching method using the Dijkstra's method or the potential method. In the calculating process, the data processing means of the navigation control unit 40 is operated to search each of the links forming the route network between the starting node and the destination node through the additional detour route R4 from the starting node, and to add the link cost values of the links from the leading end node to each node to calculate total link cost values of travel routes of the route network consisting of the links so called "link tree". The updated optimum travel route including the additional detour travel route R4 is selected from the travel routes as one travel route having a total link cost value lowest within the total link cost values of the travel routes in the route network between the starting node and the destination node.

C14: Displaying the updated travel route including the additional detour travel route on the screen of the displaying unit The navigation control unit 40 is then operated to have the calculated travel route displayed on the screen 21a of the displaying unit 21 with the additional detour travel route R4 as an updated optimum travel route including the detour travel route R4 on the basis of the coordinates of the links of the additional detour travel route R4 at the step C14.

C15: Displaying error message

The navigation control unit 40 is operated at the step C15 to display on the screen 21a of the displaying unit an error message of being unable to calculate the detour travel route.

The aforesaid navigation control unit 40 is adapted to perform the stochastic route searching calculation process to calculate each of the initial optimum travel route, the updated optimum travel route including the detour travel route and the updated travel route including the additional detour travel route.

The navigation control unit 40 therefore functions as route network data classifying means for classifying the route network data segments to be different from one another in total link cost values of the links from the starting node to each of the nodes within each of the route network data segments, destination judging means for judging on whether or not the destination node is within one of the route network data segments, link cost totaling means for totaling the link cost values of the links from the starting position to the destination to select the links from the destination node to the starting node with a lowest total cost value of the links when the destination node is within one of the route network data segments, and optimum travel route determining means for determining the links selected and totaled as the optimum travel route. In the vehicle navigation apparatus, the work data memories respectively have predetermined cost ranges different from one another, and in which The route network data segments may have respective data sizes equal to or different from one another. The road map segments respectively defined by the route network data segments may be adjacent to one another in a direction from the starting road map segment to the destination road map segment to form a loop boundary including the outermost free nodes of the road map segments and a plurality of heading boundaries outwardly extending from the starting node. Further, the data sizes of the route network data segments may be increased radially outwardly from the starting node in the road map data, or decreased radially outwardly from the starting route network data segment in the road map data.

Figure 25A:
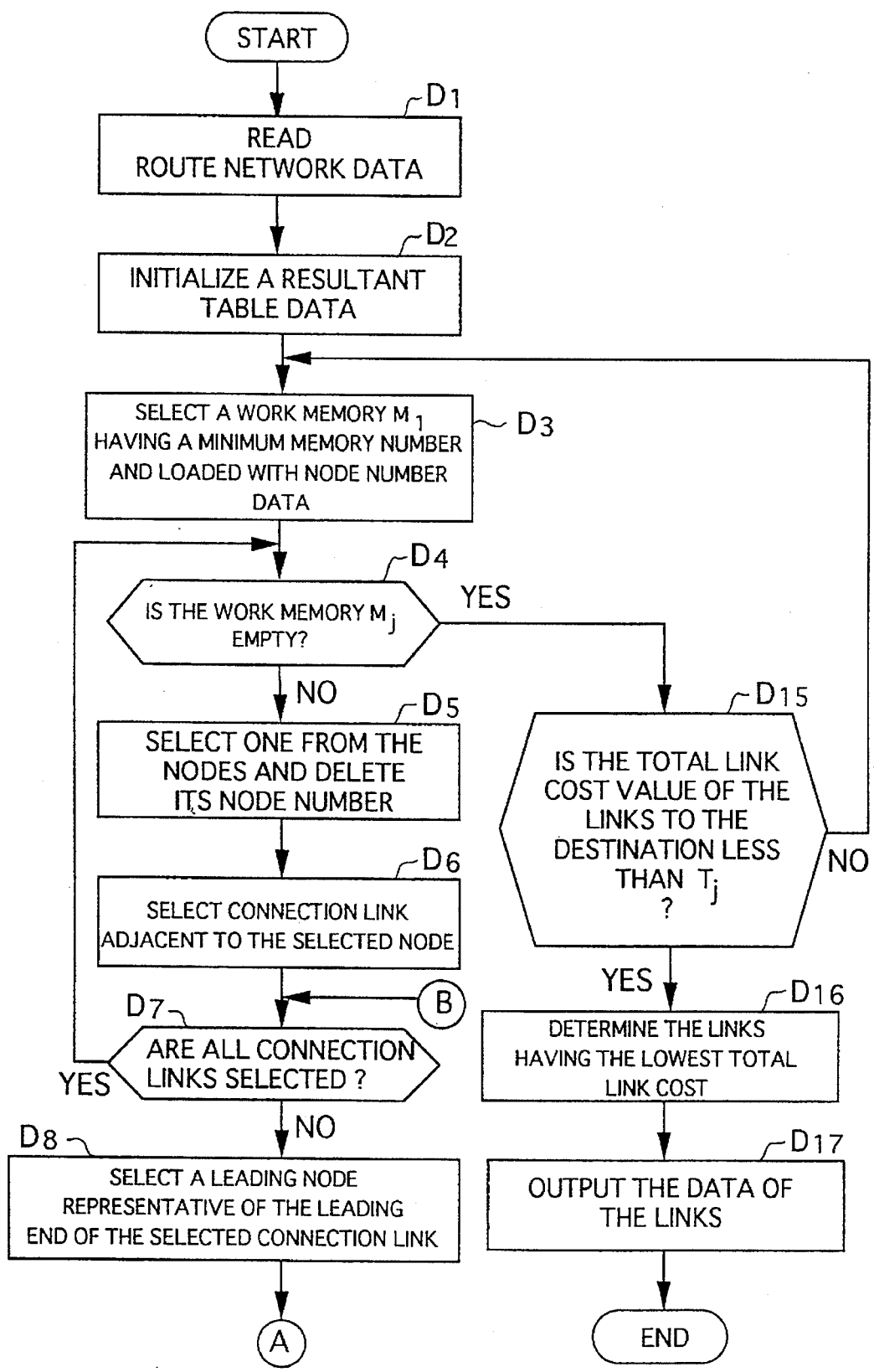
FIG. 25A is a flow chart of part of the operation of calculating and displaying the updated optimum travel route including the additional detour travel route.
Figure 25B:
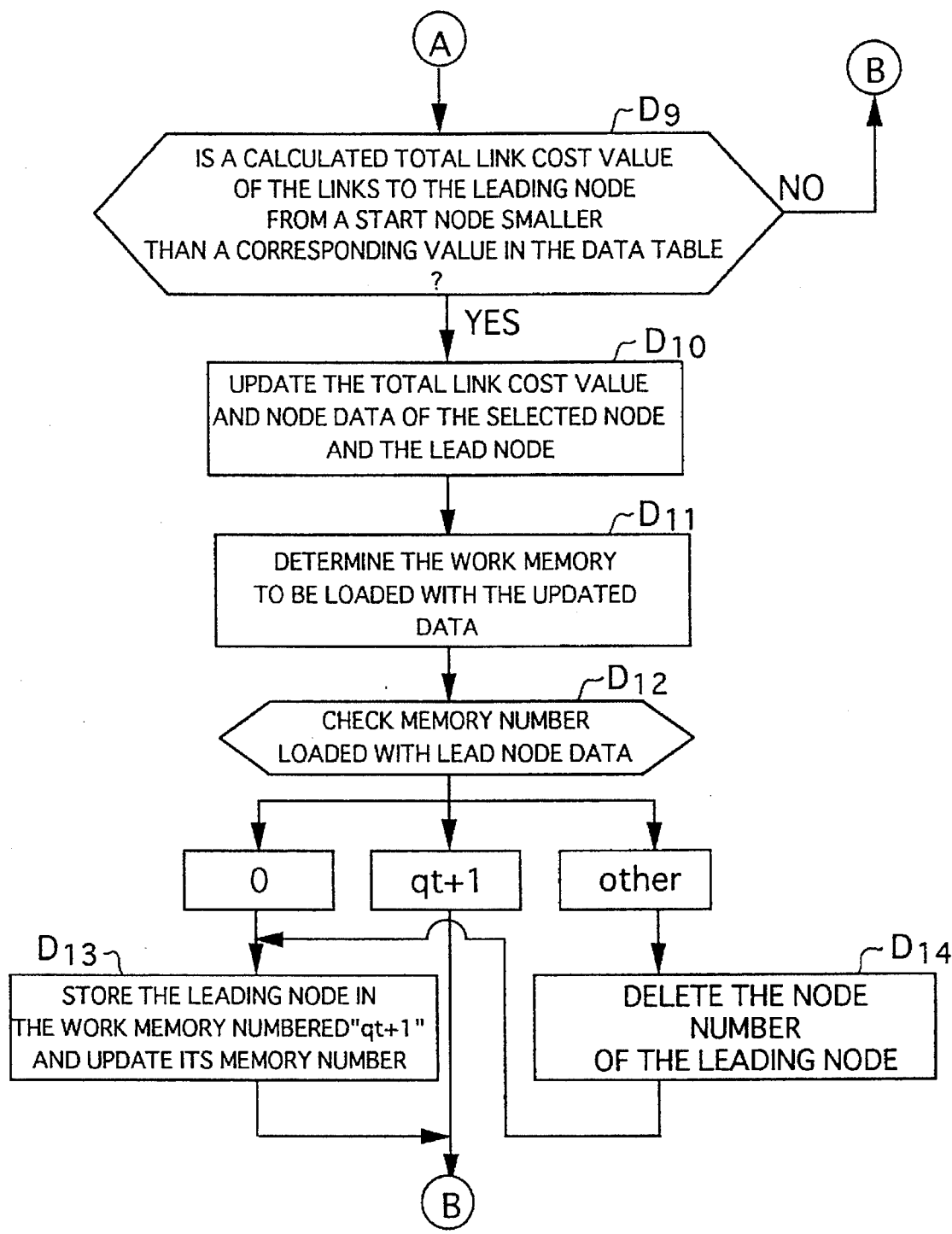
FIG. 25B is a flow chart of the remaining part of the optimum travel route calculation process performed by the navigation control unit.

FIGS. 25A and 25B in combination show the calculation process performed by the navigation control unit 40.

D1: Reading the route network data for the current position of the vehicle

The navigation control unit 40 is operated at the step D1 to have the resultant table data DT1 of the SRAM 42 of the navigation control unit 40 loaded with the route network data and to have the search work memories of the address table data DT2 of the SRAM 42 loaded with their respective section numbers "1" to "512".

D2: Initializing the route network data stored in the resultant table data

The navigation control unit 40 is then operated at the step D2 to initialize the resultant table data DT1 of the SRAM 42 of the navigation control unit 40. The initialized resultant table data DT1 include a starting node with the memory number "1", a finite total link cost value, e.g., zero and an adjacent trailing node representative of a node nearest to the starting node and representing a position through which the vehicle has just passed. The adjacent trailing node has an infinite number, for example, a largest number within the finite numbers restricted with the number of bits of the SRAM 42. The adjacent trailing node is in registry with the trailing end node of the link having the leading end node representative of the current position of the vehicle. The initialized resultant table data DT1 further include intermediate nodes positioned between the starting node and the destination node and having a memory number "0", and infinite total link cost values. The infinite total link cost value is in fact set at a largest cost value within the finite values restricted with the number of bits of the SRAM 42. The initialized data forming part of the route network data stored in the SRAM 42 of the navigation control unit 40 are repeatedly updated by the navigation control unit 40 in the steps of the calculation process.

D3: Selecting one of the search work memories having the minimum memory number M1 and loaded with one of the node numbers of the route network data The navigation control unit 40 is then operated at the step D3 to select one of the search work memories having the minimum memory number and loaded with one or more of the node numbers of the nodes. The node numbers are initially stored in a predetermined order, for example, on the basis of the time they have read out from the disk memory control unit. The memory numbers of the search work memories of the SRAM 42 are representative of the different total link cost values of the links from the starting node to each of the nodes. The whole links collectively forms the travel routes in the route network called "link tree" from the starting node to the destination node. The nodes have the respective node numbers stored in the address table data DT2 of the SRAM 42 of the navigation control unit 40.

D4: Judging on whether or not the search work memory is empty.

The navigation control unit 40 is then operated at the step D4 to judge on whether or not there is one or more node numbers stored in the search work memory having the minimum memory number in the address table data DT2 of the SRAM 42 of the navigation control unit 40. If the navigation control unit 40 judges that there is no node number stored in the search work memory having the minimum memory number in the address table data DT2 of the SRAM 42 of the navigation control unit 40, the step D4 advances to the step D15.

D5: Selecting a node from the nodes having the node numbers

If, on the other hand, the navigation control unit 40 judges that anyone of the node numbers is stored in the search work memory having the minimum memory number in the address table data DT2 of the SRAM 42 of the navigation control unit 40, the navigation control unit 40 is then operated at the step D5 to have the CPU 41 of the navigation control unit 40 select one from the node numbers stored in the address table data DT2 of the SRAM 42 of the navigation control unit 40 and delete the number of the selected node from the address table data PT2 of the SRAM 42 of the navigation control unit 40.

D6: Selecting a connection link adjacent to the selected node and having a trailing end represented by the selected node The navigation control unit 40 is then operated at the step D6 to search a connection link adjacent to the selected node and having a trailing end represented by the selected node in the resultant table data PT1 of the SRAM 42 of the navigation control unit 40.

D7: Judging on completion of searching the connection link

The navigation control unit 40 is then operated at the step D7 to judge on whether or not there are other one or more connection links adjacent to the selected node and having a trailing end represented by the selected node in the address table data PT2 of the SRAM 42 of the navigation control unit 40 at the step D7. If the navigation control unit 40 judges that the searching operation is finished for all of the connection links in the address table data DT2 of the SRAM 42 of the navigation control unit 40, the step D7 proceed to the step D4. The judgment herein made is represented by the legend "YES" at the step D7 in FIG. 25A.

D8: Selecting a leading node representative of the leading end of the selected connection link If, on the other hand, the navigation control unit 40 judges that the searching operation is not finished for all of the connection links in the address table data DT2 of the SRAM 42 of the navigation control unit 40, the navigation control unit 40 is then operated at the step D8 to select a leading node representative of the leading end of the selected connection link and adjacent to the selected node from the nodes having the data in the address table data DT2 of the SRAM 42 of the navigation control unit 40. The judgment herein made is represented by the legend "NO" at the step D7 in FIG. 25A.

D9: Judging on the total link cost value

The navigation control unit 40 is then operated at the step D9 to calculate the total link cost value of the links from the starting node to the node representative of the leading end of the selected connection link by adding the link cost value of the selected link to the total link cost value of the links from the starting node to the selected node. The navigation control unit 40 is then operated to judge on whether or not the calculated total link cost value is smaller than the total link cost of the links from the starting node to the selected node.

If the navigation control unit 40 judges that the calculated total link cost value is not smaller than the total link cost value of the links from the starting node to the selected node, the step D11 goes back to the step D7. The judgment herein made is represented by the legend "NO" at the step D9 in FIG. 25B.

D10: Updating the node data

If the navigation control unit 40 judges that the calculated total link cost value is smaller than the total link cost value of the links from the starting node to the selected node, the navigation control unit 40 is then operated at the step D10 to update not only the total link cost value data from the starting node to the node representative of the leading end of the selected connection link but also the node number of the node representative of the trailing end of the selected connection link in the resultant table data DT1 of the SRAM 42 of the navigation control unit 40. The judgment herein made is represented by the legend "YES" at the step D9 in FIG. 25B. This means the fact that the navigation control unit 40 is operated to search all the links from the starting node to the destination node, and to add the link cost values of the links from the starting node to the nodes to calculate the total link cost values for the nodes in the route network between the starting node and the destination node.

D11: Determining the work memory to be loaded with the updated total link cost value and node data The navigation control unit 40 is then operated at the step D11 to divide the total link cost value from the starting node to the node representative of the leading end of the selected connection link by a predetermined value "t" decided based on the range scale of the search work memories to determine one of the search work memories of the resultant table data DT1 to be loaded in the updated total link cost value data and the node number representative of the trailing end of the selected connection link. This leads the fact that the node data of the route network data stored in the resultant table data DT1 of the SRAM 42 is classified into a plurality of route network data segments including a starting route network data segment for the starting road map segment and a plurality of surrounding network data segments for the surrounding road map segments.

D12: Checking the memory number of the work memory loaded with the node number of the current position node The navigation control unit 40 is then operated to check the memory number of the work memory loaded with the node number of the node representative of the trailing end of the selected connection link on the basis of a quotient value calculated by the CPU 41 of the navigation control unit 40 in the step D11.

D13, D14: Determining the address of the nodes

If the checked memory number is equal to zero, the navigation control unit 40 is operated at the step D13 to have the node data representative of the trailing end of the selected connection link stored in the work memory having a memory number "qt+1". If the checked memory number is equal to "qt+1", the step 12 advances to the step D7. If the checked memory number differs from "0" and "qt+1", the navigation control unit 40 is operated at the step D14 to delete the node number of the node representative of the leading end of the selected connection link from the address table data DT2 of the SRAM 42 of the navigation control unit 40, and to have the node data representative of the leading end of the selected connection link stored in the work memory having the memory number "qt+1" at the step D13.

In this way, the route network data segments are partly classified into a plurality of route network data segments, although the search work memories are initialized to include the node numbers of the nodes having the total link cost values out of respective cost ranges of the search work memories. The search work memories of the SRAM 42 may have their respective range widths of the cost ranges identical to one another or different from one another. In the case that the cost ranges of the search work memories have different range widths, the cost ranges may have their respective range widths narrowing or widening with rise of the total link cost values within their respective range widths.

D: 15 Judging on whether or not the total link cost value to the destination from the staring position of the vehicle The navigation control unit 40 is then operated at the ate D15 to read the node number of the destination node and data of total link cost value of the links from the starting node to the destination node in the resultant table data DT1 of the SRAM 42 of the navigation control unit 40 to judge on whether or not the total link cost value of the links to the destination node from the starting node is less than the maximum cost value within the cost range of the search work memory storing the node number of the destination node. If the navigation control unit 40 judges that the total link cost value of the links to the destination node is not less than the maximum cost value within the cost range of the search work memory, the step D15 advances to the step D3. The judgment herein made is represented by the legend "NO" at the step D15 in FIG. 25A.

D16: Determining the links having the lowest total link cost

If, on the other hand, the navigation control unit 40 judges that the total link cost value of the links from the starting node to the destination node is less than the maximum cost value within the cost range of the corresponding search work memory of the SRAM 42 of the navigation control unit 40, the navigation control unit 40 is then operated at the step D16 to select the connection link having the leading end representative of the destination node and the trailing end forming a connective node, and to repeatedly search the connection link having the leading end representative of the connective node of the adjacent connection link and the trailing end forming another connective node until the another connective node of the connection link coincides with the starting node. The judgment herein made is represented by the legend "YES" at the step D15 in FIG. 25A. In this way, the connection links are searched to have a series of links from the destination node to the starting node. The total link cost value of the series of links is lower than any other total link cost value of other series of links from the starting node to the destination node. The selected series of links therefore form the initial or updated optimum travel route in the route network between the starting node and the destination node. The judgment on whether or not the another connective node of the connection link coincides with the starting node is made by the CPU 41 of the navigation control unit 40 on the basis of the data of the total link cost value and the link number of the trailing link having the leading end representative of the starting node and the trailing end representative of the node numbered infinity.

D17: Outputting the data of the selected series of links

The navigation control unit 40 is then operated at the step D17 to output the data of the selected series of links to produce data for displaying one of the optimum travel route, the detour route and the updated optimum travel route including the additional detour route.

As will be understood from the foregoing description, the navigation control unit 40 is adapted to perform the calculation processes to calculate the total link cost values of the links from the starting node to the respective nodes having the node numbers in one of search work memories, on the basis of the route network data stored in the resultant table of the SRAM 42 and the node numbers stored in one of the search work memories, to determine the links from the starting node to each of the nodes with the calculated total link cost values and storing the total link cost value in the first work memory. The calculation process is repeatedly performed in order of the memory numbers corresponding to the cost ranges of the search work memories different from one another in the upper and lower limit values of the cost ranges. The node numbers stored in the search work memories of the SRAM 42 are deleted one by one at the above step D12, while the memory numbers stored in the resultant table of the SRAM 42 are respectively changed with respect to the node numbers based on the total link cost values of the links, to the nodes having the node numbers initially stored in the search work memories from the starting node, to classify the data corresponding to the node number in the resultant table of the SRAM 42 without displacing and sorting the data stored in the resultant table of the SRAM 42. The work memories forming the resultant table and search work memories are less costly since the work memories have respective memory capacities enough for storing part of the route network data loaded from the memory control unit 12. The above calculation process enable to expeditiously compute the optimum travel route and to maintain a high level of route searching quality by the reason that the route network data stored in the resultant table of the SRAM 42 is classified into a plurality of route network data segments without displacing the resultant table data of the SRAM 42 based on the node numbers in the label fields of the search work memories while the total link cost values are calculated by the CPU 41 of the navigation control unit 40.

According to the present invention, the optimum travel route including one of the return travel route, detour travel route and additional detour travel route can readily be computed by inputting the driver's instructions to the vehicle navigation apparatus according to the present invention if the vehicle driver encounters troublesome travel roads while he or she is driving the vehicle along the initial optimum travel route. When the vehicle driver becomes aware of traveling on the wrong roads, the vehicle navigation apparatus according to the present invention is operated to compute the return travel route having a leading route end junction connected to the initial optimum travel route and a trailing end representative of the current position of the vehicle. The decision on the return travel route is readily made by the vehicle navigation apparatus by the reason that the total link cost value of the links between the leading route end junction and the destination is initially calculated and that return travel route is readily determined based on the data for updating the current position. The link cost values of the links of avoidance road sections on the initial optimum travel route are increased by the CPU 41 of the navigation control unit 40 when the detour travel route R3 or R4 is computed, thereby making it possible to prevent the initial optimum travel route including troublesome road sections from being firstly selected as an additional travel route. Further, the initial optimum travel route is selected again in the case that no additional optimum travel route is found, thereby reducing the time to be consumed for detouring along an extremely long detouring travel route.

It will be understood by those skilled in the art that the foregoing description is in terms of preferred embodiments of the present invention wherein various changes and modification may be made without departing from the spirit and scope of the invention, as set forth in the appended claims.

What is claimed is:

1. A vehicle navigation apparatus for producing navigation information about a set of road maps indicative of travel roads, the starting position, current position and destination of a vehicle, a first optimum travel route traced by first optimum travel roads forming part of said travel roads and having said vehicle travel to said destination from said starting position of said vehicle with a shortest driving time interval, and a second optimum travel route traced by second optimum travel roads off said first optimum travel roads and having said vehicle travel to said destination from said current position of said vehicle with a shortest driving time interval, said second optimum travel route consisting of a return travel route having a leading route end junction connected to said first optimum travel route and a trailing end point representative of said current position of said vehicle, said leading route end junction being representative of a road junction formed by said first and second optimum travel roads crossed with each other, comprising:

route network data storing means for storing route network data including road map data representing said road maps, node data representing a plurality of nodes each indicative of the coordinate of each position on said road maps, link data representing a plurality of links each representing each of said travel roads and having both ends respectively represented by said nodes, link cost data representing a plurality of link cost values each determined based on the information about said nodes and links for said vehicle to pass through each of said links;

road map displaying means for displaying said navigation information about said road maps, said starting position, current position and destination of said vehicle, and said first and second optimum travel routes;

vehicle position detecting means for detecting said starting position, current position and destination of said vehicle to produce position data representing said starting position, current position and destination of said vehicle;

data processing means for processing said route network data stored in said route network data storing means and said position data detected by said vehicle position detecting means to produce to said road map displaying means navigation information data representing said road maps, said starting position, current position and destination of said vehicle, and said first and second optimum travel routes, and to update said navigation information data on the basis of said position of said vehicle in one of said road maps displayed by said road map displaying means;

data inputting means for inputting driver's instruction data to said data processing means;

said data processing means comprising:

first optimum travel route computing means for computing said first optimum travel route on the basis of said link cost data of said network data and said current position of said vehicle when said driver's instruction data for said destination of said vehicle is inputted to said data processing means by said data inputting means;

route judging means for judging whether said vehicle is traveling on or off said first optimum travel roads when said driver's instruction data for computing said second optimum travel route is inputted to said data processing means by said data inputting means, and second optimum travel route computing means for computing said return travel route of said second optimum travel route on the basis of said link cost data of said network data and said current position of said vehicle when said vehicle is judged by said route judging means as traveling off said first optimum travel roads.

2. A vehicle navigation apparatus as set forth in claim 1, in which said links include a proximity link extending on said first optimum travel route in close proximity of said trailing end point of said return travel route of said second optimum travel route, a destination link extending on said first optimum travel route and in close proximity of said destination of said vehicle position, and an intermediate link extending between said proximity link and said destination link and connected to said leading route end junction of said return travel route of said second optimum travel route, and which further comprises:

proximity link searching means for searching said proximity link when said driver's instruction data for said destination of said vehicle is inputted by said data inputting means, and intermediate link judging means for judging on whether or not said intermediate link extends between said proximity link and said destination link and is connected to said leading route end junction of said return travel route of said second optimum travel route.

3. A vehicle navigation apparatus as set forth in claim 1, in which said nodes include a proximity node positioned on said first optimum travel route and in close proximity of said trailing end point of said return travel route of said second optimum travel route, a destination node positioned on said first optimum travel route and representative of said destination of said vehicle, and an intermediate node positioned between said proximity node and said destination node, and which further comprises:

proximity node searching means for searching said proximity node when said driver's instruction data for said destination of said vehicle is inputted by said data inputting means, and intermediate node judging means for judging whether or not said intermediate node is positioned between said proximity node and said destination node and in registry with said leading route end junction of said return travel route of said second optimum travel route.

4. A vehicle navigation apparatus as set forth in claim 1, in which said links include a last transit link extending on said first optimum travel route in close proximity of said trailing end point of said return travel route of said second optimum travel route, and representative of a last transit travel road through which said vehicle has passed, a destination link extending on said first optimum travel route and in close proximity of said destination of said vehicle, and an intermediate link extending between said proximity link and said destination link and connected to said leading route end junction of said return travel route of said second optimum travel route, and which further comprises:

last transit link searching means for searching said last transit link when said driver's instruction data for said destination of said vehicle is inputted by said data inputting means, and intermediate link judging means for judging whether or not said intermediate link extends between said last transit link and said destination link and is connected to said leading route end junction of said return travel route of said second optimum travel route.

5. A vehicle navigation apparatus as set forth in claim 1, in which said nodes include a last transit node positioned on said first optimum travel route in close proximity of said trailing end point of said return travel route of said second optimum travel route, a destination node positioned on said first optimum travel route and representative of said destination of said vehicle, and an intermediate node positioned between said last transit node and said destination node in registry with said leading route end junction of said return travel route of said second optimum travel route, and which further comprises:

last transit node searching means for searching said last transit node when said driver's instruction data for said destination of said vehicle is inputted by said data inputting means, and intermediate node judging means for judging whether or not said intermediate node is positioned between said last transit node and said destination node and connected to said leading route end junction of said return travel route of said second optimum travel route.

6. A vehicle navigation apparatus as set forth in claim 1, in which said data inputting means is operable to input transitional place node data representing a plurality of predetermined transitional places positioned on said first optimum travel route, said first optimum travel route being divided by said transitional places to have a last transit section representative of a last transit travel road through which said vehicle has passed and a next transit section representative of a travel road extending between said last transit section and said destination node and through which said vehicle will pass, said next transit section being connected to said leading route end junction of said return travel route of said second optimum travel route, and which further comprises:

last transit section searching means for searching said last transit section when said driver's instruction data for said destination of said vehicle is inputted by said data inputting means; and next transit section judging means for judging whether or not said next transit section is positioned between said last transit section and said destination.

7. A vehicle navigation apparatus as set forth in claim 2, in which said road map displaying means is constituted by a displaying unit having a screen, and in which said data processing means is constituted by a microcomputer which is operated with a program to store a road map data block forming part of said route network data and indicative of one of said road maps on the screen of the road map displaying means and said current position of said vehicle on the basis of said current position of said vehicle, and in which said data processing means judges on whether or not one of said links from said proximity link to said destination link of said first optimum travel route is included in said stored road map data block to determine one of said links to be connected to said leading route end junction of said return travel route of said second optimum travel route.

8. A vehicle navigation apparatus as set forth in claim 7, in which one of said links in said road map data block stored in said microcomputer and in close proximity of said destination link is connected to said leading route end junction of said return travel route of said second optimum travel.

9. A vehicle navigation apparatus as set forth in claim 1, which further comprises navigation information announcing means for announcing said navigation information about said road maps, said starting position, current position and destination of said vehicle, and said first and second optimum travel routes.

10. A vehicle navigation apparatus as set forth in claim 1, in which said data processing means is operated to produce to said road map displaying means additional navigation information data to delete said first optimum travel route between the starting point of said first optimum travel route and said node representing said current position of said vehicle when said driver's instruction data for computing said second optimum travel route is inputted to said data processing means by said data inputting means.

11. A vehicle navigation apparatus for producing navigation information about a set of road maps indicative of travel roads, the starting position, current position and destination of a vehicle, a first optimum travel route traced by first optimum travel roads forming part of said travel roads and having said vehicle travel to said destination from said starting position of said vehicle with a shortest driving time interval, said first optimum travel route being sectioned to have a plurality of first optimum travel route segments surrounded by a closed boundary, and a plurality of second optimum travel routes each traced by second optimum travel roads off said first optimum travel roads and having said vehicle travel to the position of each of said travel roads of said first optimum travel route segments from said current position of said vehicle with a shortest driving time interval, each of said second optimum travel routes consisting of a return travel route having a leading route end junction connected to each of said first optimum travel route segments and a trailing end point representative of said current position of said vehicle, said leading route end junction being representative of a road junction formed by said first optimum travel roads and each of said second optimum travel roads crossed with each other, comprising:

route network data storing means for storing route network data including road map data representing said road maps, node data representing nodes each indicative of the coordinate of each position on said road maps, link data representing a plurality of links each representing each of said travel roads and having both ends respectively represented by said nodes, link cost data representing a plurality of link cost values each determined based on the information about said nodes and links for said vehicle to pass through each of said links;

road map displaying means for displaying said navigation information about said road maps, said starting position, current position and destination of said vehicle, and said first and second optimum travel routes, said road map displaying means being constituted by a displaying unit having a screen defining said closed boundary;

vehicle position detecting means for detecting said starting position, current position, destination of said vehicle to produce position data representing said starting position, current position, destination of said vehicle;

data processing means for processing said route network data stored in said route network data storing means and said position data detected by said vehicle position detecting means to produce to said road map displaying means navigation information data representing said road maps, said starting position, current position and destination of said vehicle, and said first optimum travel route segments and said second optimum travel routes, and to update said navigation information data on the basis of said position of said vehicle in said road map displayed by said road map displaying means;

data inputting means for inputting driver's instruction data to said data processing means;

said data processing means comprising:
 first optimum travel route computing means for computing said first optimum travel route on the basis of said link cost data of said network data and said current position of said vehicle when said driver's instruction data for said destination of said vehicle is inputted to said data processing means by said data inputting means;
 route judging means for judging whether said vehicle is traveling on or off said first optimum travel roads when said driver's instruction data for computing said second optimum travel route is inputted to said data processing means by said data inputting means;
 second optimum travel route computing means for computing said return travel routes of said second optimum travel routes on the basis of said link cost data of said route network data and said current position of said vehicle when said vehicle is judged by said route judging means as traveling off said first optimum travel roads;
 route cost value calculating means for calculating route cost values of said second optimum travel routes based on said link cost data stored in said route network data storing means and position data of said leading route end junction on said first optimum travel route; and
 optimum travel route selecting means for selecting one of said return travel routes of said second optimum routes on the basis of said link cost data of said route network data and said route cost values of said second optimum travel routes.

12. A vehicle navigation apparatus as set forth in claim 11, in which the calculation of said route cost values of said second optimum travel routes by said route cost calculating means comprises the steps of totaling the link cost values of the links on each of said return travel routes of said return travel routes, and respectively adding to the totaled link cost values of the links on said return travel routes supplementary cost values different from one another, said supplementary cost values being proportional to the link cost values of said links from said leading route end junctions of said return travel routes to said node representative of said destination of said vehicle.

13. A vehicle navigation apparatus as set forth in claim 11, in which said data processing means is constituted by a microcomputer which is operated with a program to store a road map data block forming part of said route network data and indicative of one of said road maps on the screen of the road map displaying means and said current position of said vehicle on the basis of said current position of said vehicle, and in which said route cost calculating means calculates said supplementary cost values equal to the link cost values of said links from one of said first optimum travel route segments closest to said node representing said destination of said vehicle to each of said leading route end junctions of said return travel routes within said road map data block.

14. A vehicle navigation apparatus as set forth in claim 11, which further comprises first optimum route deleting means for deleting said first optimum travel route between the starting point of said first optimum travel route and said leading route end junction of said second optimum travel route when said return travel route is displayed by said road map displaying means.

15. A vehicle navigation apparatus for producing navigation information about a set of road maps indicative of travel roads, the starting position, current position and destination of a vehicle, an optimum travel route traced by optimum travel roads forming part of said travel roads and having said vehicle travel to said destination from said starting position of said vehicle with a shortest driving time interval, and a detour travel route traced by detour travel roads off an avoidance road section forming part of said optimum travel roads and having said vehicle travel to said destination from said current position of said vehicle with a shortest driving time interval, said detour travel route having a detour starting point representative of a road position of said vehicle where said vehicle starts to detour from said optimum travel route and a detour ending point representative of a road position where said vehicle returns to said optimum travel route, comprising:

route network data storing means for storing route network data including road map data representing said road maps, node data representing nodes each indicative of the coordinate of each position on said road maps, link data representing a plurality of links each representing each of said travel roads and having both ends respectively represented by said nodes, link cost data representing a plurality of link cost values each determined based on the information about said nodes and links for said vehicle to pass through each of said links;

road map displaying means for displaying said navigation information about said road maps, said starting position, current position and destination of said vehicle, and said optimum and detour travel routes;

vehicle position detecting means for detecting said starting position, current position, and destination of said vehicle to produce position data representing said starting position, current position, and destination of said vehicle;

data processing means for processing said route network data stored in said route network data storing means and said position data detected by said vehicle position detecting means to produce to said road map displaying means navigation information data representing said road maps, said starting position, current position and destination of said vehicle, and said optimum and detour travel routes, said navigation information data being updated by said data processing means on the basis of said position of said vehicle in said road map displayed by said road map displaying means;

data inputting means for inputting driver's instruction data to said data processing means, said driver's instruction data including data for setting said avoidance road section of said optimum travel roads;

said data processing means comprising;

optimum travel route computing means for computing said optimum travel route on the basis of said link cost data of said network data and said current position of said vehicle when said driver's instruction data for said destination of said vehicle is inputted by said data inputting means;

costly link setting means for setting costly links representative of said avoidance road section of said optimum travel roads by increasing initial link cost values of said links representative of said avoidance road section when said data for setting said avoidance road section is inputted by said data inputting means;

detour travel route computing means for computing said detour travel route on the basis of said link cost data including said increased link cost values of said costly links representative of said avoidance road section under the condition that said avoidance road section is allowed to be selected as said detour travel route; and route judging means for judging whether said optimum travel route computing means or said detour travel route computing means is to calculate said optimum travel route or said detour travel route on the basis of said driver's instruction data for said optimum travel route or said detour travel route inputted to said data processing means by said data inputting means.

16. A vehicle navigation apparatus as set forth in claim 15, in which said costly link setting means includes a distance setting key displayed by said road map displaying means for setting the distance of said avoidance road section starting from said current position of said vehicle.

17. A vehicle navigation apparatus as set forth in claim 15, in which said costly link setting means includes intersection name selecting key displayed by said road map displaying means and indicative of names of neighboring intersections on said optimum travel route for selecting one intersection from the neighboring intersections on the optimum travel route to set the distance of said avoidance road section from said current position of said vehicle to said selected intersection.

18. A vehicle navigation apparatus for producing navigation information about a set of road maps indicative of travel roads, the starting position, current position and destination of a vehicle, an optimum travel route traced by optimum travel roads forming part of said travel roads and having said vehicle travel to said destination from said starting position of said vehicle with a shortest driving time interval, and first and second detour travel routes traced by first and second detour travel roads off said optimum travel roads and each having said vehicle travel to said destination from said current position of said vehicle with a shortest driving time interval, each of said first and second detour travel routes having a detour starting point representative of a road position of said vehicle where said vehicle starts to detour from said optimum travel route and a detour ending point representative of a road position where said vehicle returns to said optimum travel route, comprising:

route network data storing means for storing route network data including road map data representing said road maps, node data representing nodes each indicative of the coordinate of each position on said road maps, link data representing a plurality of links each representing each of said travel roads and having both ends respectively represented by said nodes, link cost data representing a plurality of link cost values each determined based on the information about said nodes and links for said vehicle to pass through each of said links;

road map displaying means for displaying said navigation information about said road maps, said starting position, current position and destination of said vehicle, and said optimum and detour travel routes;

vehicle position detecting means for detecting said starting position, current position, destination of said vehicle to produce position data representing said starting position, current position, and destination of said vehicle;

data processing means for processing said route network data stored in said route network data storing means and said position data detected by said vehicle position detecting means to produce to said road map displaying means navigation information data representing said road maps, said starting position, current position and destination of said vehicle, and said optimum and detour travel routes, said navigation information data being updated by said data processing means on the basis of said position of said vehicle in said road map displayed by said road map displaying means;

data inputting means for inputting driver's instruction data to said data processing means;

said data processing means comprising:

optimum travel route computing means for computing said optimum travel route on the basis of said link cost data of said network data and said current position of said vehicle when said driver's instruction data for said destination of said vehicle is inputted by said data inputting means;

first costly link setting means for setting costly links representative of an avoidance road section forming part of said optimum travel roads by increasing initial link cost values of said links representative of said avoidance road section when data for setting said avoidance road section is inputted by said data inputting means;

first detour travel route computing means for computing said first detour travel route on the basis of said link cost data including said increased link cost values of said costly links representative of said avoidance road section under the condition that said avoidance road section is allowed to be selected as said first detour travel route to be displayed by said map displaying means;

second costly link setting means for setting costly links representative of an additional avoidance road section forming part of said optimum and first detour travel roads by increasing link cost values of said links representative of part of said avoidance road section when data for setting said additional avoidance road section is inputted by said data inputting means;

second detour travel route computing means for computing said second detour travel route on the basis of said link cost data including said increased link cost values of said costly links representative of said additional avoidance road section under the condition that said additional avoidance road section is allowed to be selected as said second detour travel route to be displayed by said road map displaying means; and route judging means for judging whether said optimum travel route computing means or one of said detour travel route computing means is to calculate said optimum travel route or one of said detour travel routes on the basis of said driver's instruction data for said optimum travel route or one of said detour travel routes inputted to said data processing means by said data inputting means.

19. A vehicle navigation apparatus as set forth in claim 18, in which each of said first and second costly link setting means includes a distance setting key displayed by said road map displaying means for setting the distance of each of said avoidance and additional avoidance road sections each starting from said current position of said vehicle.

20. A vehicle navigation apparatus as set forth in claim 18, in which each of said first and second costly link setting means includes intersection name selecting key displayed by said road map displaying means and indicative of names of neighboring intersections on said first optimum travel roads for selecting one intersection from the neighboring intersections for setting the distance of each of said avoidance and additional avoidance road sections from said current position of said vehicle to said selected intersection.

21. A vehicle navigation method of producing navigation information about a set of road maps indicative of travel roads, the starting position, current position and destination of a vehicle, an optimum travel route traced by optimum travel roads forming part of said travel roads and having said vehicle travel to said destination from said starting position of said vehicle with a shortest driving time interval, comprising the step of:

preparing route network data including road map data representing said road maps, node data representing a plurality of nodes each indicative of the coordinate of each position on said road maps, link data representing a plurality of links each representing each of said travel roads and having both ends respectively represented by said nodes, link cost data representing a plurality of link cost values each determined based on the information about said nodes and links for said vehicle to pass through each of said links, said nodes including starting and destination nodes representative of said starting position and said destination of said vehicle, and said links including starting and destination links extending from said first and destination nodes along said optimum travel route;

preparing a first work memory for storing part of said route network data and variable data initialized to be updated and including total link cost values of said links from said starting node to said nodes within said route network data stored therein, said route network data including said node data;

preparing a plurality of second work memories respectively having predetermined cost ranges different from one another and including label fields initialized to have the node numbers of said node data stored therein, the node number of said starting node being stored in one of said second work memories having the cost range lowest in said total link cost values of said links from said starting node to said nodes within said route network data stored in said first work memory;

performing a first calculation process of respectively calculating said total link cost values of said links from said starting node to said nodes having said node numbers in one of said second work memories on the basis of said route network data stored in said first work memory and said node numbers stored in one of said second work memories having said cost range lowest in said total link cost values to determine said links from said starting node to each of said nodes with the calculated total link cost value and storing said total link cost value in said first work memory, performing a second calculation process of calculating said total link cost values of said links from said starting node to said nodes having the node numbers stored in another second work memory on the basis of said route network data stored in said first work memory and data of said node numbers stored in another second work memory to determine said links from said starting node to each of said nodes with the calculated total link cost value and storing said total link cost values in said first work memory, said second calculation process being repeatedly performed in order of said cost ranges of said second work memories after said first calculation process;

changing said node numbers stored in said second work memories based on each of said total link cost values of said links from said starting node to said nodes having said node numbers stored in each of said second work memories to classify said route network data stored in said first work memory into a plurality of route network data segments on the basis of said total link cost values of said links from said starting node to said nodes having said node numbers stored in each of said second work memories;

judging on whether or not the total link cost value of said links from said starting node to said destination node is within said cost range of said second work memory having said node number of said destination node stored therein while said first and second calculation processes for said second work memories are being performed; and determining said links from said starting node to said destination node as said optimum travel route with a lowest route cost value based on said destination node judged as being within said cost range of said second work memory having said node number of said destination node stored therein.

22. A vehicle navigation method as set forth in claim 21, in which said second work memories have their respective range widths of said cost ranges identical to one another.

23. A vehicle navigation method as set forth in claim 21, in which said second work memories have their respective range widths of said cost ranges different from one another.

24. A vehicle navigation method as set forth in claim 23, in which said second work memories have their respective range widths of said cost ranges narrowing with the rise of said total link cost values within their respective cost ranges.

25. A vehicle navigation method as set forth in claim 23 in which said second work memories have their respective range widths of said cost ranges widening with the rise of said total link cost values within their respective cost ranges.

26. A vehicle navigation apparatus for producing navigation information about a set of road maps indicative of travel roads, the starting position, current position and destination of a vehicle, an optimum travel route traced by optimum travel roads forming part of said travel roads and having said vehicle travel to said destination from said starting position of said vehicle with a shortest driving time interval, comprising:

route network data storing means for storing said route network data including road map data representing said road maps, node data representing a plurality of nodes each indicative of the coordinate of each position on said road maps, link data representing a plurality of links each representing each of said travel roads and having both ends respectively represented by said nodes, link cost data representing a plurality of link cost values each determined based on the information about said nodes and links for said vehicle to pass through each of said links, said nodes including starting and destination nodes representative of said starting position and said destination of said vehicle, and said links including starting and destination links extending from said first and destination nodes along said optimum travel route;

a first work memory for storing part of said route network data and variable data initialized to be updated and including total link cost values of said links from said starting node to said nodes within said route network data stored therein, said route network data including said node data;

a plurality of second work memories respectively having predetermined cost ranges different from one another and including label fields initialized to have the node numbers of said node data stored therein, the node number of said starting node being stored in one of said second work memories having the cost range lowest in said total link cost values of said links from said starting node to said nodes within said route network data stored in said first work memory;

data processing means for performing a first calculation process of calculating each of said total link cost values of said links from said starting node to each of said nodes having said node numbers in one of said second work memories on the basis of said route network data stored in said first work memory and said node numbers stored in one of said second work memories having said cost range lowest in said total link cost values to determine said links from said starting node to each of said nodes with the calculated total link cost value and storing said total link cost value in said first work memory, and a second calculation process of calculating each of said total link cost values of said links from said starting node to each of said nodes having the node numbers stored in another second work memory on the basis of said route network data stored in said first work memory and said node numbers stored in another second work memory to determine said links from said starting node to each of said nodes with the calculated total link cost value and storing said total link cost value in said first work memory, said second calculation process being repeatedly performed in order of said cost ranges of said second work memories;

route network data classifying means for classifying said route network data stored in said first work memory into a plurality of route network data segments on the basis of said total link cost values of said links from said starting node to said nodes having said node numbers stored in each of said second work memories by changing said node numbers stored in said second work memories based on said total link cost values of said links from said starting node to said nodes having said node numbers stored in each of said second work memories;

judging means for judging on whether or not the total link cost value of said links from said starting node to said destination node is within said cost range of said second work memory having said node number of said destination node stored therein while said first and second calculation processes for said second work memories are being performed; and determination means for determining said links from said starting node to said destination node as said optimum travel route with a lowest route cost value when said destination node is judged as being within said cost range of said second work memory having said node number of said destination node stored therein.

* * * * *